United States Patent [19]
Balasa et al.

[11] Patent Number: 5,742,814
[45] Date of Patent: Apr. 21, 1998

[54] BACKGROUND MEMORY ALLOCATION FOR MULTI-DIMENSIONAL SIGNAL PROCESSING

[75] Inventors: Florin Balasa, Tustin Ranch, Calif.; Francky Catthoor, Temse; Hugo De Man, Kessel-lo, both of Belgium

[73] Assignee: IMEC vzw, Leuven, Belgium

[21] Appl. No.: 649,903

[22] Filed: May 15, 1996

Related U.S. Application Data

[60] Provisional application No. 60/007,160, Nov. 1, 1995, and provisional application No. 50/007,288, Nov. 6, 1995.

[51] Int. Cl.$^6$ .................................................. G06F 17/30
[52] U.S. Cl. ........................... 395/613; 395/615; 395/709
[58] Field of Search ................................................ 395/6, 70

[56] References Cited

U.S. PATENT DOCUMENTS

| | | | |
|---|---|---|---|
| 4,964,063 | 10/1990 | Esch | 395/75 |
| 5,327,561 | 7/1994 | Choi et al. | 395/709 |
| 5,454,104 | 9/1995 | Steidlmayer et al. | 395/604 |
| 5,485,616 | 1/1996 | Burke et al. | 95/709 |
| 5,553,285 | 9/1996 | Krakauer et al. | 395/618 |
| 5,664,109 | 9/1997 | Johnson et al. | 705/2 |

OTHER PUBLICATIONS

"Allocation of Multiport Memories in Data Path Synthesis," Balakrishnan, et al., *IEEE Trans. on Comp–Aided Design*, vol. CAD-7, No. 4, pp. 536–540, Apr. 1988.

"Exact Evaluation of Memory Size for Multi–Dimensional Signal Processing Systems," Balasa, et al., *Proc. IEEE Int. Conf. Comp–Aided Design*, pp. 669–672, Nov. 1993.

"Transformation of Nested Loops with Module Indexing to Affine Recurrences," Balasa, et al., *Parallel Processing L.*, vol. 4, No. 3, pp. 271–280, Dec. 1994.

"Background Memory Allocation in Multidimensional Signal Processing," Balasa, F., Ph.D. thesis, IMEC, Nov. 1995.

"Background Memory Area Estimation for Multidimensional Signal Processing Systems," Balasa, et al., *IEEE Transactions on Very Large Scale Integration (VLSI) Systems*, vol. 3, No. 2, pp. 157–172, 1995.

"Automatic Program Parallelization," Banerjee, et al., *Proc. of the IEEE*, vol. 81, No. 2, 1993.

(List continued on next page.)

*Primary Examiner*—Wayne Amsbury
*Attorney, Agent, or Firm*—Knobbe, Martens, Olson & Bear, LLP

[57] ABSTRACT

Data storage and transfer cost is responsible for a large amount of the VLSI system realization cost in terms of area and power consumption for real-time multi-dimensional signal processing applications. Applications or this type are data-dominated because they handle a large amount of indexed data which are produced and consumed in the context of nested loops. This important application domain includes the majority of speech, video, image, and graphic processing (multi-media in general) and end-user telecom applications. The present invention relates to the automated allocation of the background memory units, necessary to store the large multi-dimensional signals. In order to handle both procedural and nonprocedural specification, the novel memory allocation methodology is based on an optimization process driven by data-flow analysis. This steering mechanism allows more exploration freedom than the more restricted scheduling-based investigation in the existent synthesis systems. Moreover, by means of an original polyhedral model of data-flow analysis, the novel allocation methodology can accurately deal with complex specifications, containing large multi-dimensional signals. The class of specifications handled by this polyhedral model covers a larger range than the conventional ones, i.e. the entire class of affine representations. Employing estimated silicon area or power consumption costs yielded by recent models for on-chip memories, the novel allocation methodology produces one, or optionally, several distributed multi-port memory architecture(s) with fully-determined characteristics, complying with a given clock cycle budget for memory operations.

46 Claims, 41 Drawing Sheets

OTHER PUBLICATIONS

"The Indefinite Zero–One Quadratic Problem," Carter, M.W., *Discrete Applied Math.* vol. 7, pp. 23–33, 1984.

"Integer Programming by Implicit Enumberation and Balas' Method," Arthur M. Geoffrion, *Siam Review*, vol. 9, No. 2, pp. 178–190, 1967.

"Fourier–Motzkin Elimination and its Dual," Dantizig, et al., *J. of Combinatorial Theory (A)*, vol. 14, pp. 288–297, Aug. 1993.

"Converting the 0–1 Polynomial Programming Problem to a 0–1 Linear Program," Glover, et al., *Operations Research*, vol. 22, No. 1, pp. 180–182, Jan. 1974.

"SMASH: A Program for Scheduling Memory–Intensive Application–Specific Hardware," Gupta, et al., *Proc. 7th International Symposium on High Level Synthesis*, May 1994.

"REAL: A Program for Register Allocation," Kurdahi, et al., *Proc. 24th SCM/IEEE Design Automation Conference*, pp. 210–215, Jun. 1987.

"Allocation of Multiport Memories for Hierarchical Data Streams," Lippens, et al., *IEEE*, 1993.

"PHIDEO: A Silicon Compiler for High Speed Algorithms," Lippens, et al., *Proc. European Design Automation Conference*, pp. 436–441, Feb. 1991.

"An Area Model for On–Chip Memories and its Application," Mulder, et al., *IEEE J. Solid–State Circ.*, vol. SC–26, No. 2, pp. 98–105, Feb. 1991.

"Calculation of Minimum Number of Registers in Arbitrary Life Time Chart," Parhi, K.K., *IEEE Trans. on Circuits and Systems II: Analog and Digital Signal Processing*, vol. 41, No. 6, pp. 434–436, Jun. 1994.

"A Practical Algorithm for Exact Array Dependance Analysis," Pugh, W., *Comm. of the ACM*, vol. 35, No. 8, Aug. 1992.

"Accurate Layout Area and Delay Modeling for System Level Design," Ramachandran, et al., *Proc. IEEE Int. Conf. Comp.–Aided Design*, pp. 355–361, Nov. 1992.

"A New Method for the Minimization of Memory Area in High Level Synthesis," Rouzeyre, et al., *Proc. Euro–ASIC Conf.*, pp. 184–189, May 1991.

"Foreground Memory Management in Data Path Synthesis," Stok, et al., *Int. Journal on Circuit theory and Application*, vol. 20, pp. 235–255, 1992.

"A Balasian–Based Algorithm for Zero–One Polynomial Programming," Taha, H.A., *Management Science*, Vo. 18, No. 6, pp. 328–343, Feb. 1972.

"Memory Estimation for High Level Synthesis," Verbauwhede, et al., *Proc. 31st Design Automation Conference*, pp. 143–148, Jun. 1994.

"Register Allocation and Assignment," Aho, et al., *Compilers: Principles, Techniques, and Tools*, pp. 540–546, 1986.

"Post–Processor for Data Path Synthesis Using Multiport Memories," Ahmad, et al., *IEEE*, pp. 276–279, 1991.

"DSP Specification Using the Silage Language," Genin, et al., *IEEE*, pp. 1057–1060, 1990.

"The Mimola Design System: Tools for the Design of Digital Processors," Peter Marwedel, *IEEE*, pp. 587–593, 1984.

"Synthesis of Intermediate Memories for the Data Supply to Processor Arrays," Schonfeld, et al., *Algorithms and parallel VLSI Architectures II*, pp. 365–370, 1992.

"Automated Synthesis of Data Paths in Digital Systems," Tseng, et al., *IEEE*, pp. 379–395, 1986.

"Architecture–Driven Synthesis Techniques for VLSI Implementation of DSP Algorithms," De Man, et al., *IEEE*, pp. 319–335, 1990.

"Modeling Data Flow and Control Flow for DSP System Synthesis," Swaaij, et al., *IMEC*, pp. 219–259.

"Line Search Without Using Derivatives," Bazaraa, et al., *Non Linear Programming Theory and Algorithms*, 267–281, 1993.

"Optimisation of Global Communication and Memory Organization for Decreased Size and Power in Fixed Rate Processing Systems," Catthor, et al., *IMEC*, pp. 1–14, 1995.

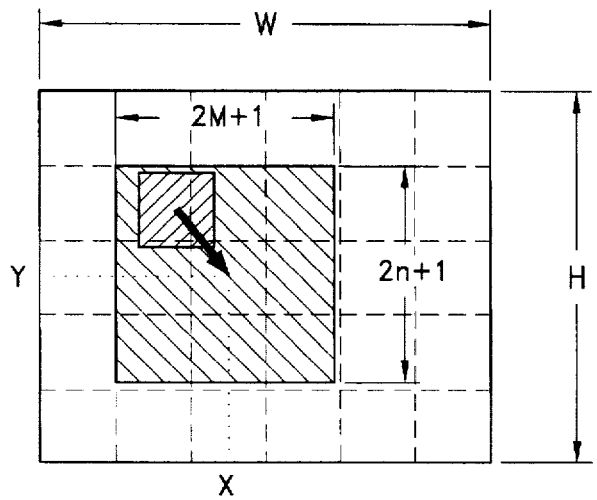
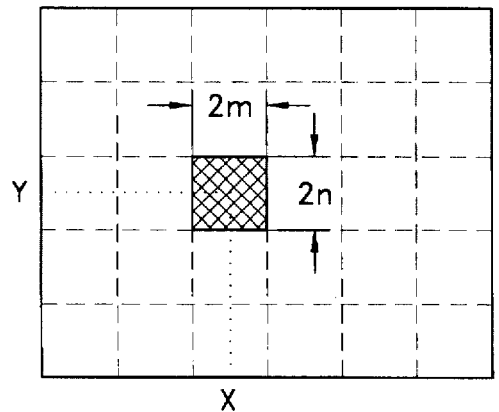
```
Loop structure:
(implicit Time loop)
  for (i=-M..M)
    for (j=-N..N)
      for (k=-n..n-1)
        for (l=-m..m-1)
          [distance accumulation]
        end(l)
      end(k)
      [minimal distance select]
    end(j)
  end(i)
```
FIG. 7

```
define W fix<16,4>          /* m, n, M, N are predefined constants */ func main (A: W[M+m+1][N+n+1]) opt: W =
begin
(1)   optDelta[0] = W(0);
      (i: m .. M)::
        (j: n .. N)::
        begin
(2)       Delta[i][j][0] = W(0);
          (k: i-m .. i+m)::
            (l: j-n .. j+n)::
(3)           Delta[i][j][(k-i+m)*(2*n+1)+l-j+n+1] = A[i][j] - A[k][l]@1
                + Delta[i][j][(k-i+m)*(2*n+1)+l-j+n];
(4)       optDelta[(i-m)*(N-n+1)+j-n+1] = Delta[i][j][(2*m+1)*(2*n+1)]
                + optDelta[(i-m)*(N-n+1)+j-n];
        end;
(5)   opt = optDelta[(M-m+1)*(N-n+1)];
end;
```

FIG.8

```
#define n 6
define W fix<16,4> func main (in : W)   B : W[] =
begin
       (j : 0 .. n-1) ::
       begin
(1)       A[j][0] = in;
          (i : 0 .. n-1) ::
(2)       A[j][i+1] = A[j][i] + W(1);
       end;
       (i : 0 .. n-1) ::
       begin
(3)       alpha[i] = A[i][n+i];
          (j : 0 .. n-1) ::
(4)       A[j][n+i+1] = if (j < i) -> A[j][n+i]
(5)                    || A[j][n+i] + alpha[i]
                        fi;
       end;
(6)    (i : 0 .. n-1) :: B[i] = A[i][2*n];
end;
```

```
(t: 0 .. ∞ )::
begin
  optDelta[t][0] = W(0);

(i: m .. M)::
  (j: n .. N)::
  begin
    Delta[t][i][j][0] = W(0);

(k: i-m .. i+m)::
    (l: j-n .. j+n)::
      Delta[t][i][j][(k-i+m)*(2*n+1)+1-j+n+1] = A[t][i][j]-A[t-1][k][l]
                                              + Delta[t][i][j][(k-i+m)*(2*n+1)+1-j+n];

optDelta[t][(i-m)*(N-n+1)+j-n+1] = Delta[t][i][j][(2*m+1)*(2*n+1)]
                                     + optDelta[t][(i-m)*(N-n+1)+j-n];
  end;

opt[t] = optDelta[t][(M-m+1)*(N-n+1)];
end;
```

*FIG.17*

Delta0 = { x=i , y=j , z=0 | M>=i>=m , N>=j>=n }
Delta1 = { x=i , y=j , z=(2m+1)(2n+1) | M>=i>=m , N>=j>=n }
Delta2 = { x=i , y=j , z=-(2n+1)i+j+(2n+1)k+l+2mn+m+n |
                M>=i>=m , N>=j>=n , m>=k-i>=-m , n>=l-j>=-n } optDelta0 = { x=0 }
optDelta1 = { x=(M-m+1)(N-n+1) }
optDelta2 = { x=(N-n+1)i+j-m(N-n+1)-n | M>=i>=m , N>=j>=n , (N-n+1)i+j >= (N-n+1)m+n+1 }

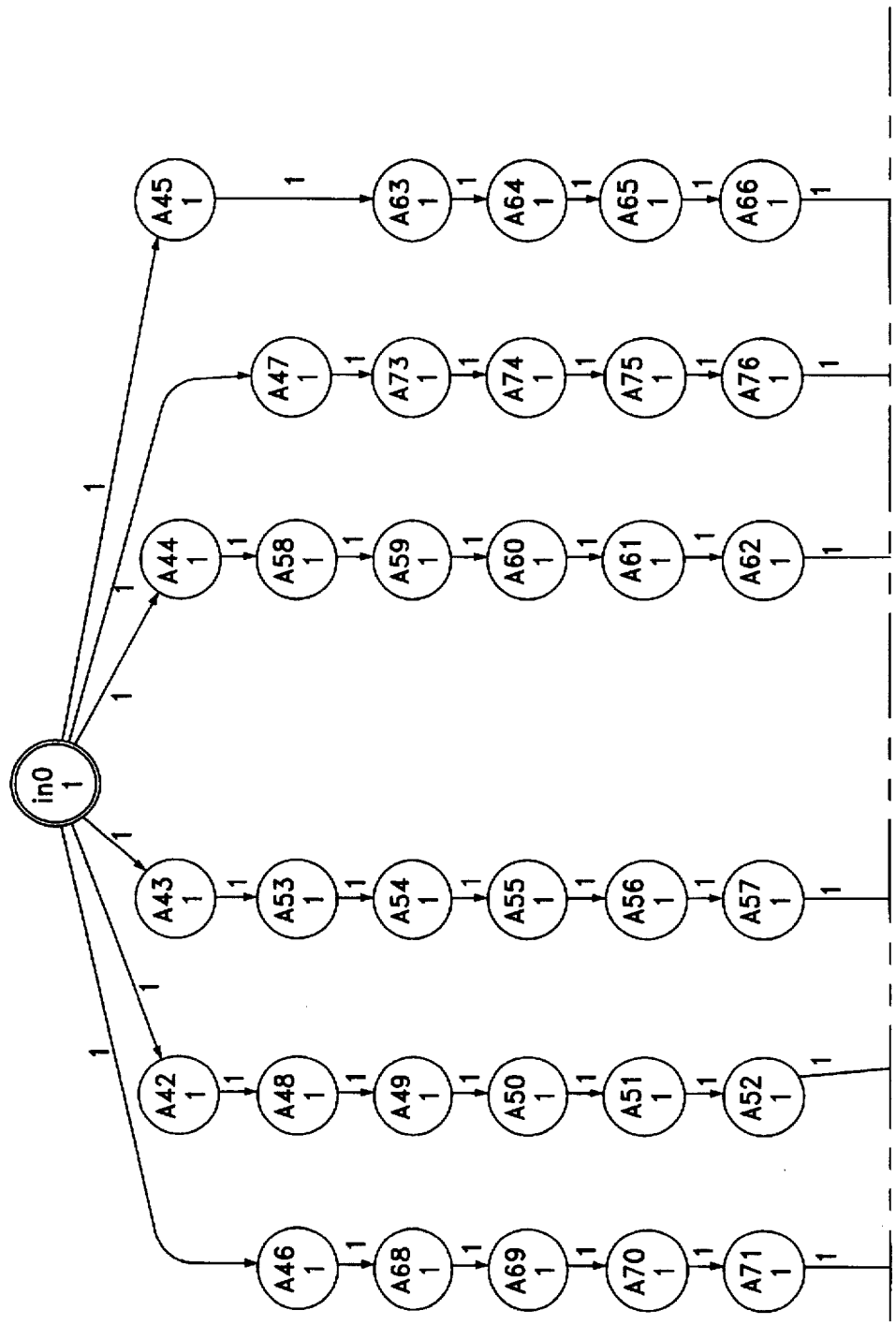

```
define W fix<16,4>

(k: 0 .. 9)::
    begin
        A[2*k] = W(0);        A[2*k+1] = W(1);
    end;

```
func main (in: fix<16,4>) out: fix<16,4>[] =
begin
        A[0] = in ;      A[1] = in ;      A[2] = in ;
        (i: 3 .. 11)::   A[i] = A[i-3] ;
        out[0] = A[9] ;  out[1] = A[10] ;  out[2] = A[11] ;
end;
```

```
A[0] = ... ;
(i:: 1 .. 11):: A[i] = A[i-1] ;
... = A[11] ;
```

```
func main (in: fix<16,4>)  out: fix<16,4>[] =
begin
        A[0] = in ;        A[1] = in ;        A[2] = in ;

(i: 3 .. 9)::      A[i] = A[i-1] + A[i-3] ;

out[0] = A[9] ;
end;
```

```
define W fix<16,4> func main (A: W[M+m+1][N+n+1]) opt: W =
begin
    (i: m .. M)::
        (j: n .. N)::
            begin
(2)             Delta[i][j][0] = W(0);
                (k: i-m .. i+m)::
                    (l: j-n .. j+n)::
(3)                     Delta[i][j][(k-i+m)*(2*n+1)+l-j+n+1] = A[i][j] - A[k][l]@1
                                + Delta[i][j][(k-i+m)*(2*n+1)+l-j+n];
            end;
(1) optDelta[0] = W(0);
    (i: m .. M)::
        (j: n .. N)::
(4)         optDelta[(i-m)*(N-n+1)+j-n+1] = Delta[i][j][(2*m+1)*(2*n+1)]
                    + optDelta[(i-m)*(N-n+1)+j-n];
(5) opt = optDelta[(M-m+1)*(N-n+1)];
end;
```

FIG.31

BACKGROUND MEMORY ALLOCATION FOR MULTI-DIMENSIONAL SIGNAL PROCESSING

BACKGROUND OF THE INVENTION

This application claims priority from United States provisional applications:

Ser. No. 60/007,160, filed Nov. 1, 1995
Ser. No. 60/007,288, filed Nov. 6, 1995.

1. Field of the Invention

The present invention relates to the allocation of the background memory units in the design of real-time multi-dimensional signal processing systems. Mole specifically, the target domain consists of speech, video, image, and graphic processing (multi-media in general) and end-user telecom applications. This involves data-dominated applications dealing with large amounts of data being iteratively processed in the context of potentially irregularly nested loops.

2. Description of the Related Technology

Motivation

In order to perform the miniaturization of consumer electronic systems, there is an ongoing trend towards single-chip integration, especially in the fields of mobile and personal communications, speech and audio processing, video and image processing. Complete electronic systems tend to be integrated as heterogeneous single-chip architectures (see FIG. 6), having as central computation core an application-specific instruction-set processor (ASIP) performing most of the signal processing functions. Specialized data-paths are used to extend in an application-specific way the instruction set of the ASIP core. Very often, the dominating cost in terms of area and power consumption of the signal processing systems is due to the large memory units (RAM's in FIG. 6), in combination with the data transfers between the memories and the processor. Some of these RAM's are typically also situated off-chip as off-the-shelf components.

Applications in our target domain typically handle a large amount of scalars, mainly organized in multi-dimensional (M-D) signals, which consequently requires large memory units. These background memories result in significant area and power consumption cost for real-time multi-dimensional signal processing (RMSP) in most cases dominating the cost of the data-path for a complete system.

Example The transmission of real-time video signals on data networks represents an important application area in communications. For this purpose, the video signals must be compressed by video-coders/decoders to fit in the limited bandwidth of the network. An approximate but effective algorithm uses the idea of motion compensation (see, e.g., E. Chan, S. Panchanathan. "Motion estimation architecture for video compression," *IEEE Trans. on Consumer Electronics*, Vol. 39, pp. 292–297, Aug. 1993).

To estimate motion, the current image frame is divided into small blocks of pixels for which the "old" location in the previous frame is determined. In order to limit the number of comparisons (and, therefore, the required throughput), this search is restricted to an appropriate reference window in the previous frame, having the same center as the current block which is considered (see FIG. 7).

The motion vector is defined as the 2-D distance vector between the center of the current block and the center of the corresponding block in the reference window that best matches the current block. The strategy outlined above allows to transfer only the motion vectors instead of pixels. This results in a large compression of the video signals.

The motion detection algorithm contains multi-dimensional signals with extremely complex indices (see the kernel code in FIG. 8) which have to be stored into memories during signal processing. A software tool cannot handle such an algorithm by simply un-rolling the loops because too many scalar signals would result.

System-level experiments have shown that usually over 50% of the area and power cost in application-specific architectures for real-time multi-dimensional signal processing is clue to memory units, i.e., single or multiport RAM's, pointer-addressed memories, and register files. A 128 kbit embedded SRAM occupies about 115 $mm^2$ in a 1.2 µm CMOS technology, as compared to 5 to 15 $mm^2$ for an entire complex data-path.

Therefore, design support software to determine the storage organization for the multi-dimensional signals is crucial to maintain a sufficiently high design quality in terms of area and power of the system architecture. Furthermore, by focusing on an optimized memory organization in an earlier design phase, it will serve to reduce the overall design time.

Definition of the problem

Given a RMSP algorithm described in a high-level non-procedural language (see in the sequel), containing a large amount of scalars mainly organized in multi-dimensional signals, determine the background memory architecture necessary to store the multi-dimensional signals, optimal in terms of area and, eventually, of power, subject to given throughput constraints. A general view of the target architecture is illustrated in FIG. 9.

More specifically, the problem is to provide answers to the following practical questions:

How many memory units are necessary, and what is their type (RAM/ROM)?

What are their word-lengths and estimated sizes (numbers of locations)?

How many ports and what kind of ports are required for each of the memories?

How many read ports, how many write ports, and read/write ports?

How are the multi-dimensional signals assigned to these memory units (modules)?

Different from past approaches, requiring that detailed operation scheduling has been previously performed, our formulation disregards this restricting requirement, tackling the problem under snore general conditions.

Context of the proposed methodology

Currently, due to design time constraints, the system designer has to select a single promising path in the huge decision tree from an abstract specification to the memory organization. Decisions concerning the algorithm selection, the algorithm representation in terms of loop organization, the levels of memory hierarchy, the computation and memory-related operation ordering, the organization of signals into memory units, have a great impact on the global chip area, performance, and power of the system. To alleviate this situation, there is a natural need for design space exploration at a high level, to ensure a fast and early feedback at the algorithm level, i.e., without going all the way to layout.

For many of the targeted applications, where memory is 'the dominating resource, the general strategy employed in the traditional high-level synthesis systems—imposing a strict precedence between scheduling and storage management—typically leads to costly global solutions,'as the search space for memory optimization becomes heavily constrained after scheduling. Manual experiments carried out on several test-vehicles, such as autocorrelation computation, singular value decomposition, solving Toeplitz systems, have shown that memory management decisions, taken before scheduling, can significantly reduce the background memory cost, while the freedom for data-path allocation and scheduling remains almost unaffected.

In our methodology (realized in a design script), it has been decided to initially optimize the high-level storage organization for the multi-dimensional signals because of this storage and transfer dominance in the system cost when data-dominated subsystems are present (see M. Van Swaaij, F. Franssen, F. Catthoor, H. De Man, "High-level modeling of data and control flow for signal processing systems," in *Design Methodologies for VLSI DSP Architectures and Applications*, M. Bayoumi (ed.) Kluwer, 1993). This high-level memory management stage is fully complementary to the traditional high-level synthesis step known as "register allocation and assignment" (see, for instance, I. Ahmad, C. Y. R. Chen, "Post-processor for data path synthesis using multiport memories," *Proc. IEEE Int. Conf. Comp.-Aided Design*, pp. 276–279, Santa Clara, Calif., Nov. 1991) which deals with individual storage places for scalars in registers or register files, after scheduling. Part of this effort is also needed in the context of our global system synthesis environment, but this decision on scalar memory management is postponed to a lower level data-path mapping stage.

We assume that the initial specification is provided in an applicative (single-assignment, nonprocedural) language such as Silage (see P. N. Hilfinger, J. Rabaey, D. Genin, C. Scheers, H. De Man, "DSP specification using the Silage language," *Proc. Int. Conf. on Acoustics, Speech, and Signal Processing*, pp. 1057–1060, Albuquerque N.M., April 1990): besides the natural production-consumption order imposed by the dependence relations existent in the source code, there is a total freedom left in terms of execution ordering. This can be exploited by the designer to meet specific goals—for instance, to profit from the parallelism "hidden" in the code to comply with a high throughput requirement. The designer can adopt, in general, a higher-level view when conceiving the behavioral specification, thus focusing more on the mathematical model rather than on implementation details. The nonprocedural source code is often more compact (e.g., the dynamic programming algorithm), avoiding any artificial split of the indexed signals—necessary only to ensure a correct production-consumption order.

A prerequisite of the language nonprocedurality is the compliance with the single-assignment rule: any scalar (simple signal, or instance of an indexed signal) can be assigned (produced) only once in the whole program. Therefore, the concept of variables is not present in Silage.

State-of-the-art

The first techniques dealing with the allocation of storage units were scalar-oriented and employed a scheduling-directed view—the control steps of production and consumption for each scalar signal being determined beforehand. This strategy was mainly due to the fact that applications targeted in conventional high-level synthesis contain a relatively small number of signals (at most of the order of magnitude $10^3$). The control and data-flow graphs addressed are mainly composed of potentially conditional updates of scalar signals. Therefore, as the major goal is typically the minimization of the number of registers for storing scalars, the scheduling-driven strategy is well-suited to solve a register allocation problem, rather than a background memory allocation problem.

The problem of optimizing the register allocation in programs at register-transfer (RT) level was initially formulated in the field of software compilers (see A. V. Aho, R. Sethi, J. D. Ullman, *Compilers—Principles, Techniques, and Tools*, Addison-Wesley, Reading Mass., 1986, section 9.7), aiming at a high-quality code generation phase. The problem of deciding what values in a program should reside in registers (allocation) and in which register each value should reside (assignment) has been solved by a graph coloring approach. As in the code generation, the register structure of the targeted computer is known, the k-coloring of a register-interference graph (where k is the number of computer registers) can be systematically employed for assigning values to registers and managing register spills. When a register is needed for a computation, but all available registers are in use, the content of one of the used registers must be stored, or spilled into a memory (storage) location, thus freeing a register.

In the field of synthesis of digital systems, starting from a behavioral specification, the register allocation was first modeled as a clique partitioning problem (see C. J. Tseng, D. Siewiorek, "Automated synthesis of data paths in digital systems," *IEEE Trans. on Comp.-Aided Design*, Vol. CAD-5, No. 3, pp. 379–395, July 1986). Similarly, the problems of operator and bus allocation have been formulated as clique partitioning problems. Though Tseng and Siewiorek mention formation of memories by grouping several registers (again using clique partitioning on a graph formed by access requirements of registers), they do not consider multiport memory modules, and they do not take into account the effect of interconnections.

In the MIMOLA system (see P. Marwedel, "The MIMOLA design system: tools for the design of digital processors," *Proc. 21st ACM/IEEE Design Automation Conf.*, pp. 587–593, June 1984), the registers were assigned to multiport memories based on simultaneous access requirements, but no formal methodology is indicated. Other synthesis systems place the responsibility of specifying the storage units—registers, register files, (multiport) memories—on the designer.

The register allocation problem has been solved for nonrepetitive schedules, when the life-time of all scalars is fully determined (see F. J. Kurdahi, A. C. Parker, "REAL: A program for register allocation," *Proc. 24th ACM/IEEE Design Automation Conf.* pp. 210–215, June 1987). The similarity with the problem of routing channels without vertical constraints has been exploited in order to determine the minimum register requirements, and to optimally assign the scalars to registers in polynomial time. A non-optimal extension for repetitive and conditional schedules has been proposed in G. Goossens, *Optimization Techniques for Automated Synthesis of Application-specific Signal-processing Architectures*, Ph.D. thesis, K. U. Leuven, Belgium, 1989. Employing circular graphs, Stok (see L. Stok, J. Jess, "Foreground memory management in data path synthesis", *Int. Journal on Circuit Theory and Appl.*, Vol. 20, pp. 235–255, 1992) and Parhi (see K. K. Parhi, "Calculation of minimum number of registers in arbitrary life time chart," *IEEE Trans. on Circuits and Systems—II: Analog and Digital Signal Processing*, Vol. 41, No. 6, pp. 434–436, June 1994) proposed optimal register allocation solutions for repetitive schedules.

The first well-known automated allocation/assignment for multiport memories has been reported in M. Balakrishnan, A. K. Majumdar, D. K. Banerji, J. G. Linders, J. C. Majithia, "Allocation of multiport memories in data path synthesis," *IEEE Trans. on Comp.-Aided Design*, Vol. CAD-7, No. 4, pp. 536–540, April 1988. The guiding idea of the method is that grouping registers into multiport memories entails the reduction of the chip area This results from reduction in interconnections, multiplexers, and multiplexer inputs in the generated data-path. Assuming the detailed schedule at register-transfer level is given, the problem is modeled as a 0–1 integer linear programming.

A more refined allocation/assignment model has been introduced in I. Ahmad, C. Y. R. Chen, "Post-processor for data path synthesis using multiport memories," *Proc. IEEE Int. Conf Comp.-Aided Design*, pp. 276–279, Santa Clara Calif. Nov. 1991. Different from the previous approach—where the registers are clustered iteratively, Ahmad and Chen proposed a simultaneous merging of registers into multiport memories of specified port configuration. A similar ILP allocation and assignment model was proposed in M. Schönfeld, M. Schwiegershwausen, P. Pirsch, "Synthesis of intermediate memories for the data supply to processor arrays," in *Algorithms and Parallel Architectures II*, P. Quinton, Y. Robert (eds.), Elsevier, Amsterdam, pp. 365–370, 1992—where the final number of memory modules is considered initially unknown.

These scalar-oriented methods, driven by the RT level scheduling, allow simultaneous solutions for the related problems of allocation, signal-to-memory and signal-to-port assignments. However, the size of the problems handled is drastically limited by the capabilities of the commercial ILP packages as, e.g., LINDO, LAMPS.

Different from the ILP methods—where the clustering of registers into memories is followed by the optimization of the interconnection hardware (buses, multiplexers, buffers), Rouzeyre and Sagnes proposed a simultaneous optimization of all components of the memory-related chip area (see B. Rouzeyre, G. Sagnes, "A new method for the minimization of memory area in high level synthesis", *Proc. Euro-ASIC Conf.*, pp. 184–189, Paris, France, May 1991). The techniques employed are based on clique partitioning and maximum flow determination in bipartite graphs.

The SMASH system—developed at the University of Southern California (see P. Gupta, A. Parker, "SMASH: A program for scheduling memory-intensive application-specific hardware," *Proc. 7th Int'l Symposium on High-Level Synthesis*. May 1994)—targets hierarchical storage architectures: the on-chip foreground memory consists of I/O buffers which interface to the off-chip background memory and data-path registers. The system assumes a certain degree of user interactivity (e.g., the number of R/W ports on the off-chip memory is indicated by the user). The two-level memory synthesis follows the scheduling of operations, of data transfers to or from I/O buffers, and data transfers between the two levels of memory hierarchy.

All these scalar-oriented approaches are not effective for video and image processing applications, as they lead to ILP or clique partitioning problems impossible to solve. Memory allocation for behavioral specifications containing indexed signals has only recently gained attention in the DSP community. Moreover, as code reorganization can dramatically change the storage requirements (see M. Van Swaaij 93, ibidem), the nonprocedural interpretation of the specification adds supplementary degrees of freedom which should be exploited to reduce the cost.

More recently, novel models started to address also array signals with nonscalar-oriented approaches. The CATHEDRAL system developed at IMEC (see, e.g., H. De Man, F. Catthoor, G. Goossens, J. Vanhoof, J. Van Meerbergen, S. Note, J. Huisken "Architecture-driven synthesis techniques for mapping digital signal processing algorithms into silicon," special issue on *Computer-Aided Design of Proc. of the IEEE*, Vol. 78, No. 2, pp. 319–335, Feb. 1990) handles behavioral specifications in Silage (see P. N. Hilfinger et al., ibidem), a nonprocedural language well-suited for multi-dimensional signal processing. However, the memory management is done partly manually, the memory-related tools interpret procedurally the source code of the specification based on life-time analysis.

The PHIDEO system developed at Philips, introduced the stream concept (see P. Lippens, J. van Meerbergen, A. van der Werf, W. Verlhaegh, B. McSweeney, J. Huisken, O. McArdle, "PHIDEO: A silicon compiler for high speed algorithms," *Proc. European Design Autom. Conf.*, pp. 436–441, Feb. 1991) in order to handle specifications containing indexed signals, especially oriented to regular video processing. By means of a more refined hierarchical stream model (P. Lippens, J. van Meerbergen, W. Verhaegh, A. van der Werf, "Allocation of multiport memories for hierarchical data streams," *Proc. IEEE Int. Conf. Comp.-Aided Design*, Santa Clara Calif., pp. 728–735, Nov. 1993), the system can handle M-D signals with complex affine indices but only within nested loops having constant boundaries. The allocation strategy is a two-step approach, where the nonprocedural code is first scheduled. Afterwards, the actual allocation tool MEDEA employs a merging technique steered by interconnection costs. Therefore, the memory allocation is actually solved for a fixed procedural specification.

The MeSA system (see C. Ramachandran, F. Kurdahi, D. D. Gajski, V. Chaiyakul, A. Wu, "Accurate layout area and delay modeling for system level design," *Proc. IEEE Int. Conf. Comp.-Aided Design*, pp. 355–361, Santa Clara Calif., Nov. 1992), developed at UC Irvine, employs the idea of variable clustering, encountered in many scalar-oriented approaches. The difference is that merging is applied to arrays rather than to scalars. The array clustering is carried out steered by both the estimated chip area and by the expected speed performance. The main drawback is that life-time information is totally neglected for reducing the storage requirements.

The existent synthesis systems do not solve the memory management of M-D signals in non procedural specifications. Although some systems, as Phideo (Philips), possess code reordering capabilities, (see, for instance, P. Lippens, ibidem), their strategy is scheduling-driven, the operation ordering being fixed before carrying out any of the memory management tasks.

Moreover, none of the existent synthesis systems can handle the entire class of "affine" specifications, i.e., multi-dimensional signals with (complex) affine indices within loop nests having (complex) affine boundaries, and within the scope of conditions depending on relational and logical operators of affine functions (see, for instance, I. Verbauwhede, C. Scheers, J. M. Rabaey, "Memory estimation for high level synthesis," *Proc. 31st Design Automation Conference*, pp. 143–148, San Diego Calif., June 1994).

The novel background memory allocation methodology (see F. Balasa, F. Catthoor, H. De Man, "Dataflow-driven memory allocation for multi-dimensional signal processing systems," *Proc. IEEE Int. Conf. on Comp.-Aided Design*, pp. 31–34, San Jose Calif., Nov. 1994) is mainly targeting applications where background memory is a dominating resource. In order to allow more exploration freedom in the design space, the novel strategy assumes that operation scheduling is still not decided, complying therefore with the script of CATHEDRAL—the high-level synthesis system developed at IMEC. The proposed steering mechanism for carrying out the memory management for nonprocedural RMSP algorithms is data-flow analysis. The novel methodology covers the entire class of "affine" specifications (see F. Balasa, "Background memory allocation for multidimensional signal processing." *Ph.D. thesis*, IMEC, K. U. Leuven, Nov. 1995, which is incorporated by reference).

Doing a sufficiently accurate memory size allocation irrespective of an operation ordering, and when flattening is impractical, requires more data-flow information, as the structure and number of dependences between different parts of the array references, than the existence of dependences between array references. Basing the decisions only on the existence of data dependences at array reference level can lead to an important over-allocation of memory. This motivates the necessity of carrying out the data-flow analysis not at the level of array references—as in code restructuring (see, e.g., U. Banerjee, R. Eigenmann, A. Nicolau, D. A. Padua, "Automatic program parallelization," *Proc. of the IEEE*, Vol. 81, No. 2, 1993)—but at the level of their distinct polyhedral components common to sets of array references (see F. Balasa, F. Catthoor, H. De Man, "Background memory area estimation for multi-dimensional signal processing systems," *IEEE Trans. on VLSI Systems*, Vol. 3, No. 2, pp. 157–172, June 1995).

SUMMARY OF THE INVENTION

The illustrated embodiment of the present invention addresses the problems of estimation and allocation of the background memory for real-time multi-dimensional signal processing. In order to handle both procedural and nonprocedural specification, the novel technique is based on an optimization process driven by data-flow analysis. This steering mechanism allows more exploration freedom than the more restricted scheduling-based investigation in current approaches, which usually start from a procedurally-interpreted description. In contrast to prior scalar-oriented memory allocation systems which could hardly handle applications with more than a few hundred scalar signals, the present polyhedral model is capable of handling multi-dimensional signal processing applications with up to a few million scalars.

The novel allocation method can accurately deal with single-assignment behavioral specifications, containing large multi-dimensional signals, by means of an original polyhedral model of data-flow analysis—presented in the illustrated embodiment of the invention. The behavioral specifications handled contain loop nests having as loop boundaries—affine functions of the surrounding loop iterators, conditions whether data-dependent or not, (delayed) M-D signals with complex affine indices. The data-flow model can be extended in order to handle more general specifications, e.g., containing M-D signals with affine indices modulo a constant, or having continuous piecewise-affine index functions.

As described in the illustrated embodiment of the invention, the background memory allocation is modeled as a global optimization problem, which minimizes the estimated storage area in silicon, while complying with imposed performance and partial ordering constraints. The data-flow driven allocation can be extended in order to deal with more complex cost functions based on area and power models for on-chip memories. The result of the background memory allocation consists of a distributed (multiport) memory architecture with fully-determined characteristics, having a minimal total area, and complying with a given clock cycle budget for read/write operations.

The assignment of the multi-dimensional signals to the memory modules is performed such that the global increase of silicon area relative to the optimal allocation solution is minimum. Two techniques are described in the illustrated embodiment of the invention. The first one works heuristically, constructing an initial valid assignment solution which is, subsequently, improved iteratively. The second solution is based on modeling the assignment as a binary quadratic programming problem, and solving it with a novel approximative method which can provide reasonably good solutions for much larger examples than can be handled by the current integer linear programming (ILP) based approaches. Moreover, this optimization technique requires a lows implementation effort, as it can intensively employ any commercially available mixed ILP solver, and it does not require any constraint concerning the convexity of the cost function as for most quadratic optimization methods.

The current invention can handle very large signal processing applications, involving many loop nests and M-D signals. It has been extensively tested on several realistic RMSP applications as, for instance, a singular value decomposition updating algorithm for use in spatial division multiplex access (SDMA) modulation in mobile communication receivers (from the K. U. Leuven), a medical 2-D image reconstruction for computer tomography from Siemens, a video interlacing subsystem from Siemens, a motion estimation application from the MPEG2 video coding standard, as well as an audio decoding application from Philips. The good results obtained have clearly proven the effectiveness of the background memory allocation methology, as well as the usefulness of the present invention.

BRIEF DESCRIPTION OF THE DRAWINGS

FIG. 7 shows the principle of a motion detection algorithm.

FIG. 8 displays a part of the Silage code extracted from a motion detection algorithm.

FIG. 10 displays an illustrative Silage code containing loop nesting typical of a signal processing application.

FIG. 17 displays a part of Silage code of the motion detection algorithm, with explicit extension for the time dimension.

(a) for the first loop) level expansion, and (b) for the second loop level expansion.

Figure 20A:
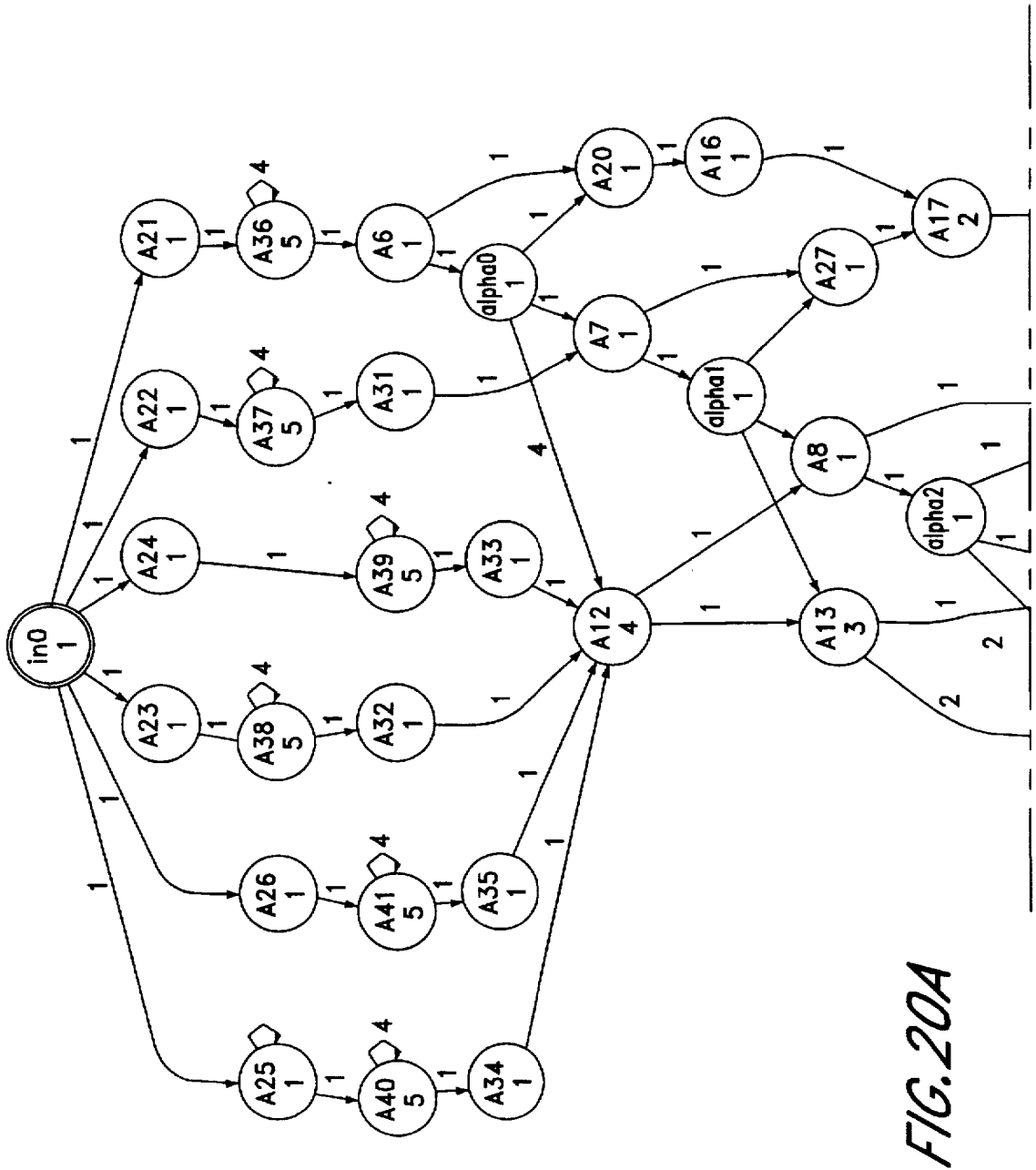
Figure 20B:
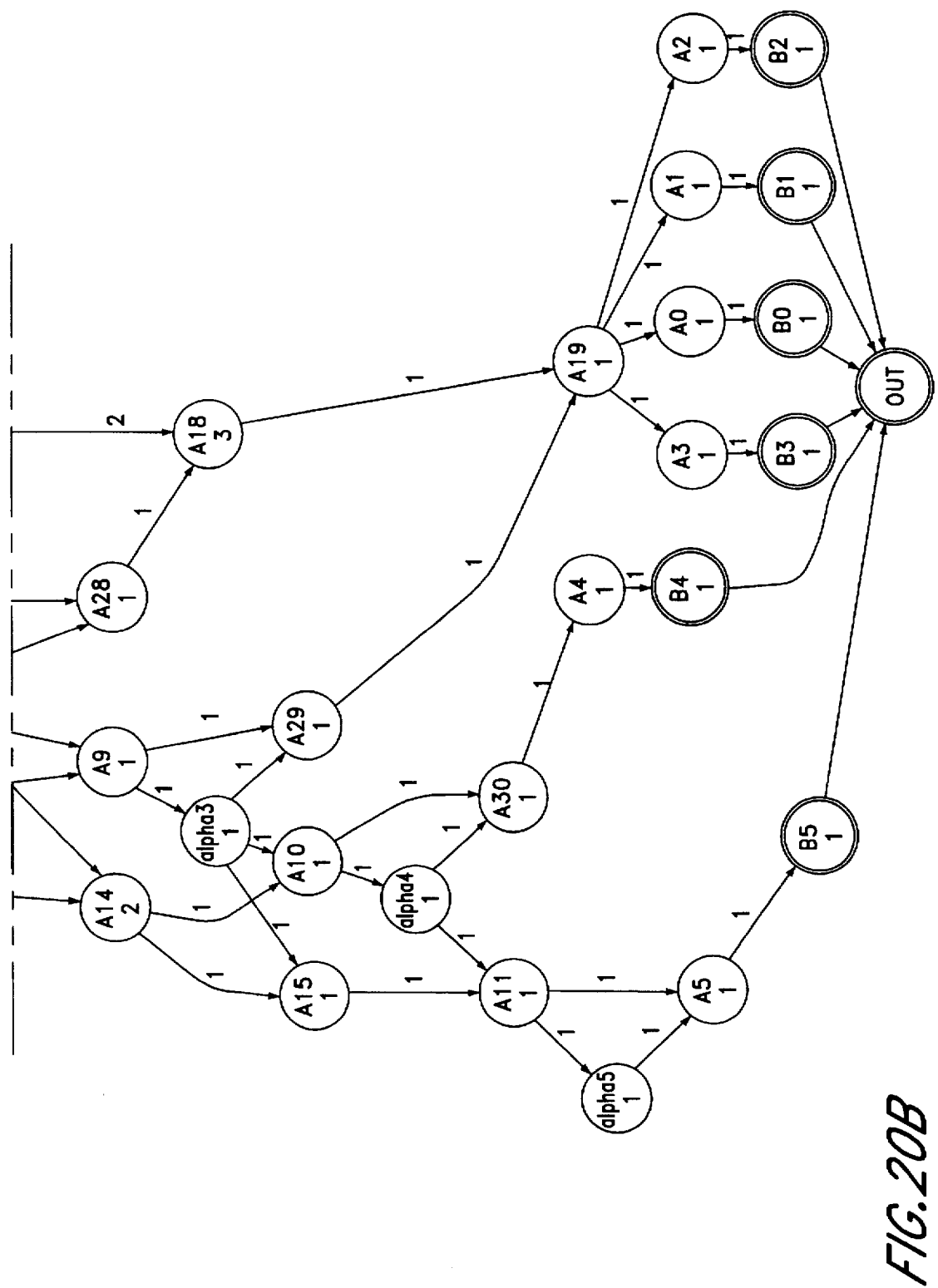

FIG. 20 shows the data-flow graph for the example in FIG. 10 (n=6) for the granularity level 1 (expansion one loop level).

Figure 21B:
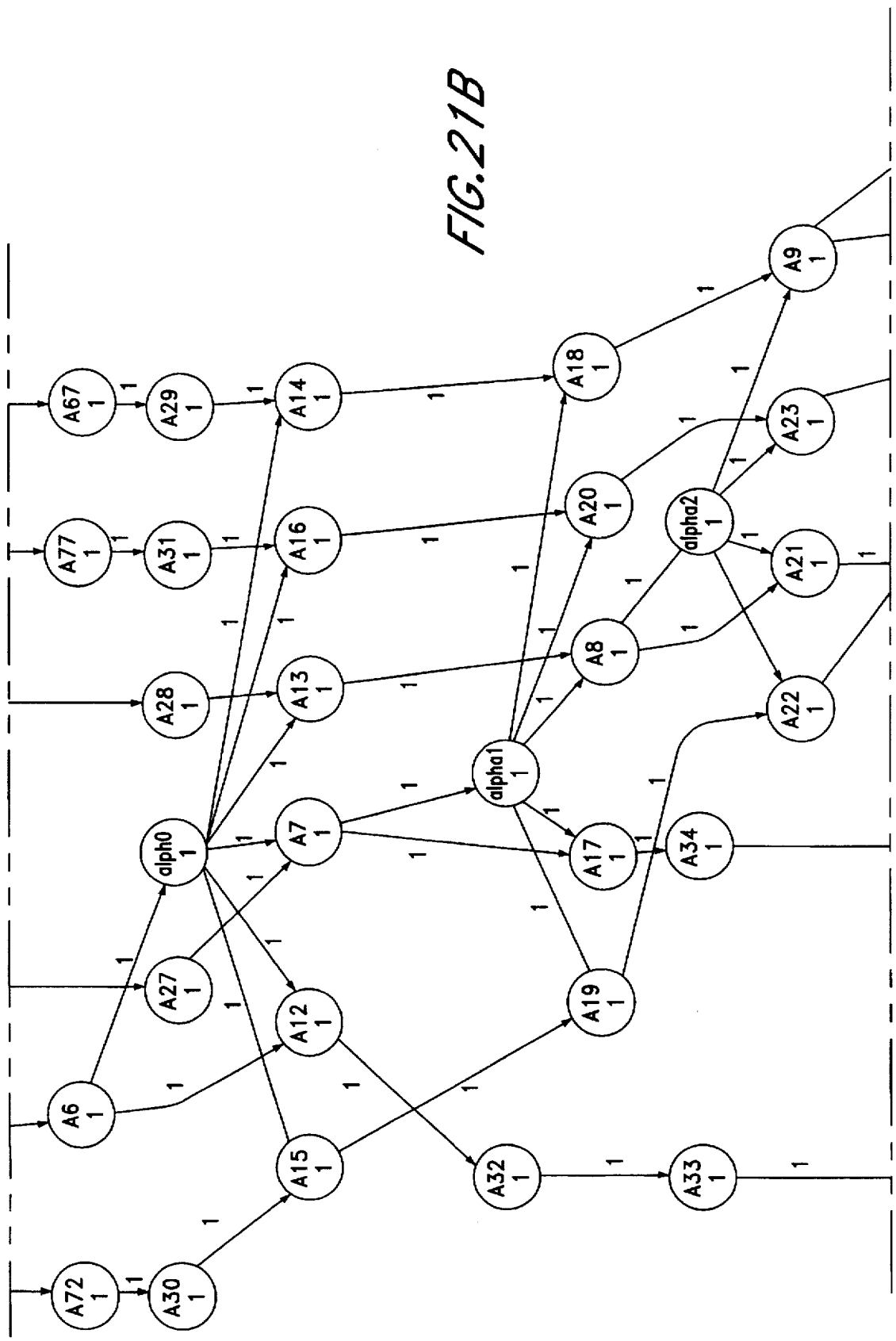
Figure 21C:
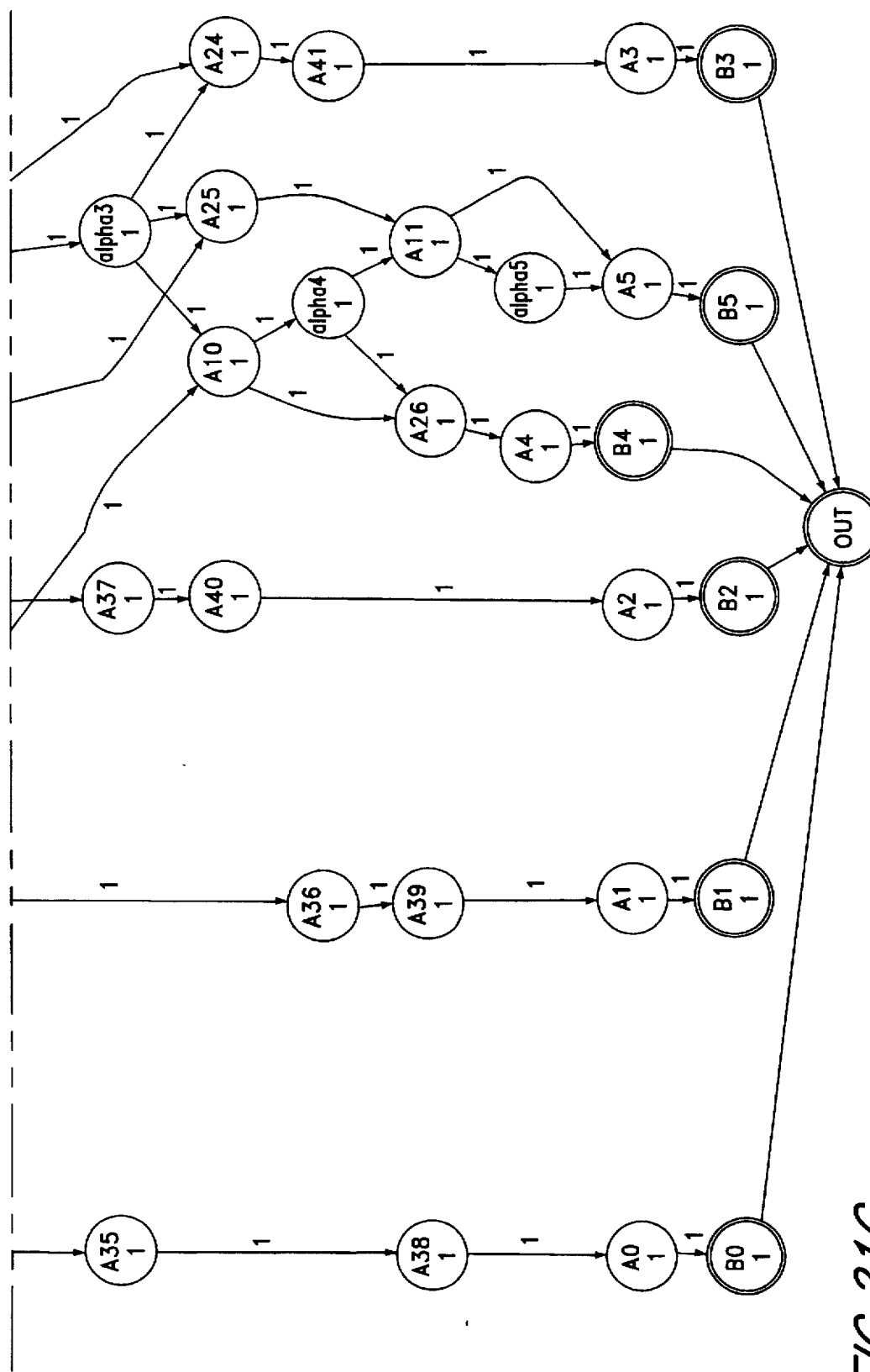

FIG. 21 shows the data-flow graph for the example in FIG. 10 (n=6) for the granularity level 2 (the scalar level).

FIG. 22 displays a short Silage code illustrating memory lower- and upper-bounds.

FIG. 23 displays the equivalent procedural Silage code requiring an absolute minimum storage.

FIG. 24 displays the equivalent procedural Silage code requiring a maximal minimum storage.

FIG. 25 shows different types of production of basic sets in a data-flow graph.

Figure 26A:
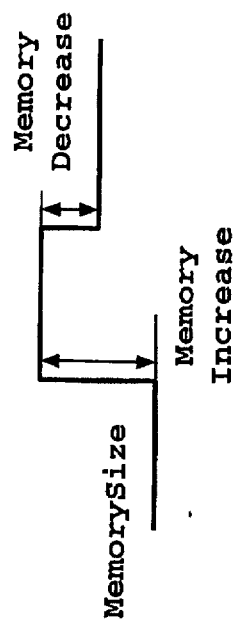

FIG. 26 exemplifies the variation of the memory size when a basic set is produced.

Figure 27:
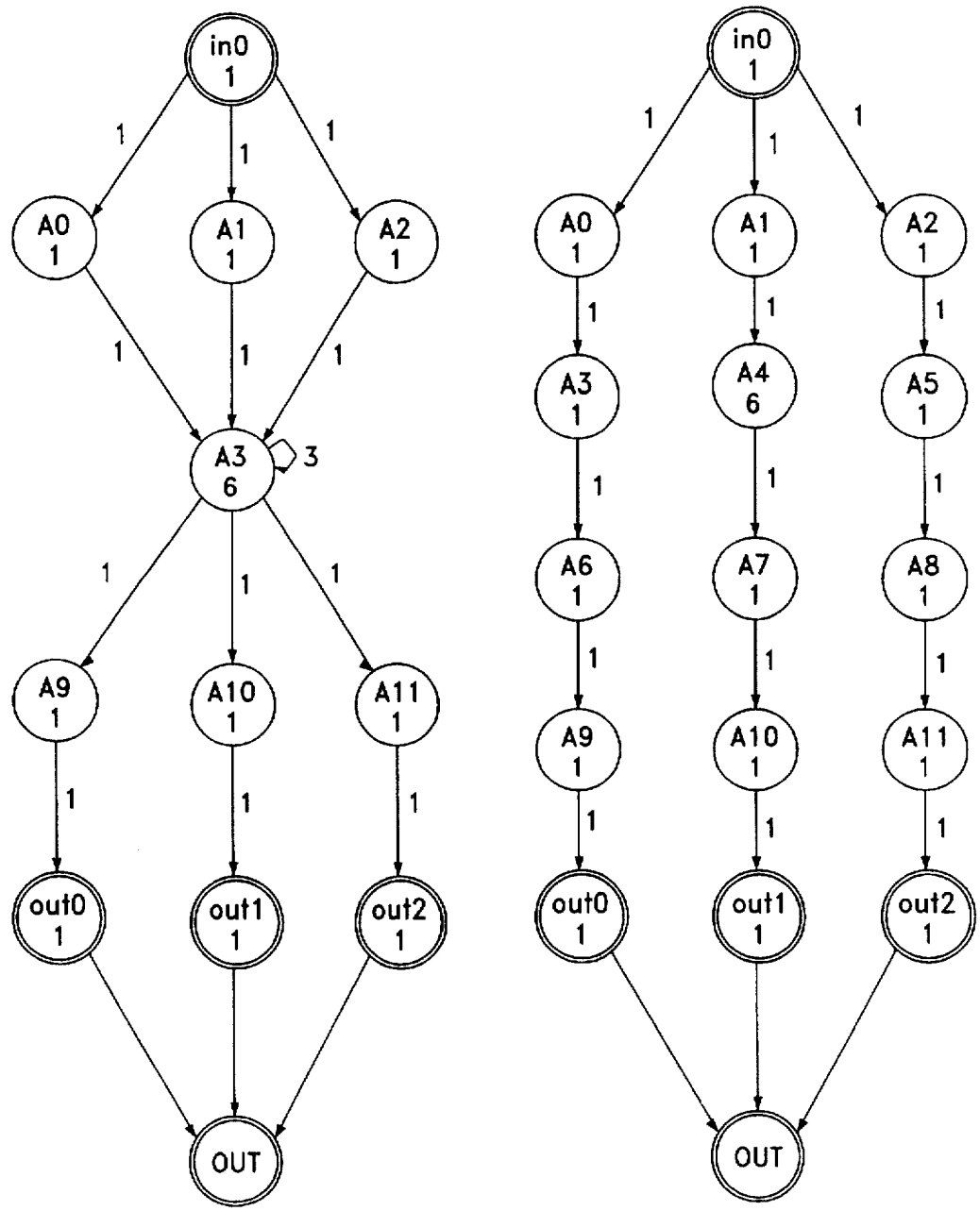

FIG. 27 shows a data-flow graph with self-dependence arc, which is expanded one loop level afterwards.

Figure 28:
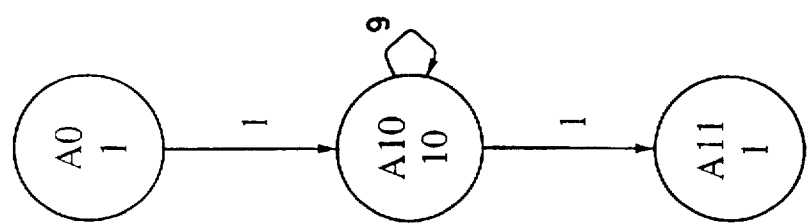

FIG. 28 shows a simpler data-flow graph with self-dependence arc.

Figure 29:
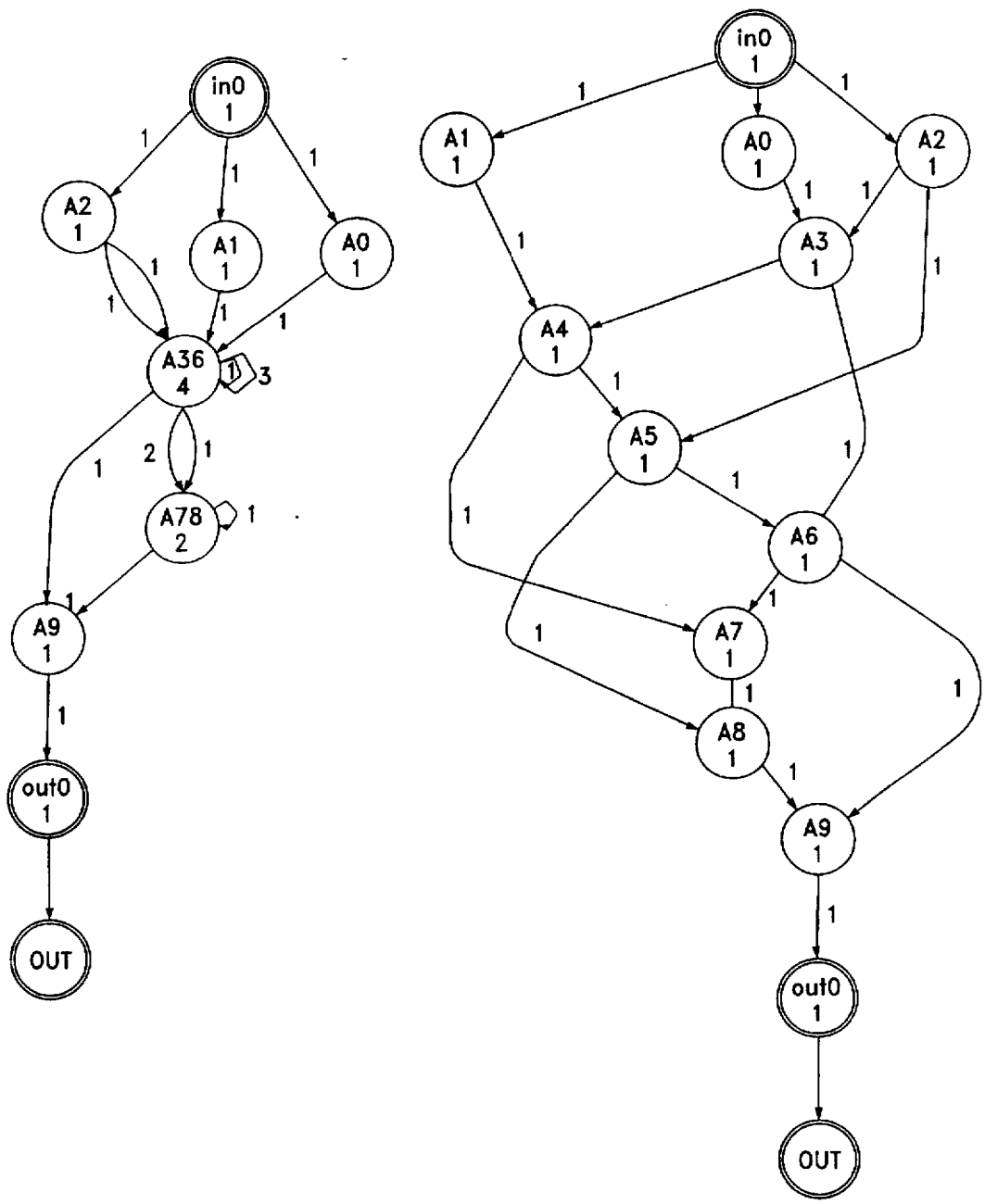

FIG. 29 shows a data-flow graph with several self-dependence arcs, which is expanded one loop level afterwards.

Figure 30:
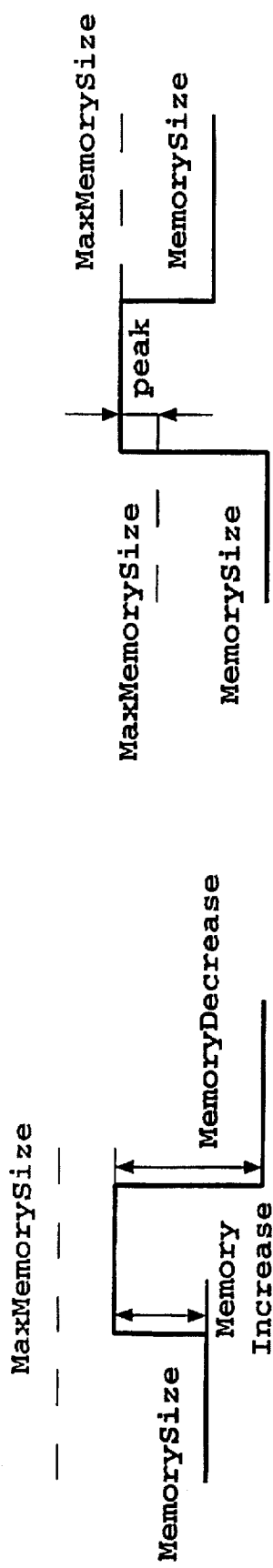

FIG. 30 exemplifies the variation of the memory size during the data-flow graph traversal, where the x-axis represents execution time and the y-axis represents memory size.

FIG. 31 shows the equivalent Silage code of the motion detection kernel in FIG. 8, compatible with the data-flow graph traversal algorithm.

Figure 32:
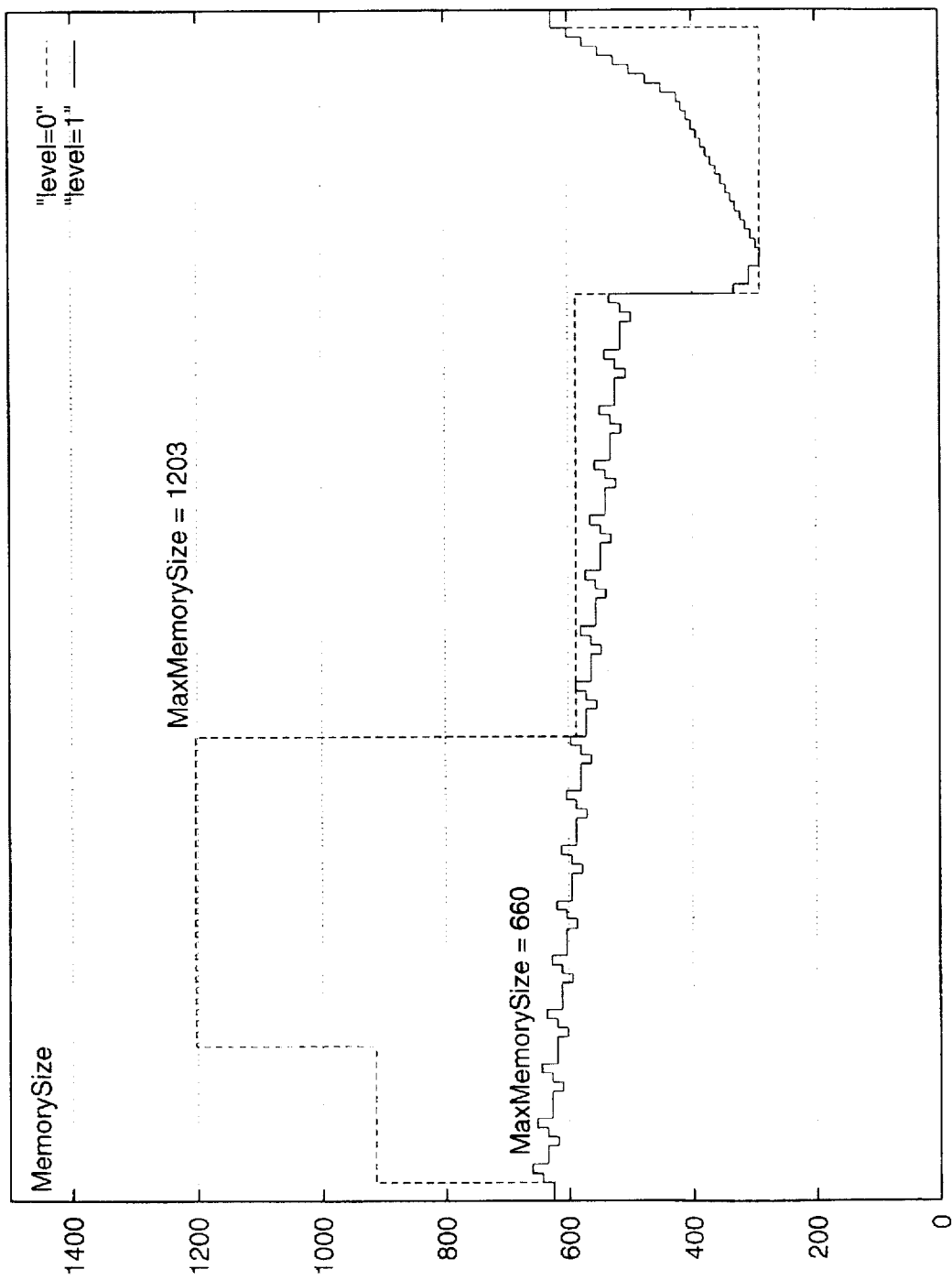

FIG. 32 traces the memory size during the DFG's traversals for the Silage code in FIG. 8 (granularity levels 0 and 1).

Figure 33:
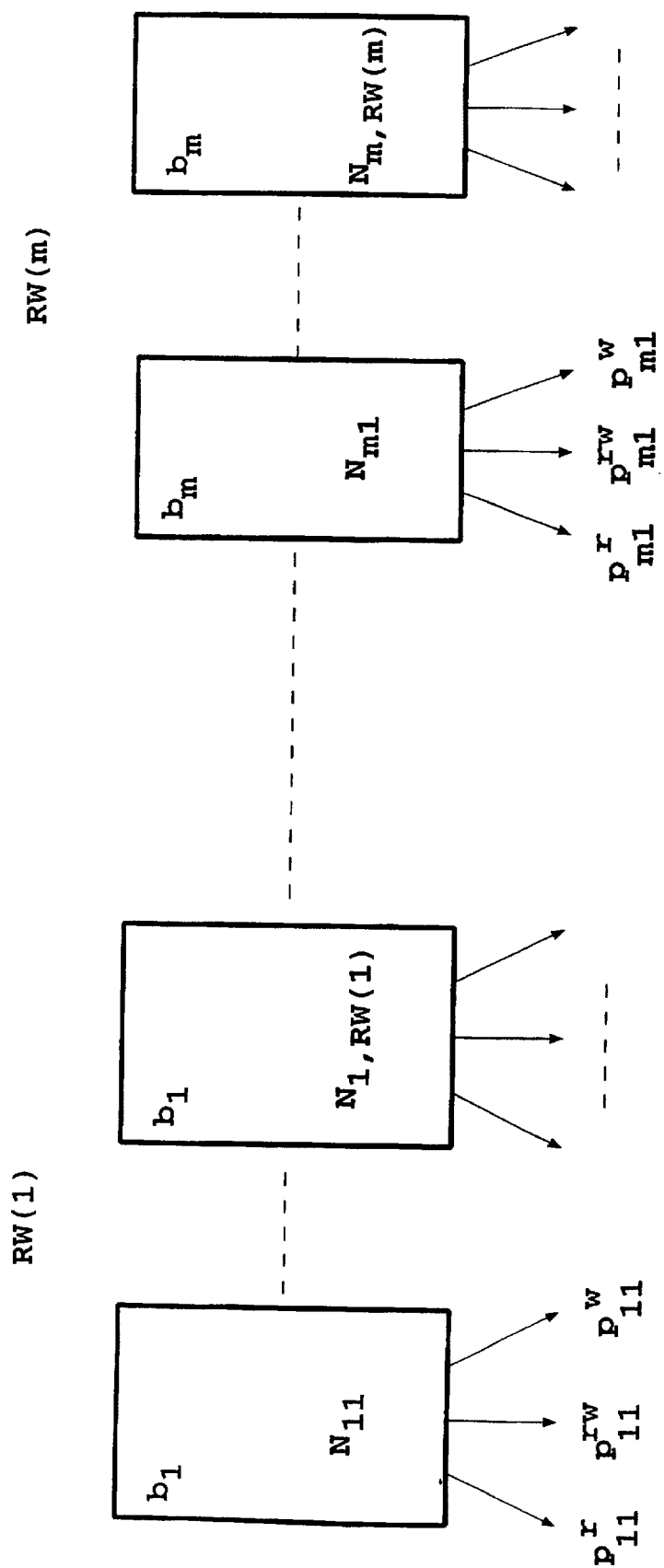

FIG. 33 presents the intuitive model of distributed memory allocation, where each block represents a memory module having (disregarding the subscripts) the size equal to N locations, the word-length of b bits and the read, write, and read/write ports equal to $p^r$, $p^w$, and $p^{rw}$.

Figure 34:
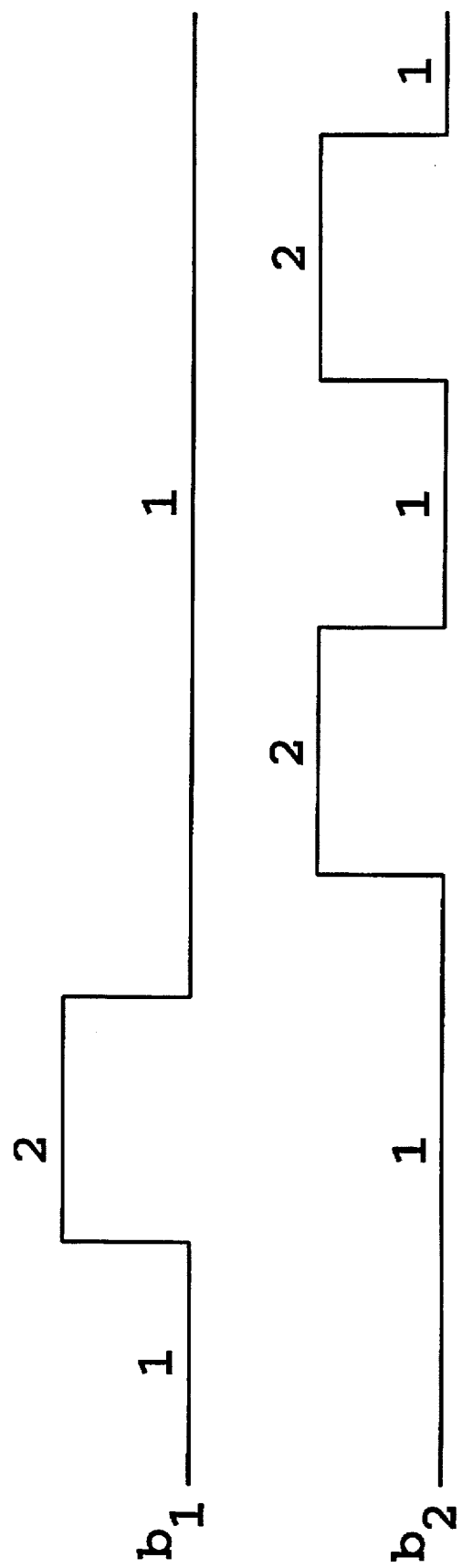

FIG. 34 exemplifies a sequence of simultaneous read accesses for two M-D signals with different word-lengths (of 61 and 62 bits), where the x-dimension is time and the y-dimension is number of reads and writes.

Figure 35:
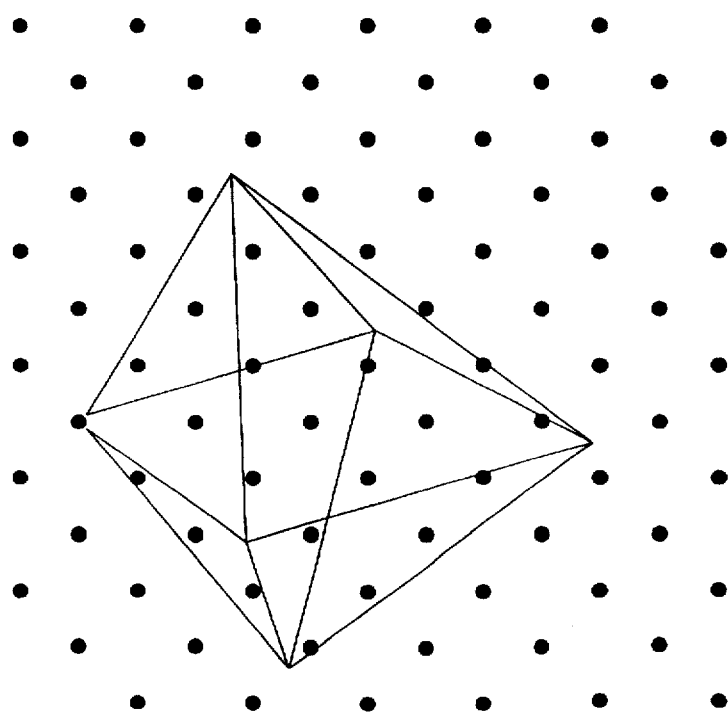

FIG. 35 shows a "port" polytope: in every lattice point of it, a (linear) programming problem has to be solved.

Figure 36:
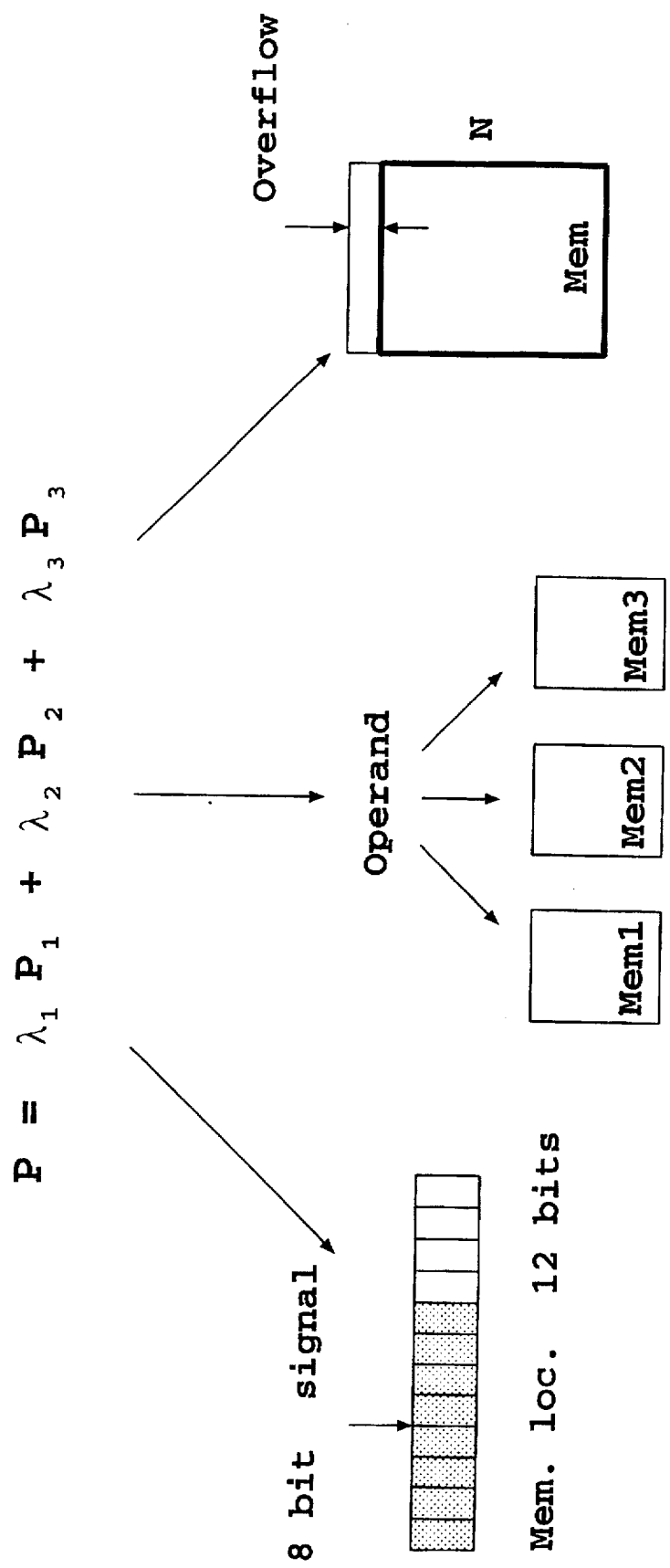

FIG. 36 shows the assignment factors implying an overhead of the memory area.

Figure 37:
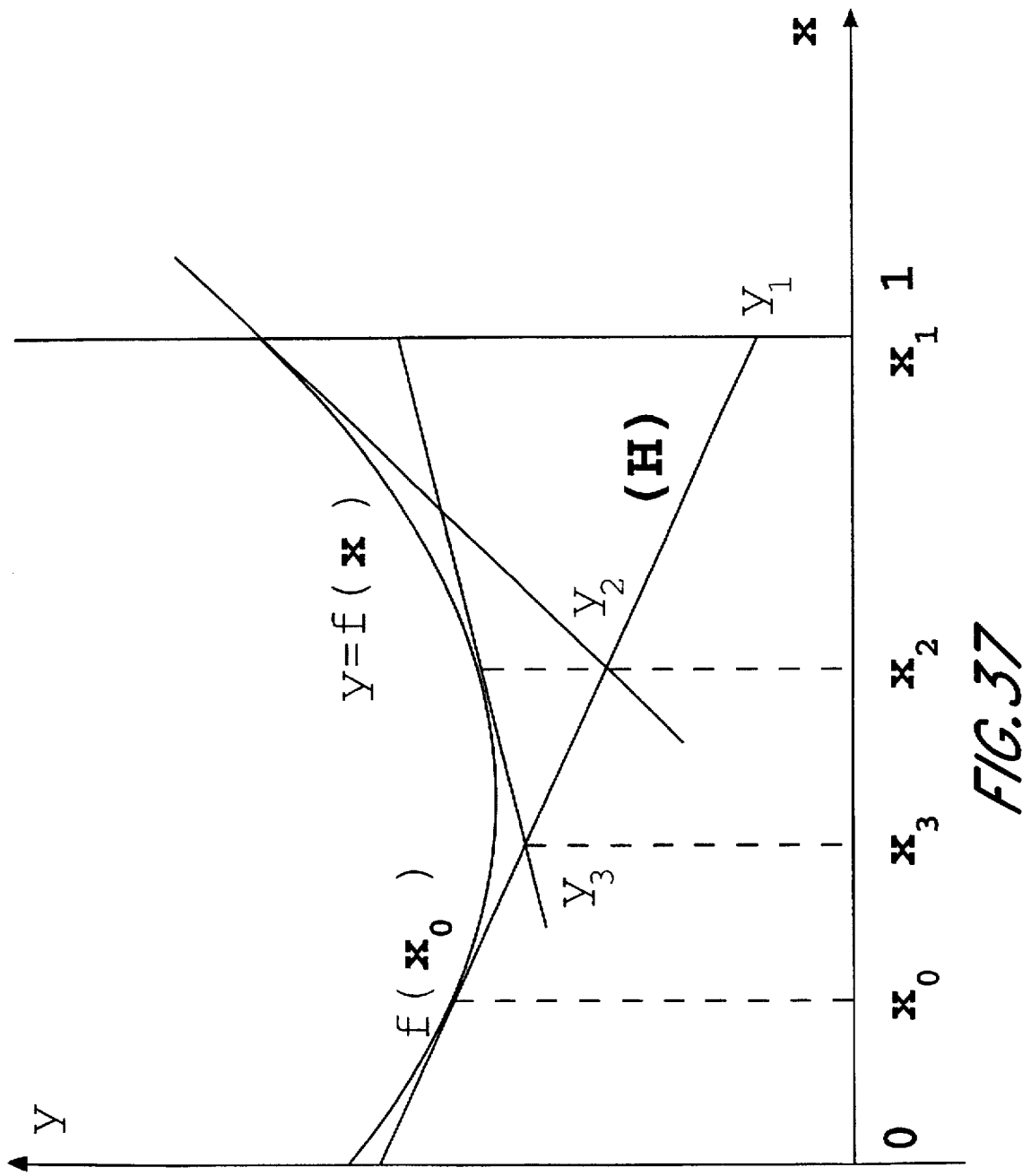

FIG. 37 presents a geometrical interpretation for solving the relaxed quadratic programming problem.

DESCRIPTION OF THE PREFERRED EMBODIMENT

Figure 1:
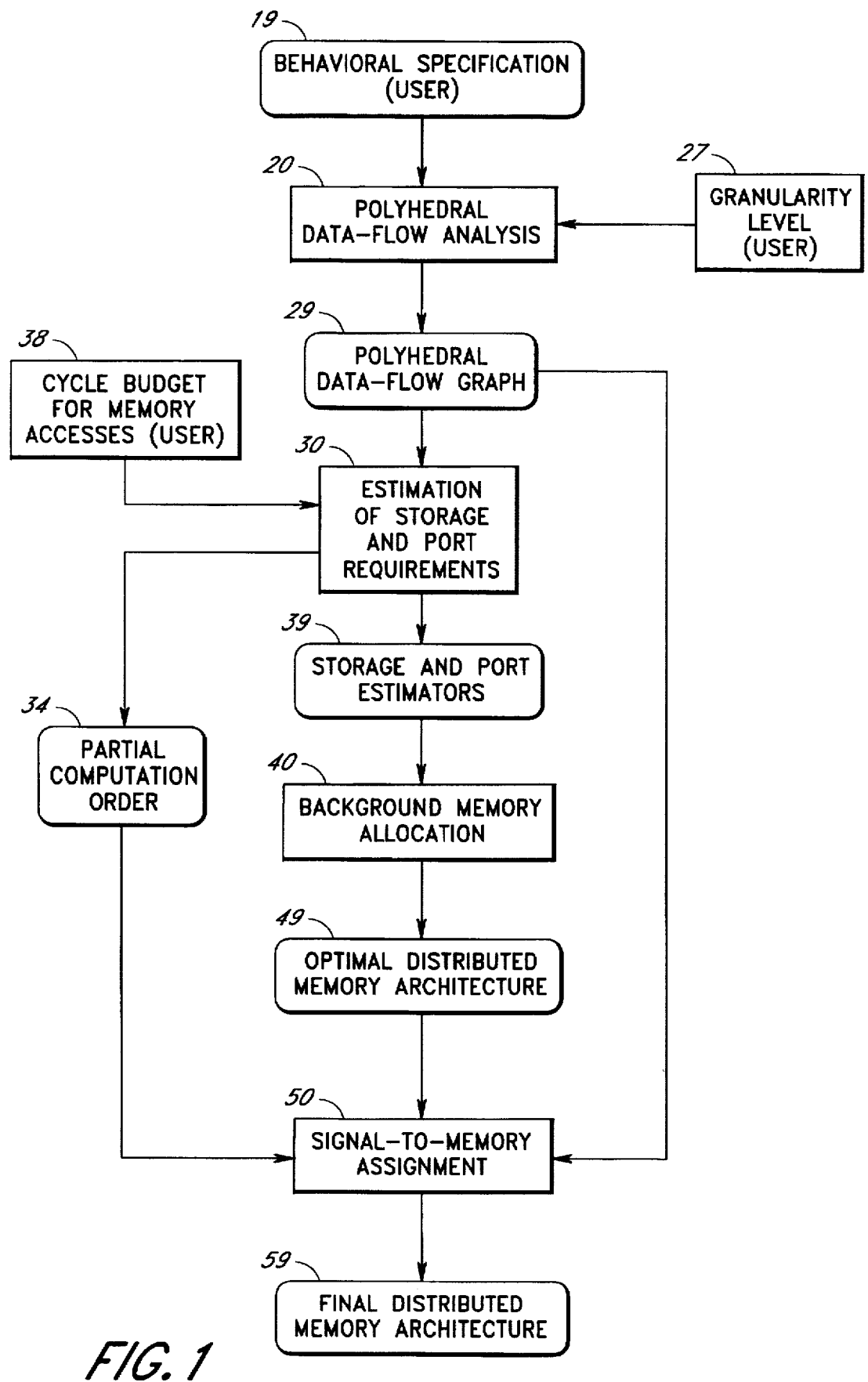
FIG. 1 is a top-level system flowchart illustrating the background memory allocation methodology in the present invention.
Figure 2:
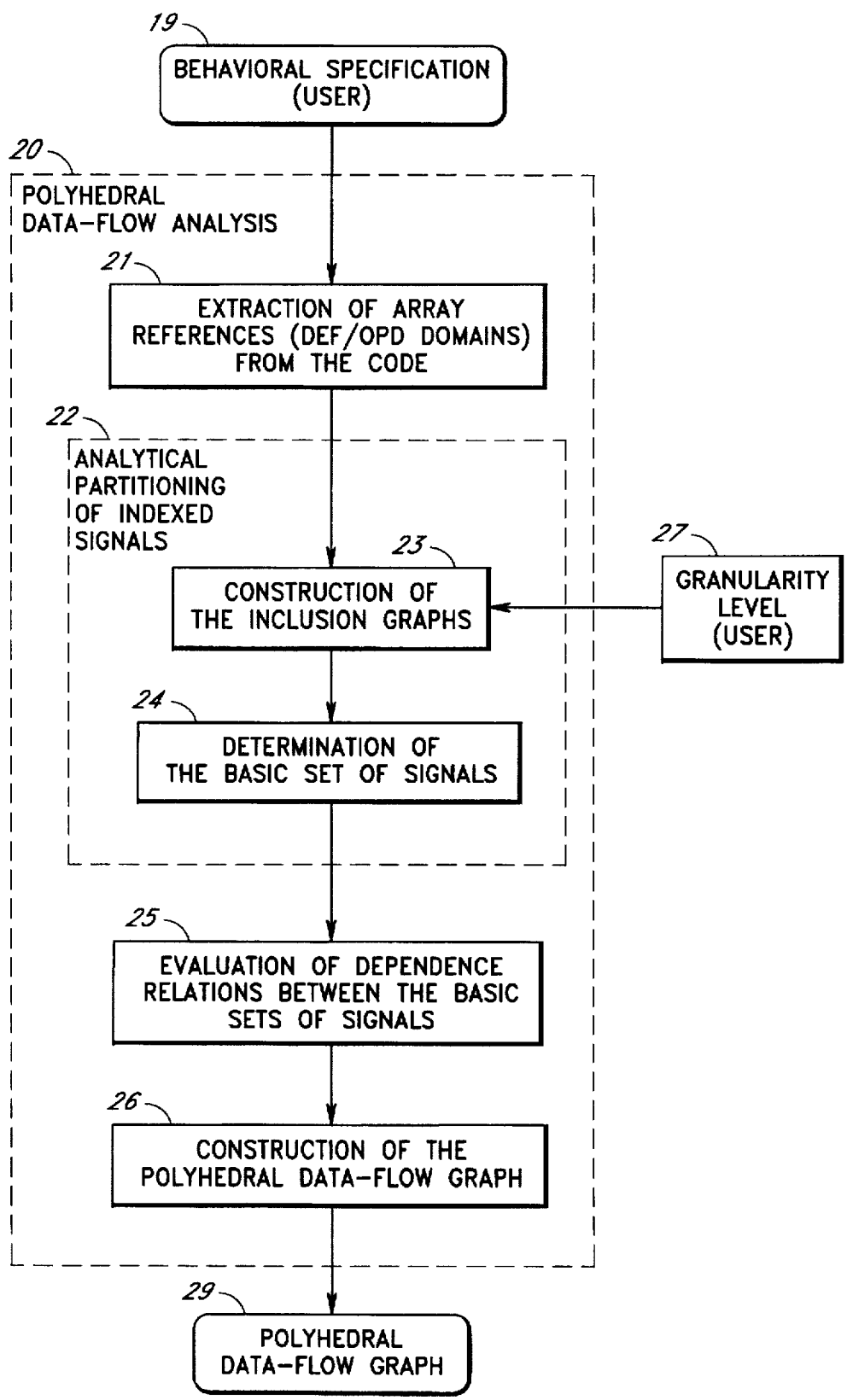
FIG. 2 is a flowchart illustrating the phase of polyhedral data-flow analysis, shown in FIG. 1.

FIG. 1 is a top-level flowchart of the whole system, illustrating the background memory allocation methodology in the present invention.
Input of the system The given real-time multi-dimensional signal processing algorithm (RMSP) is represented by means of a behavioral (functional) specification expressed in an applicative language such as Silage code (19). However, the allocation methodology as such can be used with any real-time processing system specification language, which serves as input for simulation, software compilation, or hardware synthesis. This applies, in particular, for applicative descriptions in Data. Flow Language (DFL), behavioral VHDL and Verilog (the standard description languages in the electronic design industry), or for any other language that makes the multi-dimensional (M-D) signal data-flow explicit in the specification. The allocation methodology could also be adapted for input specifications in procedural languages—like C, Pascal, procedural DFL or VHDL—as long as the data-flow is explicit (that is, no pointers, variables, data-dependent indices or loop boundaries, are allowed).
The processing flow The memory allocation methodology can accurately deal with complex behavioral specifications, containing large multi-dimensional signals, by means of an original polyhedral data-flow analysis (20), operating at the desired granularity level (27) (see in the sequel). Due to this polyhedral model, the behavioral specifications handled contain loop nests having as loop boundaries—affine functions of the surrounding loop iterators, conditions (data-dependent or not), (delayed) M-D signals with complex affine indices. Moreover, the data-flow model can be extended in order to handle more general specifications—e.g., containing M-D signals with affine indices modulo a constant, or having continuous piecewise-affine index functions (see F. Balasa. F. Franssen, F. Catthoor, H. De Man, "Transformation of nested loops with modulo indexing to affine recurrences," *Parallel Processing L.*, Vol. 4, No. 3, pp. 271–280, Dec. 1994).

The estimation of the storage requirement (30)—necessary to perform the computations in the given RMSP algorithm—is carried out by investigating the polyhedral data-flow graph (29)—derived by means of data-flow analysis (20)—and by determining a partial computation order (34). The estimation of the port requirements (30) (number and type) is achieved by verifying the existence of a computation solution compatible with the ordering and bandwidth (simultaneous read/write operations) constraints, within a specified cycle budget for memory accesses (38).

Based on the estimation values relative to memory size and bandwidth (39), the background memory allocation (40) is modeled as an optimization problem. The current cost employed represents the estimated silicon area occupied by a multiport memory configuration. This estimation is provided by an area model for on-chip memories. The solution of this nonstandard optimization approach consists of one (or, optionally, several) distributed (multiport) memory architecture(s) with fully-determined characteristics (49), optimal relative to the chosen cost function. Extensions for steering the memory allocation by means of more general costs, including power terms, are also possible. Also partial ordering constraints as imposed by the estimation step (34) and/or by the designer can be incorporated.

The subsequent step—signal-to-memory assignment (50)—maintains the distributed memory architecture (49), performing the assignment of the M-D signals to the memory units such that the global increase of silicon area—relative to the optimal allocation solution—is minimum. Also here, partial ordering constraints as imposed by the estimation step (34) and/or by the designer can be incorporated. Different from most of the past assignment techniques— operating at scalar level the signal-to-memory assignment is performed at the level of groups of scalars analytically defined. Therefore, the background memory allocation methodology is able to handle RMSP algorithms with a significantly larger number of scalar signals then the past approaches.

Output of the system

As a result of the signal-to-memory assignment (50) step, the final distributed memory architecture (59) is fully determined. In addition, the derived polyhedral data-flow graph (29), as well as the partial computation order (34) (when the behavioral specification is not procedurally-interpreted), have to be taken into account during the subsequent design phases.

The different steps of the background memory allocation methodology of the present invention are thoroughly described in the sequel.

POLYHEDRAL DATA-FLOW ANALYSIS (20)

The theoretical aspects of a polyhedral model for data-flow analysis of multi-dimensional signal processing algorithms is presented in the sequel. This model represents an essential contribution of the present invention. As mentioned earlier, a data-flow analysis operating with groups of scalars is necessary in order to handle realistic RMSP applications. Formally, these groups are represented by images of polyhedra.

Basic definitions and concepts

A polyhedron is a set of points $P \subset \Re^n$ satisfying a finite set of linear inequalities: $P = \{x \in \Re^n | A \cdot x \geq b\}$, where $A \in \Re^{m \times n}$ and $b \in \Re^m$. If P is a bounded set, then P is called a polytope. If $x \in Z^n$, where Z is the set of integers (that is, x has n integer coordinates $x = (x_1, \ldots, x_n)$), then P is called an integral polyhedron, or polytope. The set $\{y \in \Re^m | y = Ax, x \in Z^n\}$ is called the lattice generated by the columns of matrix A.

Each array reference $A[x_1(i_1, \ldots, i_n)] \ldots [x_m(i_1, \ldots, i_n)]$ of an m-dimensional signal A, in the scope of a nest of n loops having the iterators $i_1, \ldots, i_n$, is characterized by an iterator space and an index space. The iterator space signifies the set of all iterator vectors $i = (i_1, \ldots, i_n) \in Z^n$ in the scope of the array reference. The index space is the set of all index vectors $x = (x_1, \ldots, x_m) \in \Re^m$ of the array reference.

A scalar affine function is a mapping $f: \Re^n \rightarrow \Re$ defined by $f(x) = a_0 + a_1 x_1 + a_2 x_2 + a_n x_n$, where $a_0$ is a free term. A vectorial affine function is a mapping $f: \Re^n \rightarrow \Re^m$, where each of the m components is a scalar affine function. The terms scalar and vectorial will be omitted when the dimension of the image domain for the affine function clearly results from the context.

If the loop boundaries are affine mappings with integer coefficients of the surrounding loop iterators, the increment steps of the loops are ±1 (this condition can be relaxed, as shown further), and the conditions in the scope of the array reference are relational and logical operations between affine mappings of the loop iterators, then the iterator space can be represented by one or several disjoint integral (iterator) polytopes $A \cdot i \geq b$, where $A \in Z^{(2n+c) \times n}$ and $b \in Z^{2n+c}$. The first 2n linear inequalities are derived from the loop boundaries and the last c inequalities are derived from the control-flow conditions. (This representation of the polytope $A \cdot i \geq b$ is usually not minimal. The elimination of redundant inequalities is always performed in practice.) The polyhedral representation of the iterator space is still valid if the array reference scope also contains data-dependent (but iterator independent) conditions.

If, in addition, the indices of an array reference are affine mappings with integer coefficients of the loop iterators, the index space consists of one or several lineally bounded lattices (LBL)—the image of a vectorial affine function over the iterator polytope(s):

$$\{x = T \cdot i + u | A \cdot i \geq b, i \in Z^n\} \qquad (1)$$

where $x \in Z^m$ is the index (coordinate) vector of the m-dimensional signal. The (vectorial) affine function is characterized by $T \in Z^{m \times n}$ and $u \in Z^m$.

The references to indexed signals from an RMSP algorithm are called definition (the result of an assignment) and operand (an assignment argument) domains (see M. Van Swaaij, ibidem). In general, these are called also array references.

For instance, the index space of the operand domain Delta[i][j][(2*m+1)*(2*n+1)] in line (4) from the Silage code in FIG. 8 is represented by:

$$\left\{ \begin{bmatrix} x \\ y \\ z \end{bmatrix} = \begin{bmatrix} 1 & 0 \\ 0 & 1 \\ 0 & 0 \end{bmatrix} \begin{bmatrix} i \\ j \end{bmatrix} + \begin{bmatrix} 0 \\ 0 \\ (2m+1)(2n+1) \end{bmatrix} \middle| \begin{bmatrix} 1 & 0 \\ -1 & 0 \\ 0 & 1 \\ 0 & -1 \end{bmatrix} \begin{bmatrix} i \\ j \end{bmatrix} \geq \begin{bmatrix} m \\ -M \\ n \\ -N \end{bmatrix} \right\}.$$

The index space of the operand domain A[j][n+i] in line (4) from the Silage code in FIG. 10 is represented by:

$$\left\{ \begin{bmatrix} x \\ y \end{bmatrix} = \begin{bmatrix} 0 & 1 \\ 1 & 0 \end{bmatrix} \begin{bmatrix} i \\ j \end{bmatrix} + \begin{bmatrix} 0 \\ n \end{bmatrix} \middle| \begin{bmatrix} 1 & 0 \\ -1 & 0 \\ 0 & 1 \\ 0 & -1 \\ 1 & -1 \end{bmatrix} \begin{bmatrix} i \\ j \end{bmatrix} \geq \begin{bmatrix} 0 \\ -n+1 \\ 0 \\ -n+1 \end{bmatrix} \right\}.$$

In general, the index space may be a collection of linearly bounded lattices. E.g., a conditional instruction if $(i \neq j)$ determines two LBL's for the domains of signals within the scope of the condition—one corresponding to $i \geq j+1$, and another corresponding to $i \leq j-1$. Without any decrease in generality, it is assumed in the sequel that each index space is represented by a single linearly bounded lattice.

Definition The signals common to a given set of domains and only to them constitute a basic set (see F. Balasa, ibidem).

Figure 11:
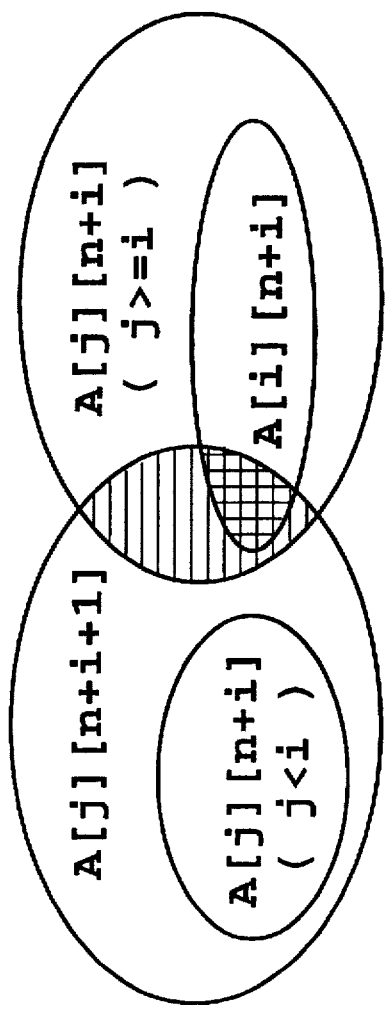
FIG. 11 displays symbolically the domains of signals extracted from an RMSP algorithm.

Example The signals common to the definition domain A[j][n+i+1] from line (4) and to the operand domain A[j][n+i]($j \geq i$) from line (5) in FIG. 10 have the index space characterized by the LBL (in non-matrix format): $\{x=j, y=i+n|n-1 \geq j \geq i \geq 1\}$. Representing the definition and operand domains from the code, symbolically, by ellipses (FIG. 11), this LBL corresponds to the (cross-) hatched area. But the LBL above partially covers the index space of the operand A[i][n+i] from line (3) (the cross-hatched region). Therefore, the signals common to A[j][n+i+1] and A[j][n+i] ($j \geq i$) and only to them (the horizontally hatched region) have a different index space: $\{x=j, y=i+n|n-1 \geq j, j \geq i+1, i \geq 1\}$, which is the basic set of the given two domains. In FIG. 11, the intersection of the ellipses determines 6 regions, each one corresponding to a basic set.

A collection of 2 domains results in at most 3 basic sets; 3 overlapping domains result in maximally 7 sets. More generally, assume the total number of definition and operand domains of a multi-dimensional signal is denoted by d. As the basic sets belonging to only one domain are at most $C_d^1$—the number of domains, the basic sets belonging to two domains are at most $C_d^2$ (all the possible combination of two domains) a.s.o. it follows that the number of basic sets is upper-bounded by $C_d^1+C_d^2+\ldots+C_d^d=2^d-1$. However, this evaluation proved to be extremely pessimistic in practical cases. In the illustrative example in FIG. 10, for instance, the number of domains for signal A is d=9, and the resulting number of basic sets is only 10 (see in the sequel).

The signal decomposition into basic sets is thoroughly described in the sequel.

Extraction of array references from the code (21)

The collections of definition and operand domains are extracted from the behavorial specification in an LBL format (see, for instance, U. Banerjee, ibidem and also M. Van Swaaij, ibidem).

Analytical partitioning of indexed signals (22)

A partitioning process into non-overlapping "pieces"—the basic sets—is performed for each collection of domains corresponding to an indexed signal. The aim of the decomposition process is to determine which parts of the operand domains are not needed any more after the computation of a definition domain. The last question is directly related to the evaluation of the storage requirements, as it allows to compute exactly how many memory locations are needed and how many can be freed when a certain group of signals is produced.

The main benefit of the analytical decomposition into groups of signals—called basic sets—is that it males possible the estimation of the memory size by means of a data-flow analysis at basic set level (rather than scalar level). Simultaneously, the partitioning can be employed to check whether the program complies with the single-assignment requirement, and to provide a diagnosis regarding the eventual multiple assignments. Moreover, the useless signals are detected and eliminated, hence avoiding unnecessary memory allocation. The partitioning process—described in the sequel—yields a separate inclusion graph for each of the collections of linearly bounded lattices (describing the index spaces of the domains of an M-D signal). The direct inclusion relation is denoted by "⊂", while its transitive closure (the existence of a path in the graph) is denoted by "≺". An inclusion graph is constructed as follows (see F. Balasa, ibidem):

Construction of the inclusion graphs (23)

At the beginning, the inclusion graph of an indexed signal contains only the index spaces of the corresponding array references as nodes. Every pair of LBL's—between which no inclusion relation is known so far (i.e., between which there is currently no path in the graph)—is intersected. If the intersection produces a non-empty Lbl, there are basically three possibilities: (1) the resulting Lbl is one of the intersection operands: in this case, inclusion arcs between the corresponding nodes must be added to the graph; (2) an equivalent linearly hounded lattice exists already in the collection: in this case, arcs must be added only if necessary between the nodes corresponding to the equivalent LBL and to the operands; (Two linearly bounded lattices of the same indexed signal are equivalent if they represent the same set of indices. E.g., $\{x=i+j|0\leq i\leq 2, 0\leq j\leq 2\}$ and $\{x=i|0\leq i\leq 4\}$ are equivalent. Testing LBL's equivalence can be done employing LBL intersection and size determination.) (3) the resulting Lbl is a new element of the collection: a new node is appended to the graph, along with two arcs towards the operands of intersection. The construction of the inclusion graph ends when no more elements—nodes or arcs—can be created.

The procedure AddInclusion creates new inclusion relations (arcs) between groups of signals, but deletes the resulting transitive arcs: keeping a strict hierarchy for the LBL's is essential for the partitioning phase. The intersection "∩" of two linearly bounded lattices is also a linearly bounded lattice, which is computed as described subsequently.

Figure 12:
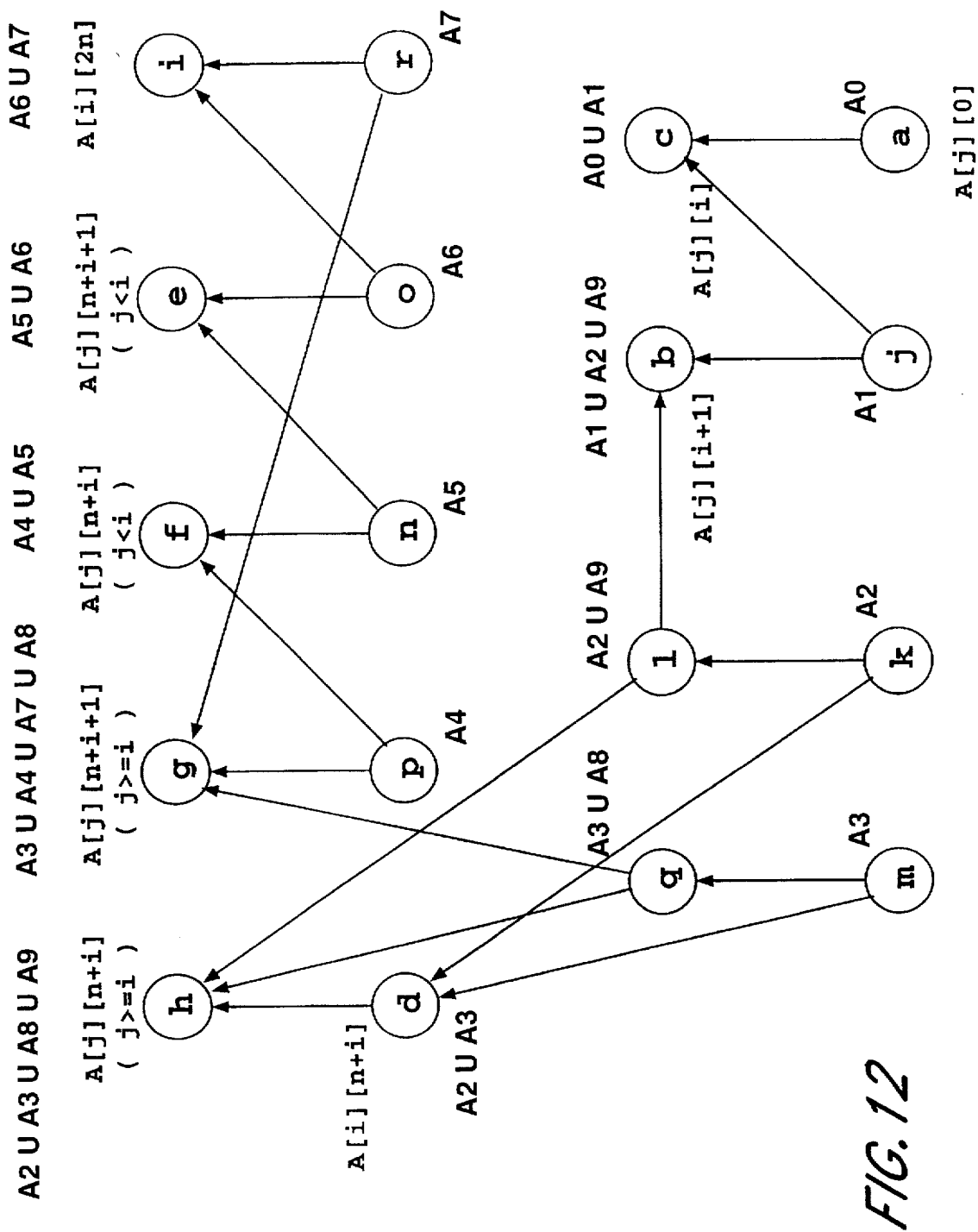
FIG. 12 shows the inclusion graph of signal A from the Silage example in FIG. 10.

Example With reference to FIG. 12, the partitioning algorithm is exemplified for the simple Silage code in FIG. 10. Initially, the inclusion graph of signal A contains only the nodes labeled from a to i, corresponding to the LBL's representing the array references extracted from the behavioral specification: A[j][1], A[j][i+1], A[j][i], A[j][n+i+1] (j<i), A[j][n+i](j<i), A[j][n+i+1](j≦i), A[j][n+i](j≧i), A[i][n+i], A[i][1n]. The first execution of the while loop in the algorithm adds to the graph the new vertices j, . . . , r along with the sequence of arcs: (j, b), (j, c), (k, b), (k, d), (1, b), (1, h), (m d), (m, g), (n, e), (n, f), (o, e), (o, i), (p, f), (p, g), (q, g), (q, h), (r, g), (r, i). Also the inclusion arcs (d, h), and (a, c) are added. The second execution of the while loop creates the new arcs (m, q) and (k, l), eliminating (m, g) and (k, b) at the same time, as they become transitive. The latter is done in the procedure AddInclusion, which creates new inclusion relations, deleting the transitive arcs. E.g., node l represents the LBL

```
void ConstructInclusionGraph(collection of LBL's - the index spaces of signal domains) {
    initialize inclusion graph with the def/opd index spaces as nodes ;
    while new nodes can still be appended to the graph
        for each pair of LBL's (Lbl₁,Lbl₂) in the collection
            such that (Lbl₁ ⊀ Lbl₂) && (Lbl₂ ⊀ Lbl₁) {
            compute Lbl = Lbl₁ ∩ Lbl₂ ;
            if (Lbl ≠ ∅)
(1)             if (Lbl == Lbl₁) AddInclusion(Lbl₁,Lbl₂) ;
                else if (Lbl == Lbl₂) AddInclusion(Lbl₂,Lbl₁) ;
(2)             else if there exists already lbl ≡ Lbl
                    if (lbl ⊀ Lbl₁) AddInclusion(lbl, Lbl₁) ;
                    if (lbl ⊀ Lbl₂) AddInclusion(lbl, Lbl₂) ;
(3)             else add Lbl to the collection ;
                    set Lbl ⊂ Lbl₁ ; set Lbl ⊂ Lbl₂ ;
        }
}
```

$$\left\{ \begin{bmatrix} x \\ y \end{bmatrix} = \begin{bmatrix} 0 & 1 \\ 0 & 0 \end{bmatrix} \begin{bmatrix} i \\ j \end{bmatrix} + \begin{bmatrix} 0 \\ n \end{bmatrix} \mid \begin{bmatrix} 0 & 1 \\ 0 & -1 \end{bmatrix} \begin{bmatrix} i \\ j \end{bmatrix} \geq \begin{bmatrix} 0 \\ -n+1 \end{bmatrix} \right\}$$

resulting from the intersection of the linearly bounded lattices corresponding to nodes h and b:

$$\left\{ \begin{bmatrix} x \\ y \end{bmatrix} = \begin{bmatrix} 0 & 1 \\ 1 & 0 \end{bmatrix} \begin{bmatrix} i \\ j \end{bmatrix} + \begin{bmatrix} 0 \\ n \end{bmatrix} \mid \begin{bmatrix} -1 & 1 \\ 1 & 0 \\ 0 & -1 \end{bmatrix} \begin{bmatrix} i \\ j \end{bmatrix} \geq \begin{bmatrix} 0 \\ 0 \\ -n+1 \end{bmatrix} \right\}$$

and $$\left\{ \begin{bmatrix} x \\ y \end{bmatrix} = \begin{bmatrix} 0 & 1 \\ 1 & 0 \end{bmatrix} \begin{bmatrix} i \\ j \end{bmatrix} + \begin{bmatrix} 0 \\ 1 \end{bmatrix} \mid \begin{bmatrix} 0 & 1 \\ 0 & -1 \\ 1 & 0 \\ -1 & 0 \end{bmatrix} \begin{bmatrix} i \\ j \end{bmatrix} \geq \begin{bmatrix} 0 \\ -n+1 \\ 0 \\ -n+1 \end{bmatrix} \right\}$$

Afterwards, the basic sets of a signal are derived from the inclusion graph with a simple bottom-up technique. If a node has no components, a new basic set—equal to the corresponding linearly bounded lattice—is introduced; otherwise, if all its components have already been partitioned, the union of the component partitions and (potentially) a new basic set will constitute the current node partitioning. In the latter case, the new basic set appears only if there is a difference between the size of the node and the total size of its components.

The computation of LBL sizes is described in the sequel. The efficiency of this operation and of the intersection procedure are crucial for the practical time complexity of the whole algorithm.

Determination of the basic sets of signals (24)

```
void CreateBasicSets(inclusion graph) {
    for every LBL (node in the inclusion graph) having no arc incident to it
        create a new basic set P, equal to that LBL ;
    while there are still non-partitioned LBL's {
        select a non-partitioned LBL (node in the inclusion graph) such that
            all arcs incident to it emerge from partitioned LBL's (LBL₁ =∪ⱼPᵢⱼ) ;
        if (size(LBL) > size(∪ᵢLBLᵢ) )
            create a new basic set P equal to LBL – ∪ᵢLBLᵢ ;
            partition the LBL into (∪ᵢ∪ⱼPᵢⱼ ; P) ;
        else // size(LBL) = size(∪ᵢLBLᵢ)
            partition the LBL into (∪ᵢ∪ⱼPᵢⱼ) ;
    }
}
```

Figure 13:
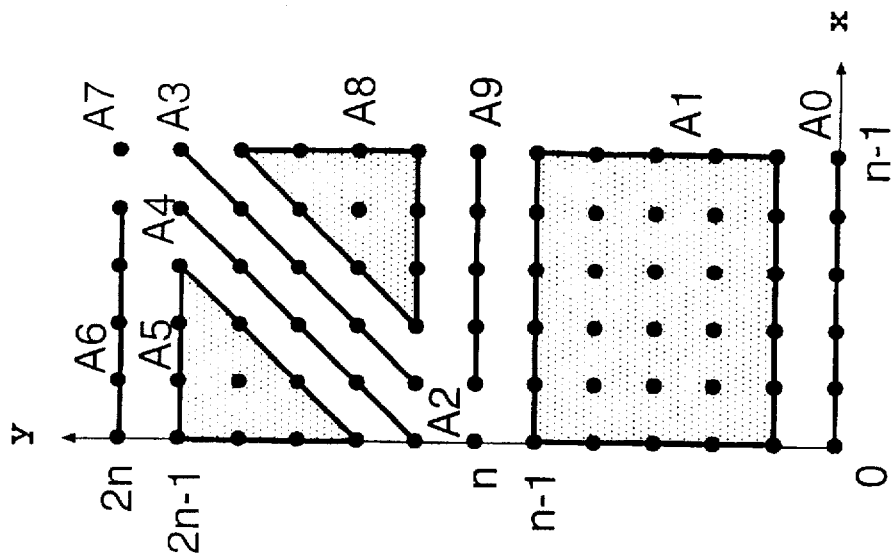
FIG. 13 shows the basic sets of signal A from the Silage example in FIG. 10.

Example (cont'd) The LBL's in the inclusion graph are partitioned in the order: first a, j, k, m, p, n, o, r creating the basic sets A0+A7; afterwards, c, d, e, f, i, l, q, b, g, h. When the LBL's l and q are processed, two more basic sets are created, as size(l)>size(k) and size(q)>size(m). The final partitioning for our example is indicated in FIG. 12, and represented in FIG. 13. Each domain has an index space which consists of one (e.g., A[j][0]→A0) or several basic sets (e.g., A[j][i]→A0∪A1).

Basic sets cannot be always represented as linearly bounded lattices (as it is the case in this illustrative example). In general, they can be decomposed, or they can be expressed as differences of affine mappings of polytopes. E.g., signal A from the Silage code in FIG. 8 has two basic sets; one of them—A1—cannot be represented as a linearly bounded lattice (see FIG. 18b). Although the novel concept of basic sets relies on linearly bounded lattices, the latter concept cannot replace the former one.

Intersection of linearly bounded lattices

This section describes thoroughly the procedure for intersecting two linearly bounded lattices (see F. Balasa, ibidem).

As already mentioned, the efficiency of this operation together with the computation of an LBL size are essential for the practical time complexity of the whole partitioning algorithm.

Let $\{x=T_1i_1+u_1|A_1i_1 \geq b_1\}$, $\{x=T_2i_2+u_2|A_2i_2 \geq b_2\}$ be two LBL's derived from the same indexed signal, where $T_1$ and $T_2$ have obviously the same number of rows—the signal dimension. Intersecting the two linearly bounded lattices means, first of all, solving a linear Diophantine system (that is, finding the integer solutions of a system of linear equations with integer coefficients) $T_1i_1-T_2i_2=u_2-u_1$ having the elements of $i_1$ and $i_2$ as unknowns. If the system has no solution, the intersection is empty. Otherwise, let $$\begin{bmatrix} i_1 \\ i_2 \end{bmatrix} = \begin{bmatrix} V_1 \\ V_2 \end{bmatrix} i + \begin{bmatrix} v_1 \\ v_2 \end{bmatrix}$$

be the solution of the Diophantine system.

If the set of coalesced constraints $$A_1V_1 \cdot i \geq b_1 - A_1v_1 \qquad (2)$$

$$A_2V_2 \cdot i \geq b_2 - A_2v_2$$

has at least one integer solution, than the intersection is a new linearly bounded lattice defined by $\{x=T\cdot i+u|A\cdot i \geq b\}$, where $$T = T_1V_1, \; u = T_1v_1 + u_1$$

$$A = \begin{bmatrix} A_1V_1 \\ A_2V_2 \end{bmatrix}, b = \begin{bmatrix} b_1 - A_1v_1 \\ b_2 - A_2v_2 \end{bmatrix}$$

An undesirable side-effect of intersection is the rapid size increase of the polytope description for the resulting linearly bounded lattice, due to the coalescing of the two constraint sets (2). Therefore, minimizing the set of constraints proved to be a necessity in order to restrict the computational effort of, e.g., containing the lattice points of the resulting LBL's. However, the practical technique employed for minimizing the set of linear constraints is based on the double description of polyhedra.

Computing the size of integer polytopes

The polytope size means, in this context, the number of distinct n-dimensional points having integer coordinates (lattice points) inside a polytope: Card $\{i \in Z^n | A \cdot i \geq b\}$.

The LBL size (or image size of a polytope) means the number of distinct m-dimensional points of integer coordinates belonging to the respective lattice (see also (1)):

$$\text{Card}\{x \in Z^m | x = T \cdot i + u, \; A \cdot i \geq b, \; i \in Z^n\}$$

The LBL size means, in fact, the number of scalars addressed by an array reference.

The importance of a correct and efficient method for the computation of index space sizes is manifold: (1) this is needed during the partitioning of the indexed signals, and (2) this allows to determine the size of the basic sets, as well as the number of dependencies between these groups of signals. The latter essential information can be exploited in order to estimate the storage requirements for nonprocedural behavioral specifications, as explained intuitively earlier.

Most of the memory-related research work assumes that all loops in the specifications have constant boundaries. That is, in the case of an affine function where only the free term $a_0$ is nonzero. If this is not the case, approximations by taking the extreme values of the boundaries should yield fairly good results (see, e.g., I. Verbauwhede, ibidem).

According to such an assumption, the number of scalars addressed by an array reference is approximated by the size of the hypercube encompassing the iterator space of that array reference (instead of computing the size of the index space). This approximation is good only if, in addition, the loops have unitary steps if there are no iterator-dependent conditions in the array scope, and if the affine mapping Ti+u in (1) is injective.

Example $$(i: 8 \ldots 15)::$$
$$(j: i-8 \ldots i+8 \ldots 2):: \ldots A[i+j] \ldots$$

As iterator j takes values between 0 and 23, the hypercube encompassing the iterator space is [8,15]×[0,23], and it contains 192 points. The size of the LBL corresponding to the signal domain A[i+j] is however 16 (therefore, 12 times less than the approximation). The error is due both to the incorrect evaluation of the iterator space size—which contains 72 points rather than 192, and to the fact that the affine mapping t(i, j)=i+j is not injective (e.g., A[12] is addressed by several pairs of iterators (i,j): (8,4), (9,3), (10,2)). It must be mentioned also that loops having increment steps different from 1

$$(i:m \ldots M \ldots \text{Step}):: \ldots A[f(i)] \ldots$$

can be easily "normalized" with the affine transformation i=i'·Step+m, thus being equivalent to $$\left( i':0 \ldots \left\lfloor \frac{M-m}{\text{Step}} \right\rfloor \right) :: \ldots A[f(i')] \ldots$$

For instance, the nest of loop in the example above is equivalent to $$(i: 8 \ldots 15)::$$
$$(j: 0 \ldots 8):: \ldots A[2*i+2*j-8] \ldots$$

Concluding, for the general affine case, the approximation mentioned above may be very crude, being improper to use for memory estimation or allocation as it can lead to an exaggerated number of storage locations. Correct solutions to the problem of index space size determination will be illustrated in the present invention. It is assumed along this section that all loops have been "normalized" in a preprocessing phase (as loop boundaries containing the floor ⌊⌋ and ceiling ⌈⌉ functions create no special problem: the routines of our system are designed to take into account only the points with integer coordinates).

It must be emphasized also that enumerative techniques can always be applied to compute the number of scalars in an array reference. These approaches are obviously simple and extremely efficient for array references with "small" iterator spaces. In image and video processing applications most of the array references are characterized by huge iterator spaces: an enumerative technique, although very simple, can be too computationally expensive for such applications (see F. Balasa, "Background memory allocation in multi-dimensional signal processing," Ph.D. thesis, IMEC, K. U. Leuven, Belgium, Nov. 1995, which is incorporated by reference).

As an accurate and general solution for computing the size of an integer n-dimensional polytope was needed, a novel technique based on the Fourier-Motzkin elimination (see, e.g., G. B. Dantzig, B. C. Eaves, "Fourier-Motzkin elimination and its dual," J. of Combinatorial Theory (A), Vol. 14, pp. 288-297, 1973) has been developed. Recently, the Fourier-Motzkin elimination has been employed for testing the data-dependence between array references (see V. Pugh, A practical algorithm foe exact array (dependence analysis," Comm. of the ACM, Vol. 35, No. 8, Aug. 1992). This is equivalent to the problem of checking the emptiness of an integer polytope.

The routine for counting the lattice points inside a given polytope is described below. In the sequel, the columns of a matrix are denoted by subscripted vectors: e.g., $A=[a_1 \; a_2 \ldots]$; the number of columns is denoted by A.nCol. The main idea of the algorithm is the following: the number of points of integer coordinates inside the given n-dimensional polytope, and having as first coordinate z, is equal to the number of points inside the polytope $a_2 z_2 + a_3 z_3 + \ldots \geq b - a_1 z_1$ (which has one dimension less). The required result is obtained by accumulating this number over the entire discrete range of $z_1$ (determined by the Fourier-Motzkin elimination).

```
int CountPolytopePoints(A,b) {        // the given polytope is Az≥b
  if (A.nCol==1) return Range(A,b);   // handles the trivial case az≥b
  if (FourierMotzkinElim(A,b) ≤ 0) return error_code;
  // special cases, when Az≥b is an unbounded polyhedron or an empty set, are
  detected;
  // otherwise, the range of z₁ - the first element of z - i.e. [z₁ᵐⁱⁿ,z₁ᵐᵃˣ] is determined
  N = 0 ;
  for ( int z₁ = ⌈z₁ᵐⁱⁿ⌉ ; z₁ ≤ ⌊z₁ᵐᵃˣ⌋ ; z₁ ++)
    N += CountPolytopePoints( [a₂ a₃ . . . ], b - a₁z₁);
  return N ;
}
```

The routine Range, handling the case when A is a vector (az≥b), is called also from FourierMotzkinElim. It checks whether the range of z is unbounded (in which case it returns the error_code=-1), or whether the range of z is empty (in which case it it returns the error_code=0). Otherwise, it returns the number of integers in the range of z, that is $$\min_{\{i|a_i < 0\}} \left\lfloor \frac{b_i}{a_i} \right\rfloor - \max_{\{i|a_i > 0\}} \left\lfloor \frac{b_i}{a_i} \right\rfloor + 1$$

The worst-case time complexity of the algorithm is exponential. In order to obtain an acceptable efficiency of the algorithm, several enhancing techniques—presented in the sequel—are employed in our current implementation.

1. The algorithm CountPolytopePoints(A, b) is not applied directly on the iterator polytope A·i≥b. It must be noticed that linear inequalities are derived from the constraints on loop boundaries and control-flow conditions. In practice, as e.g. some loop boundaries are often constant, the system of inequalities may have a block decomposition of the form:

$$\begin{bmatrix} A_1 & . & 0 & . & 0 \\ . & . & & & . \\ ... & ... & & & ... \\ . & & . & & . \\ 0 & . & . & . & 0 \\ . & & . & & . \\ ... & ... & & & ... \\ . & & & . & . \\ 0 & . & 0 & . & A_s \\ . & & & & . \end{bmatrix} i \geq \begin{bmatrix} b_1 \\ ... \\ . \\ . \\ . \\ ... \\ b_s \end{bmatrix}$$

after an eventual reordering of the iterators. Therefore, the routine CountPolytopePoints is usually applied on reduced constraint matrices $Ak \cdot i \geq b_k$, $k=1 \ldots s$, the results being multiplied at the end. In particular, the computation of the iterator space size for an array reference inside a nest of loops with constant boundaries is reduced to a simple multiplication of the iterator ranges.

12. As shown in G. B. Dantzig, B. C. Eaves. "Fourier-Motzkin elimination and its dual," *J. of Combinatorial Theory (A)*, Vol. 14, pp. 288–297, 1973, the elimination of a variable from the system of inequalities generates a new system of pq+r inequalities where p, q, r are the numbers of positive, respectively negative and zero coefficients of $x_n$ in the initial system. The order of variable elimination is important for keeping the number of inequalities as low as possible. As a consequence, the variable selected to be eliminated next is one for which the expression pq+r is minimum. The only difference in the algorithm CountPolytopePoints (A,b) is that the Fourier-Motzkin elimination will yield the range of some element $z_k$ of z (rather than the range of $z_1$—the first element), and the modifications are straightforward.

3. By numbering distinctly the initial inequalities and the newly-generated ones during the pairwise elimination process, the set of initial inequalities from which a certain inequality is derived can be easily determined. If after the elimination of t variables, an inequality is derived from t+2 initial inequalities or more, it can be proven that the inequality is redundant. The condition above is only sufficient and therefore, not all the redundant inequalities are detected and eliminated with this simple technique. However, eliminating al l the redundant inequalities after each variable elimination proves to create more overhead than speed benefit when it is embedded ill the Fourier-Motzkin elimination, as shown in F. Balasa. "Background memory allocation in multi-dimensional signal processing," *Ph.D. thesis*, IMEC, K. U. Leuven, Belgium, Nov. 1995, which is incorporated by reference.

Computing the size of linearly bounded lattices

When the affine function $t:Z^n \rightarrow N^m$, defined by $t(i)=Ti+u$ is injective (that is, $t(i_1) \neq t(i_2)$ implies $i_1 \neq i_2$), the number of m-dimensional points with integer coordinates belonging to the image of a polytope is equal to the number of n-dimensional points with integer coordinates inside the polytope (the LBL size is equal to the polytope size).

Two questions arise: (1) how can it be decided whether function t is injective or not, and (2) what is to be done if the injectivity condition is not fulfilled. In this context, it has to be emphasized that generating all lattice points in the polytope and collecting their images in a set is very inefficient for "large" polytopes (see F. Balasa, "Background memory allocation in multi-dimensional signal processing," *Ph.D. thesis*, IMEC, K. U. Leuven, Belgium, Nov. 1995, which is incorporated by reference).

Different from existent works (see, e.g., Van Swaaij, ibidem) handling only examples where matrix T is invertible (and, therefore, mapping t is injective), the present invention consistently handles all the possible cases: also the case when T is nonsquare, or when matrix T is square and singular (and, therefore, mapping t is not injective).

In order to compute the size of a linearly bounded lattice independent of whether mapping t is injective or not, the reduced Hermite normal form of matrix T is employed (see, e.g., M. Minoux, "*Mathematical Programming—Theory and Algorithms,*" J. Wiley & Sons, 1986).

A matrix is unimodular when it is square, it has integer coefficients and its determinant is ±1. For any matrix $T \in Z^{m \times n}$ there exists a unimodular matrix $S \in Z^{n \times n}$ such that $$P \cdot T \cdot S = \begin{bmatrix} H_{11} & 0 \\ H_{21} & 0 \end{bmatrix},$$

where $H_{11}$ is a nonsingular lower-triangular matrix, and P is a row permutation. Denoting rank $H_{11}=r$, and $S^{-1}i=j$, the following situations may be encountered:

(1) r=n. The affine mapping $$x = Ti + u = \begin{bmatrix} H_{11} \\ H_{21} \end{bmatrix} j + u$$

is injective, as $x_1=x_2$ implies $j_1=j_2$ (as $H_{11}$ is lower-triangular), hence $i_1=i_2$.

(2) r<n. Then $x_1=x_2$ implies that only, the first r components of $j_1$ and $j_2$ are resp. equal. This means that all vectors j satisfying $AS \cdot j \geq b$, and having the same prefix $j_1 \ldots j_r$ contribute to the image set with one single (distinct value because they are mapped to the same point. A prefix $j_1 \ldots j_r$ is called valid if there exist vectors j satisfying $AS \cdot j \geq b$, and having that prefix. Consequently, the affine image size of the polytope is the number of all valid prefixes $j_1 \ldots j_r$. If the number of valid prefixes is equal to the polytope size, the affine mapping is injective (see the examples in the sequel). Therefore, the complete algorithm for counting the image size of the polytope $Az \geq b$ becomes the following:

```
int CountImagePolytope(Lbl) { // Lbl = {x = T · i + u | A · i ≥ b }
   compute unimodular matrix S such that P · T · S = [ H11  0 ] ,with H11 lower
                                                     [ H21  0 ]
   triangular, and P a permutation matrix:
   let r = rank H11;
   if (r=T.nCol) return CountPolytopePoints(A,b);   // case (1): mapping t is injective
   else return CountPrefixes(AS,b,r);                // case (2)
}
int CountPrefixes(A,b,r) {// Generates potential prefixes of length r for the vectors
```

-continued

```
  // in the polytope Az≧b. Only valid prefixes contribute to the image size
  if (r = 0)      // If the whole prefix has been generated, it is checked whether
    if (nonEmptyPolytope(A,b)) return 1 ; else return 0;// the prefix is valid or not
FourierMotzkinElim(A,b) ;
  // Az≧b is assumed to be a non-empty bounded polyhedron
  // FourierMotzkinElim returns the range of z₁ - the first element of z
  N = 0 ;
  // for every possible first component of the prefix (of length r)
  //    the rest of the prefix (of length r - 1) is generated
  for ( int z₁ = ⌈z₁ᵐⁱⁿ⌉; z₁ ≦ ⌊z₁ᵐᵃˣ⌋ ; z₁ ++)
    N += CountPrefixes( [a₂ a₃ . . . ], b - a₁z₁, r - 1);
  return N ;
}
bool nonEmptyPolytope(A,b) {
  // Returns true (≠0) if the integral polyhedron Az ≧ b is not empty
  if (A.nCol==1) return Range(A,b); // handles az≧b
  if ( FourierMotzkinElim(A,b) ≦ 0 ) return error_code;
  // FourierMotzkinElim returns the range of z₁ - the first element of z
  for ( int z₁ = ⌈z₁ᵐⁱⁿ⌉; z₁ ≦ ⌊z₁ᵐᵃˣ⌋ ; z₁ ++)
    if ( nonEmptyPolytope( [a₂ a₃ . . . ], b - a₁z₁)) return 1;
  return 0 ;
}
```

Two illustrative examples are briefly discussed in the sequel.

EXAMPLE 1

$(i : 0 \ldots 255) ::$ $(j : 0 \ldots 255) :: \ldots M[2*i + 3*j + 1][5*i + j + 2][4*i + 6*j + 3] \ldots$ $\{x = Ti + u|Ai \geq b\} =$ $$\left\{ \begin{bmatrix} x \\ y \\ z \end{bmatrix} = \begin{bmatrix} 2 & 3 \\ 5 & 1 \\ 4 & 6 \end{bmatrix} \begin{bmatrix} i \\ j \end{bmatrix} + \begin{bmatrix} 1 \\ 2 \\ 3 \end{bmatrix} \middle| \begin{bmatrix} 1 & 0 \\ -1 & 0 \\ 0 & 1 \\ 0 & -1 \end{bmatrix} \begin{bmatrix} i \\ j \end{bmatrix} \geq \begin{bmatrix} 0 \\ -255 \\ 0 \\ -255 \end{bmatrix} \right\}$$

As there is a unimodular matrix $$S = \begin{bmatrix} -1 & 3 \\ 1 & -2 \end{bmatrix}$$

such that $$TS = \begin{bmatrix} H_{11} \\ \ldots \\ H_{21} \end{bmatrix} = \begin{bmatrix} 1 & 0 \\ -4 & 13 \\ \ldots & \ldots \\ 2 & 0 \end{bmatrix}.$$

it results that rank $H_{11} = 2 = T.nCol$, hence the mapping is injective. Therefore, the LBL size is equal to size(Ai≧b)= 256×256=65536. The size of the polytope can be computed either with the routine CountPolytopePoints(A,b) or, more efficiently in this case, by taking into account that both iterators have constant bounds with range 256.

EXAMPLE 2

$(i : 0 \ldots 7) ::$ $(j : 0 \ldots 7) ::$ $(k : 0 \ldots 7) :: \ldots M[i + k][j + k] \ldots$ With the unimodular matrix $$S = \begin{bmatrix} 1 & 0 & -1 \\ 0 & 1 & -1 \\ 0 & 0 & 1 \end{bmatrix} \cdot TS = \begin{bmatrix} 1 & 0 & 0 \\ 0 & 1 & 0 \end{bmatrix}.$$

A r<n (2<3), the prefixes $(j_1, j_2)$ of all vectors j satisfying AS·j≧b, that is ≡7≧$j_1$−$j_3$≧0, 7≧$j_2$−$j_3$≧0, 7≧$j_3$≧0}, have to be checked for validity. Eliminating $j_3$ from the previous set of inequalities, the prefixes $(j_1, j_2)$ result to have the ranges $j_1 \in [0,14]$ and $j_2 \in [\max\{0, j_1-7\}, \min\{14, j_1+7\}]$.

There are 169 pairs $(j_1, j_2)$ having these ranges. All of them prove to be valid prefixes: for instance, the prefix (1 6) is valid as there are two vectors—[1 6 0]$^T$ and [1 6 1]$^T$—satisfying the system of inequalities AS·j≧b. It follows that the size of the index space of M[i+k][j+k] is 169. As this value is inferior to the size of the iterator space—which is 512—it follows that the affine mapping t(i, j, k)=T·[i j k]$^T$ is not injective. Indeed, this can be easily seen noticing that the triplets (i, j, k) equal to (0,1,1) and (1,2,0) are mapped to the same point (1,2) in the index space.

Index space determination for array references

Let $\{x=T·i+u|A·i\geq b\}$ be the LBL of a given array reference in a program. If matrix T is square and nonsingular, the index space is included into an image polytope which can be easily determined: noticing that the iterator vector $i=T^{-1}·(x-u)$ must represent a point inside the iterator polytope A·i≧b, the image polytope results to be $A·T^{-1}·(x-u)\geq b$.

Even in this case when matrix T is invertible, not all the points in the image polytope belong to the index space. For instance, if (i:0 . . . 9):: . . . A[5*i] . . . the image polytope of the array reference is 0≦x≦45. But the indices of A take only 10 from these 46 values.

Figure 14:
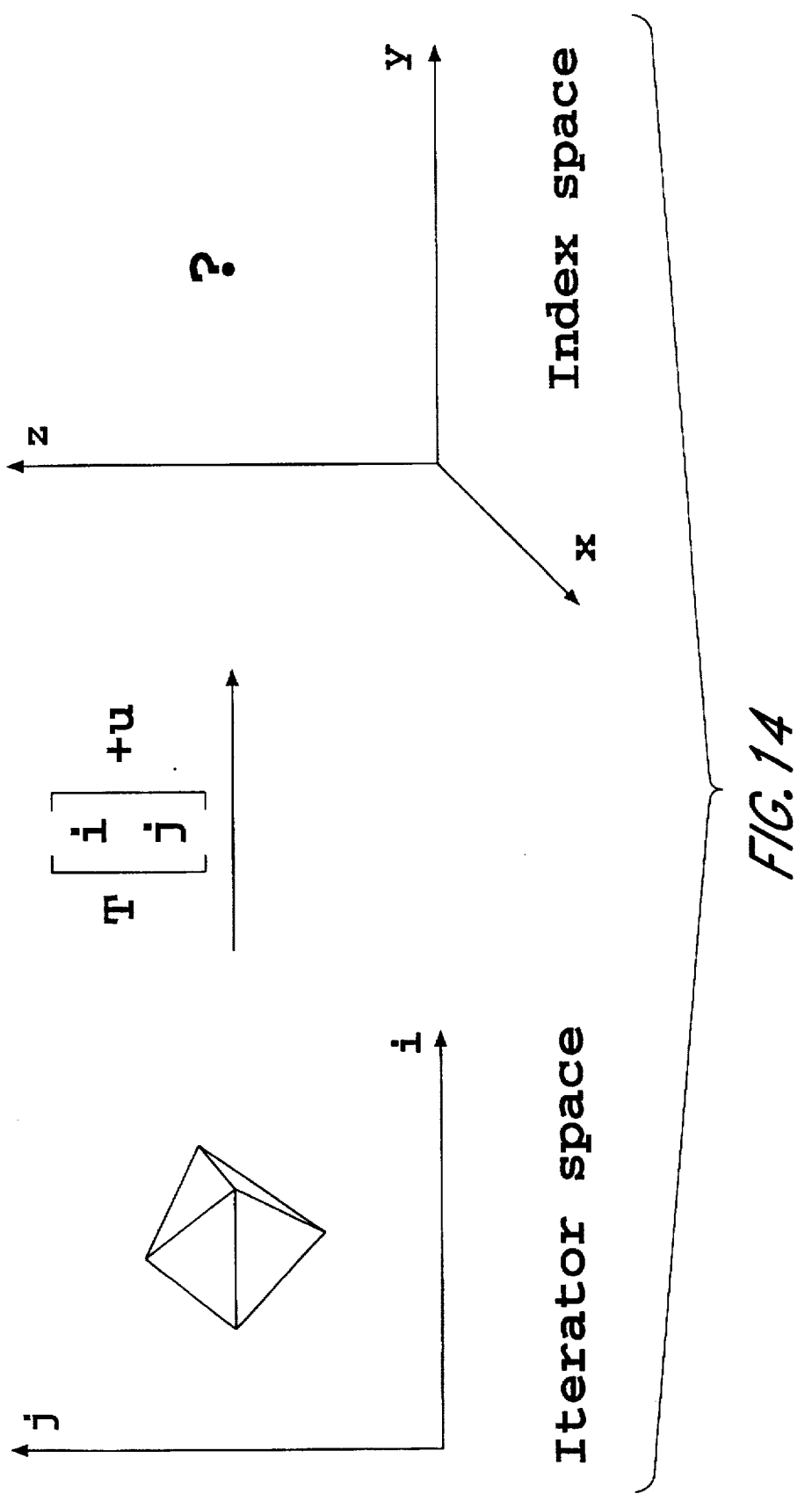
FIG. 14 shows the transformation of a polytope from the iterator space to the index space.

A more direct method for computing the LBL size (see F. Balasa, ibidem) is based on the effective construction of the index space of an array reference (see FIG. 14), even when matrix T is singular, or non-square (i.e., the dimension of the index space differs from the dimension of the iterator space).

As mentioned earlier, for any matrix $T \in Z^{m \times n}$ with rank T=r, and assuming the first r rows of T are linearly independent, there exists a unimodular matrix $S \in Z^{n \times n}$ such that $$T \cdot S = \begin{bmatrix} H_{11} & 0 \\ H_{21} & 0 \end{bmatrix},$$

where $H_{11} \in Z^{r \times r}$ is a lower-triangular matrix of rank r, and $H_{21} \in Z^{(m-r) \times r}$. The block matrix is called the reduced Hermite form of matrix T.

Let $$S_i^{-1} \stackrel{\text{def}}{=} j \equiv \begin{bmatrix} j_1 \\ j_2 \end{bmatrix},$$

where $j_1$, $j_2$ are r-, respectively (n−r)-, dimensional vectors. Then $$x = Ti + u = TSj + u = \begin{bmatrix} H_{11} \\ H_{21} \end{bmatrix} j_i + u \quad (3)$$

Denoting $$x = \begin{bmatrix} x_1 \\ x_2 \end{bmatrix}, \text{ and } u = \begin{bmatrix} u_1 \\ u_2 \end{bmatrix}$$

(where $x_1$, $u_1$ are r-dimensional vectors), it follows that $x_1 = H_{11} j_1 + u_1$. As $H_{11}$ is nonsingular (being lower-triangular of rank r), $j_1$ can be obtained explicitly:

$$j_1 = H_{11}^{-1}(x_1 - u_1)$$

The iterator vector i results with a simple substitution:

$$i = S \begin{bmatrix} j_1 \\ j_2 \end{bmatrix} = [S_1 S_2] \begin{bmatrix} H_{11}^{-1}(x_1 - u_1) \\ j_2 \end{bmatrix} = S_1 H_{11}^{-1}(x_1 - u_1) + S_2 j_2$$

where $S_1$ and $S_2$ are the submatrices of S containing the first r, respectively the last n−r, columns of S. As the iterator vector must represent a point inside the iterator polytope $A \cdot i \geq b$, it follows that:

$$AS_1 H_{11}^{-1} x_1 + AS_2 j_2 \geq b + AS_1 H_{11}^{-1} u_1 \quad (4)$$

As the rows of matrix $H_{11}$ are r linearly independent r-dimensional vectors, each row of $H_{21}$ is a linear combination of the rows of $H_{11}$. Then from (3), it results that there exists a matrix $C \in \Re^{(m-r) \times r}$ such that $$x_2 - u_2 = C \cdot (x_1 - u_1) \quad (5)$$

The coefficients of matrix C are determined by backward substitutions from the equations:

$$H_{21}.\text{row}(i) = \sum_{j=1}^{r} c_{ij} \cdot H_{11}.\text{row}(j) \text{ for any } i = 1, \ldots, m-r.$$

The system of inequalities (4) and the system of equations (5) characterize the index space of the given array reference.

If n>r the image polytope of the index space can be obtained by taking the projection of the n-dimensional polytope (4) on the r-dimensional subspace defined by the first r coordinates. In practical point of view, the projection is performed eliminating with the Fourier-Motzkin technique the n−r variables of $j_2$. This image polytope is usually not dense (it contains "holes"—i.e., points in the image polytope but not in the index space), as not all its points represent valid prefixes of length r in the polytope (4).

Even if n=r (therefore, no projection is needed), the image polytope is dense if and only if matrix $H_{11}$ is unimodular, as it can be seen from $j_1 = H_{11}^{-1}(x_1 - u_1)$. Indeed, assuming that $|\det H_{11}| \neq 1$, and taking into account that the elements of $j_1$ must be integers, it follows (multiplying and dividing $H_{11}^{-1}(x_1 - u_1)$ by $|\det H_{11}|$) that the points x inside the LBL must satisfy the supplementary constraints $$|\det H_{11}| \, |h_i^T (x_1 - u_1) \quad \forall i = \overline{1, r} \quad (6)$$

where $h_i^T$ are the rows of the matrix with integer coefficients $|\det H_{11}| H_{11}^{-1}$, and a|b means. "a divides b". If $H_{11}$ is unimodular, the constraints (6) are obsolete.

In conclusion, the size of the LBL can be computed, taking into account (4), with the routine CountPrefixes $([AS_1 H_{11}^{-1} \, AS_2], b + AS_1 H_{11}^{-1} u_1, r)$ described earlier, with a slight modification: if $H_{11}$ is not unimodular, a valid prefix must satisfy also the constraints (6). The two previous examples will exemplify again this method.

EXAMPLE 1 (revisited)

As m=3 and r=n=2, we have $x_1 = [x \, y]^T$ and $x_2 = [z]$. Taking also into account the results obtained already earlier, $$S_1 \equiv S = \begin{bmatrix} -1 & 3 \\ 1 & -2 \end{bmatrix},$$

$$H_{11} = \begin{bmatrix} 1 & 0 \\ -4 & 13 \end{bmatrix},$$

$$H_{11}^{-1} = \frac{1}{13} \begin{bmatrix} 13 & 0 \\ 4 & 1 \end{bmatrix},$$

$$H_{21} = [2 \, 0].$$

Condition (4) yields $$3320 \geq -x + 3y \geq 5$$

$$3316 \geq 5x - 2y \geq 1$$

As the only row in $H_{21}$ is two times the first row in $H_{11}$, the image polytope is completed with the equality (5): z−3=2 (x−1).

As det $H_{11}$=13, the image polytope is not dense. Condition (6) yields 13|4(x−1)+((y−2) (as 13|13(x−1) is always satisfied).

The number of points in the image polytope, satisfying also the divisibility condition above, are 65536—the size of the LBL (which is also here the size of the iterator space).

EXAMPLE 2 (revisited)

As m=r=2 and n=3, we denote the (n−r)-dimensional vector $j_2 = [\lambda]$. As $$H_{11} = \begin{bmatrix} 1 & 0 \\ 0 & 1 \end{bmatrix}$$

(thus unimodular), and $H_{21}$ does not exist (as m=r), with $$S_1 = \begin{bmatrix} 1 & 0 \\ 0 & 1 \\ 0 & 0 \end{bmatrix},$$

$$S_2 = \begin{bmatrix} -1 \\ -1 \\ 1 \end{bmatrix},$$

only condition (4) yields $$7 \geq x - \lambda \geq 0$$
$$7 \geq y - \lambda \geq 0$$
$$7 \geq \lambda \geq 0$$

The number of points $[x\ y]^T$ in the image polytope is 169—the valid prefixes of length 2.

When matrix $H_{11}$ is not unimodular, the CPU times can be significantly higher than those yielded by the routine CountImagePolytope. The reason is that the method of index space determination operates on the image polytope (which contains "holes"), while CountImagePolytope operates on the iterator polytope—which can be significantly "smaller" when $H_{11}$ is not unimodular: the "holes" in the image polytope can occupy a large space in the image polytope. Therefore, the former method can never be better.

The polyhedral data-flow graph (29)

Figure 15:
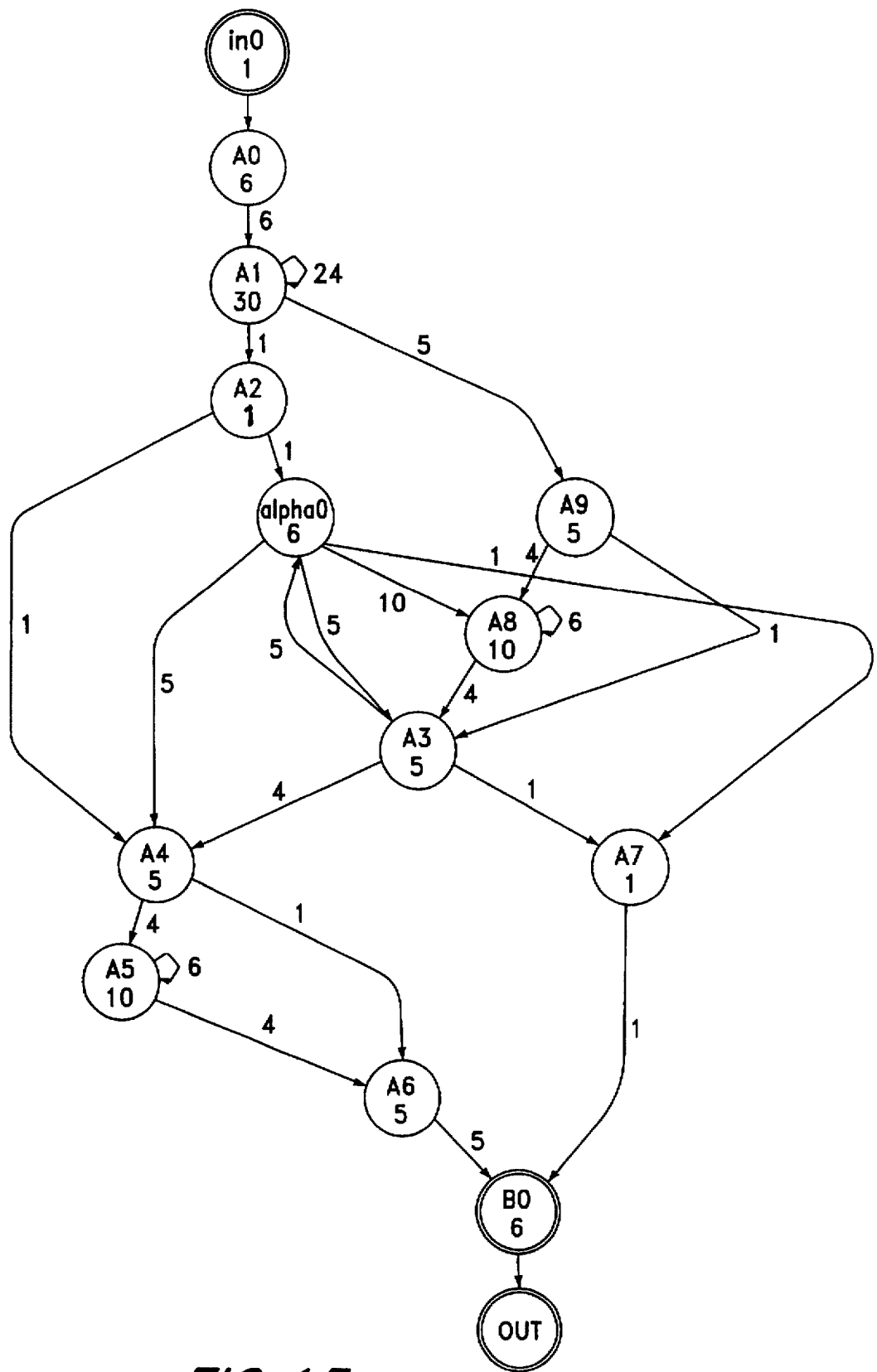
FIG. 15 displays the data-flow graph for the illustrative example in FIG. 10 (n=6).

After the analytical partitioning of indexed signals (22), a polyhedral data-flow graph (DFG) (29) with exact dependence relations, is constructed (26) (for instance, the DFG from FIG. 15 will result from the Silage example in FIG. 10). However, unlike the classic case of data-flow analysis, the nodes in the graph do not correspond to individual variables/signals, but to groups of signals (covered by the basic sets derived in (24)), and the arcs correspond to the dependence relations between these groups. For instance, the nodes A0, . . . , A9 in the graph from FIG. 15 correspond to the 10 basic sets of signal A in FIG. 13. The nodes in the data-flow graph are weighted with the size of their corresponding basic sets (computed as described above), and the arcs between nodes are weighted with the exact number of dependences between the basic sets corresponding to the nodes. Based on the polyhedral graphs, a data-flow analysis is done in order to provide accurate estimations of storage requirements for RMSP algorithms (see F. Balasa, F. Catthoor, H. De Man, "Background memory area estimation for multi-dimensional signal processing systems," *IEEE Trans. on VLSI Systems*, Vol. 3, No. 2, pp. 157–172, June 1995) when a partial computation ordering is imposed.

Evaluation of dependence relations between the basic sets of signals (25)

As the nodes in the DFG and their weights—the basic sets of signals and their sizes—are known from (24), the construction of the graph is completed by determining the arcs between the nodes—the dependence relations between the basic sets (in particular, array references), and their weights—the number of dependences.

Suppose for the moment, without decrease in generality, that two basic sets are represented as LBL's:

$$S_1 = \{x = T_1\lambda + u_1 | A_1\lambda \geq b_1\},\ S_2 = \{x = T_{2\lambda} + u_2 | A_{2\mu} \geq b_2\}$$

and the two basic sets belong respectively to the index spaces of a definition domain and of an operand domain within the same instruction scope:

$$D_1 = \{x = C_1 I_1 + d_1 | A I_1 \geq b\},\ D_2 = \{x = C_2 I_2 + d_2 | A I_2 \geq b\}$$

Solving the linear Diophantine system in $(I_1, \lambda)$ as variables: $C_1 I_1 + d_1 = T_1\lambda + u_1$ and substituting the solution which always exists as basic set $S_1$ is included in $D_1$) in the sets of constraints $A_1\lambda \geq b_1$ and $AI_1 \geq b$, the expression of the iterator vector corresponding to the basic set $S_1$ is obtained:

$$\{I_1 = \bar{T}_1\alpha + \bar{u}_1 | \bar{A}_1\alpha \geq \bar{b}_1\}$$

The expression of the iterator vector corresponding to the basic set $S_2$ is obtained similarly:

$$\{I_2 = \bar{T}_2\beta + \bar{u}_2 | \bar{A}_2\beta \geq \bar{b}_2\}$$

There is a dependence relation between $S_1$ and $S_2$ if there is at least one iterator vector corresponding to both of them. The number of iterator vectors yields, in this case, the number of dependences. The problem is solved by intersecting the two linearly bounded lattices above. If the intersection is empty, there is no dependence relation between $S_1$ and $S_2$. Otherwise, the size of the intersection represents the number of dependences.

Example In the Silage code of FIG. 10, basic set A8 belongs to the index space D8 of the definition domain $A[j][n+i+1]$ ($j \geq i$) (node g in FIG. 12), and basic set A9 belongs to the index space D9 of the operand domain $A[j][n+i](j \geq i)$ (node h in FIG. 12). Employing a non-matrix notation, the linearly bounded lattices of the basic sets and of the index spaces are (see FIG. 13):

A8=$\{x=\lambda_1,\ y=\lambda_2+n|n-1 \geq \lambda_1,\ \lambda_2 \geq 1,\ \lambda_1-\lambda_2 \geq 1\}$ A9=$\{x=\mu,\ y=n|n-1 \geq \mu \geq 1\}$ D8=$\{x=j,\ y=i+n+1|n-1 \geq j \geq 0,\ n-1 \geq i \geq 0,\ j \geq i\}$ D9=$\{x=j,\ y=i+n|n-1 \geq j \geq 0,\ n-1 \geq i \geq 0,\ j \geq i\}$ The set of iterators corresponding to A8 in the index space D8 is described by $\{i_1=\alpha',\ j_1=\alpha''|n-1 \geq \alpha'',\ \alpha' \geq 0,\ \alpha''-\alpha' \geq 2\}$. The set of iterators corresponding to A9 in the index space D9 is: $\{i_2=0,\ j_2=\beta|n-1 \geq \beta \geq 1\}$.

The intersection of the two LBL's is represented as: $\{i=0,\ j=\gamma|n-1 \geq \gamma \geq 2\}$. Hence, the number of dependences between A9 and A8 is n-2, i.e. the size of the intersection. Therefore, the arc between the nodes A9 and A8 in FIG. 15 has the weight 4 (as n=6).

It has been assumed so far that a basic set was represented by a single LBL. This does not always happen as a basic set may result from the routine CreateBasicSets (in 24) to be a difference of the form LBL–($\cup_i$LBL$_i$) (e.g., the basic set A1 in FIG. 18b). In this latter case, the basic set is decomposed into a collection of mutually disjoint LBL's. The formal approach for this is discussed in the sequel.

Let a basic set be represented as the difference LBL–($\cup_i$LBL$_i$) or, equivalently, LBL$\cap$ ($\cap_i \overline{LBL}_i$). The problem is reduced to decompose the complement $\overline{LBL}_i$ of a given linearly bounded lattice $$LBL_i = \{x = T_z + u|a_1z \geq b_1,\ \ldots,\ a_rz \geq b_r\}$$

into a collection of mutually disjoint LBL's. From the set identity $$\overline{C_1 \cap \ldots \cap C_n} = \overline{C}_1 \cup \ldots \cup \overline{C}_n = \overline{C}_1 \cup (\overline{C}_1 \cap \overline{C}_2) \cap \ldots \cap (\overline{C}_1 \cup \ldots \cup \overline{C}_{n-1} \cup \overline{C}_n)$$

$\overline{C}_1,\ \overline{C}_1 \cap \overline{C}_2, \ldots, \overline{C}_1 \cap \ldots \cap \overline{C}_{n-1} \cap \overline{C}_n$ are clearly disjoint sets, it follows that $\overline{LBL}_i = \cup_{j=1}^n \overline{LBL}_{ij}$, where the lattices $$\overline{LBL}_{ij} = \{x = T_z + u|a_1z \geq b_1,\ \ldots,\ a_{j-1}z \geq b_{j-1},\ -a_jz \geq -b_j+1\}$$

are mutually disjoint. The last inequality $-a_jz \geq -b_j+1$ is equivalent to $a_jz < b_j$. It is also assumed, without loss of generality, that the mappings of LBL and LBL$_i$ are identical (as LBL$_i$ is included in LBL).

In conclusion, the given basic set can be represented as $\cup_{(i,j)_i}(LBL \cap \overline{LBL}_{iji})$—a union of at most $\pi_i r_i$ disjoint linearly bounded lattices. The complexity of the decomposition method is proportional to this product.

Example The algorithm CreateBasicSets (in 24) applied to the motion detection kernel in FIG. 8 yields a basic set A1 (see FIG. 18b) which is the difference between two linearly bounded lattices:

A1=$\{x=i,\ y=j|M+m \geq i \geq 0,\ N+n \geq j \geq 0\}-A0$

A0={x=i, y=j|M≥i≥m, N≥j≥n}

After the removal of redundant inequalities, the decomposition of A1 into disjoint LBL's results to be A1=A1a∪A1b∪A1c∪A1d, where:

A1a={x=i, y=j|m−1≥i≥0, N+n≥j≥0}

A1b={x=i, y=j|M+m≥i≥M+1, N+n≥j≥0}

A1c={x=i, y=j|M≥i≥m, n−1≥j≥0}

A1d={x=i, y=j|M≥i≥m, N+n≥j≥N+1}

Figure 16:
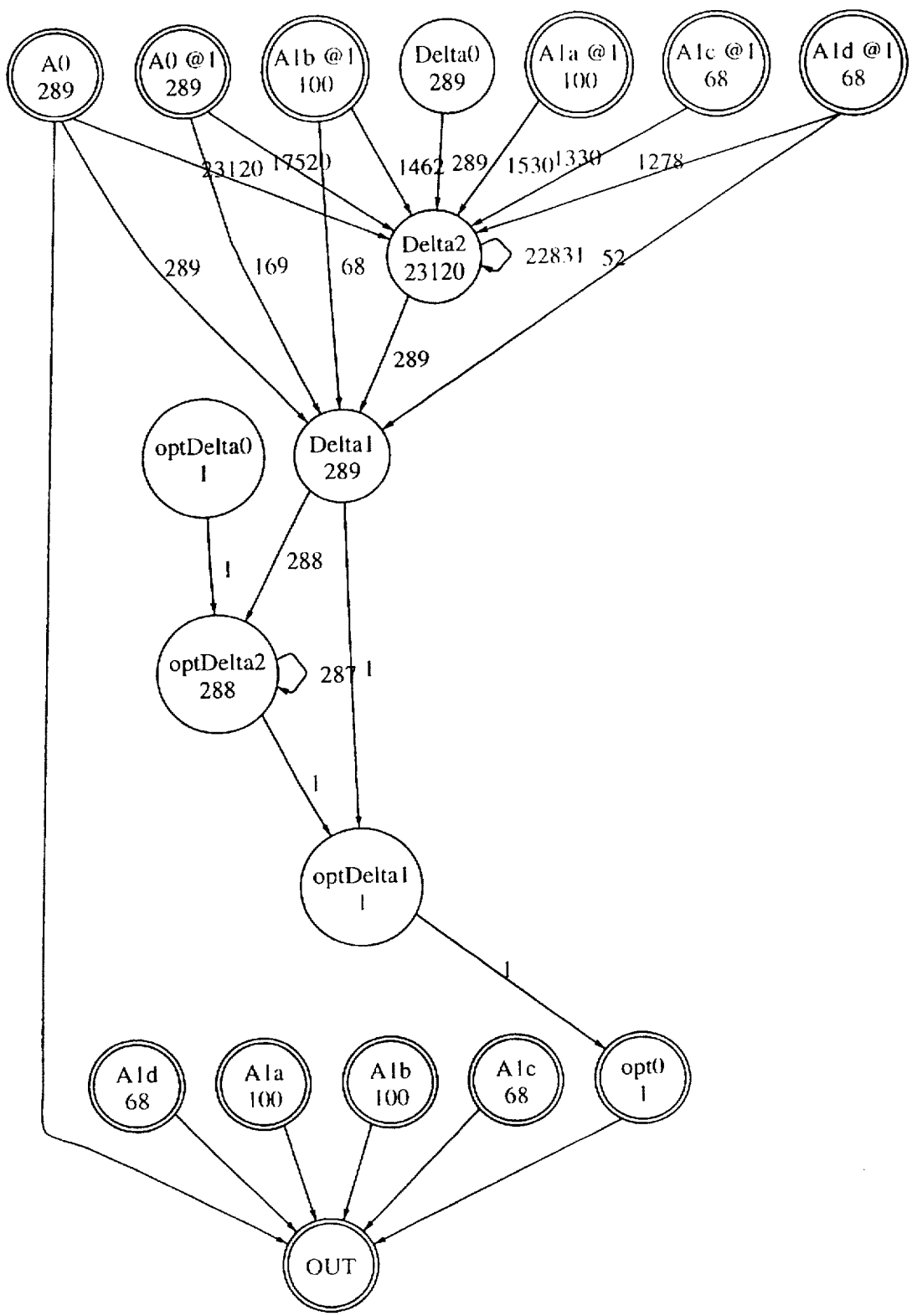
FIG. 16 displays the data-flow graph for the example in FIG. 8 (M=N=20, m=n=4), when all the nodes represent linearly bounded lattices.

The data-flow graph of the motion detection kernel, where now all the nodes represent linearly bounded lattices, is showing in FIG. 16.

Note that different from the partitioning of the indexed signals into basic sets, the decomposition into disjoint linearly bounded lattices is not unique. Another possible decomposition is, for instance:

A1a'={x=i, y=j|M+m≥i≥0, n−1≥j≥0}

A1b'={x=i, y=j|M+m≥i≥0, N+n≥j≥N+1}

A1c'={x=i, y=j|m−1≥i≥0, N≥j≥n}

A1d'={x=i, y=j|M+m≥i≥M+1, N≥j≥n}

Different decomposition solutions can be obtained modifying the order of LBL's in the intersection $\cap_i \overline{LBL}_i$, or interchanging the inequalities in each $LBL_i$.

Also the union of two LBL's can be decomposed with a similar technique in a collection of disjoint LBL's, as $LBL_1 \cup LBL_2 = LBL_1 \cup (LBL_2 - LBL_1)$.

More generally, given two basic sets represented as unions of mutually disjoint linearly bounded lattices—$\cup_j S_1^i$ and, respectively, $\cup_j S_2^j$—the number of dependences between the two basic sets result to be $\Sigma_{i,j}$ nr_dependences $(S_1^i, S_2^j)$. The number of dependences between each pair of LBL's is computed as shown earlier.

The data-flow graph of the example in FIG. 10 is shown in FIG. 15. The nodes are labeled with the signal name, basic set number, and size; the arcs are labeled with the number of dependences. OUT is a dummy node, necessary for handling delayed signals.

Construction of the polyhedral data-flow graph (26)

RMSP algorithms describe the processing of streams of data samples. The source code of these algorithms can be imagined as surrounded by an implicit loop having time as iterator. Consequently, each signal in the algorithm has an implicit extra dimension corresponding to the time axis. RMSP algorithms contain usually delayed signals i.e., signals produced or inputs in previous data-sample processings, which are consumed during the current sample processing. The delay operator "@" refers relatively to the past samples. The delayed signals must be kept "alive" during several time iterations, i.e. they must be stored in the background memory during several data-sample processings.

In order to handle the delays in an RMSP algorithm, an appealing solution because of its simplicity would be to add an explicit extra dimension—corresponding to the time axis—to all the array references in the behavioral specification. The code transformation for the motion detection kernel (FIG. 8) is presented in FIG. 17. Choosing a maximum value for the number of data-samples, the equivalent code could be processed in the same way as presented so far.

However, this "simple" approach presents a major shortcoming: introducing one extra dimension increases substantially the computational effort for realistic RMSP applications. This effect is especially noticeable in applications with "deep" nested loops, as the motion detection kernel, where the explicit introduction of the time loop (see FIG. 17) causes an increase of the processing time from 37 seconds to 56 seconds.

In order to simulate the effect of the delayed signals in terms of memory requirements, a more effective method for handling delays has been proposed (see F. Balasa, F. Catthoor, H. De Man, "Background memory area estimation for multi-dimensional signal processing systems," *IEEE Trans. on VLSI Systems*, Vol. 3, No. 2, p. 157–172, June 1995).

First, the delayed operand domains take part in the partitioninig process as any other signal domain. Afterwards, the construction of the data-flow graph needs the following preprocessing step:

create a dummy node OUT;

for each basic set b let D(b) be its highest delay value (when belonging to an operand domain);

create D(b) copies of the basic set node, each one labeled from 1 to D(b);

for every copy labeled 1, . . . , D(b)−1 create a dependence from the copy node to OUT;

for every basic set b belonging to an output signal, or having a max delay D(b)>0 create a dependence arc from its corresponding node to OUT;

The basic idea is to create bogus dependence relations towards an "output" node from the groups of signals produced in the current sample processing and consumed in a future one, or from the groups produced in the past and still necessary in the future. E.g., if there is an operand sig@3, the signal sig produced two sample processing ago, will be consumed only in the next sample processing. These groups of signals must be kept "alive" during the entire current sample processing. In practice, all copies of a basic set having a unique dependence relation (only towards the node OUT) are treated as a single item, so handling signals with high delay values does not cause computational problems.

This modification of the data-flow graph allows to take into account the effect of delays, "translating" the basic sets which affect the memory requirements from previous datasample processings into the current one. When the delay values are constant, the extension of all domains with one extra, dimension—corresponding to the implicit time loop—is avoided hence reducing the computational effort.

Although our model allows the handling of signals with non-constant delay values (affine functions of loop iterators), the necessity of all explicit time dimension cannot be avoided in this case. However, it could be possible to find out by solving an ILP) the maximum delay values inside the scope of those signals, and to replace the affine delays by constant values. The shortcoming of such a strategy is a possible excessive storage requirement, due to unnecessary basic set copies and false dependences introduced in the data-flow graph.

Figure 18A:
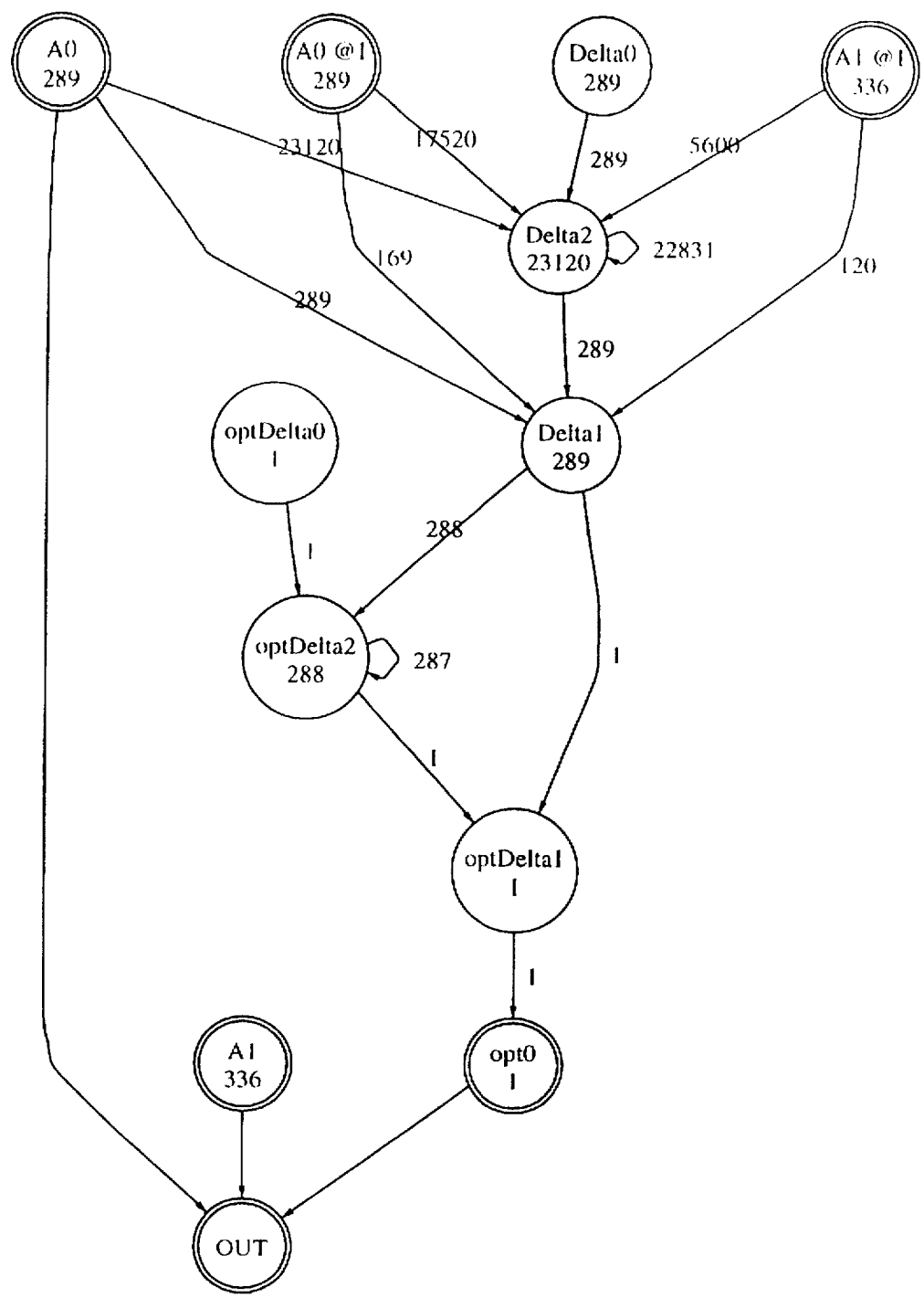
FIG. 18 displays (a) the data-flow graph for the example in FIG. 8 (M=N=20, m=n=4), and (b) the basic sets (nodes) represented in non-matrix form.

FIG. 18a shows the data-flow graph for the Silage code in FIG. 8. The basic sets corresponding to delayed signals are labeled with "@delay_value".

Granularity levels (27)

The method described so far operates on groups of signals obtained from a coarse-grain partitioning—using the index spaces of operand and definition domains directly derived from the loop organization provided in the initial code. A data-flow analysis operating at the basic set level can find out high-quality partial computational orderings in terms of storage requirements.

Reducing the size of the signal groups, more detailed partial orderings can be imposed on the more complex data-flow graph, resulting obviously in lower storage requirements. In order to decrease the groups of signals, the index spaces can be decomposed before starting the partitioning process, removing gradually the restrictions imposed iva the loop organization provided in the initial ode. This domain decomposition is carried out by slicing the n-dimensional polytopes A·i≧b into sets of (n−1)-dimensional polytopes. We name this an increase of granularity level, and the outcome is a finer-grain partitioning. The linearly bounded lattices are then newly derived and partitioned corresponding to that granularity level.

Figure 19B:
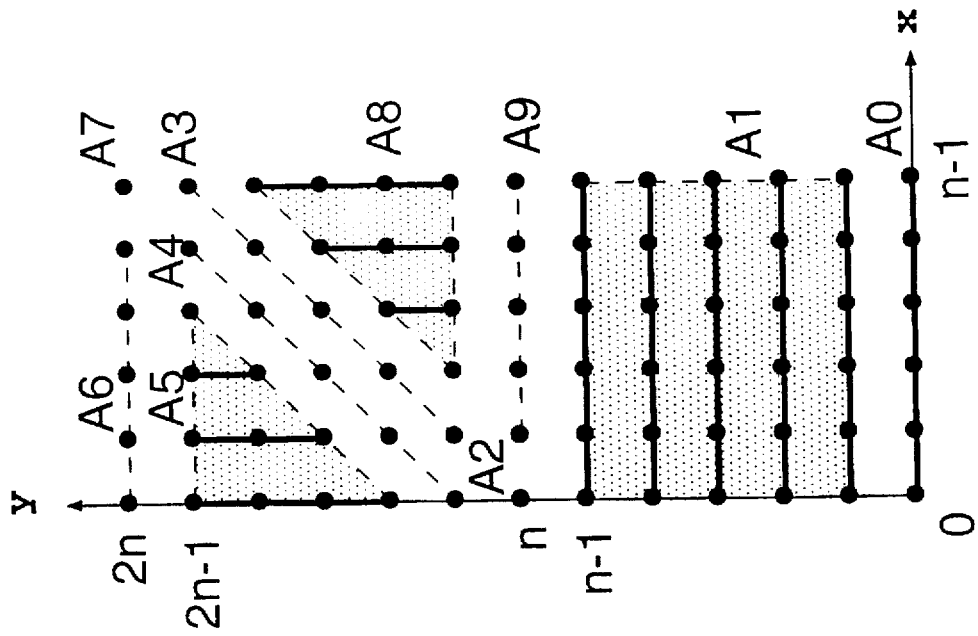
FIG. 19 shows the basic sets of signal A in the illustrative example (FIG. 10), (where x and y are the first and, respectively, the second dimension of A function of the iterators i and j)
Figure 19A:
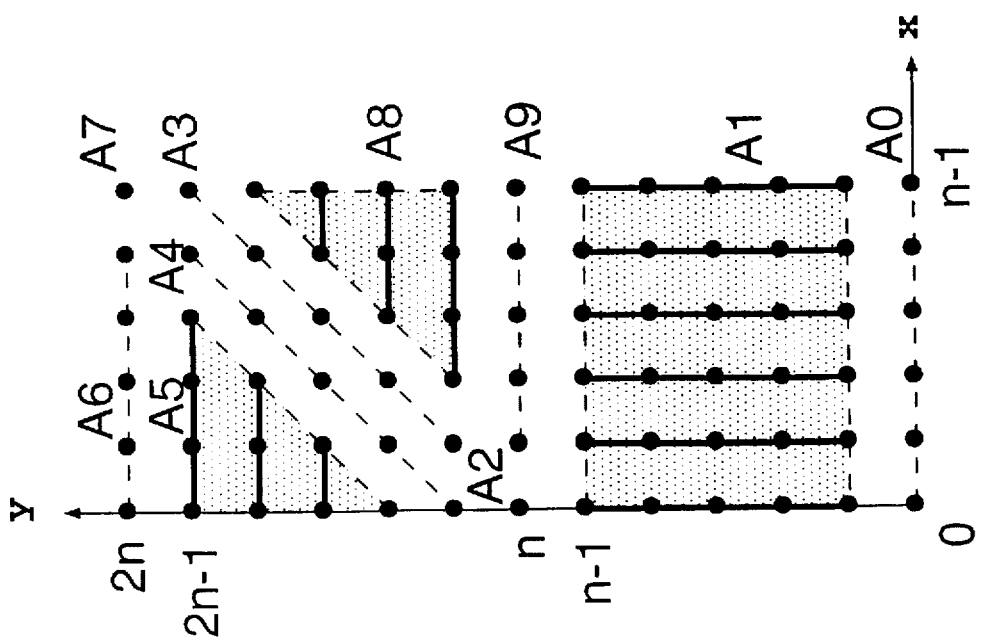

The slicing operation is carried out with a Fourier-Motzkin technique, and it can be done along any coordinate in the iterator space. FIG. 19a illustrates the index space decomposition for signal A in the example from FIG. 10 due to the slicing of the iterator space according to the first loop iterator. Similarly, FIG. 19b shows the index space decomposition due to the slicing of the iterator space according to the second loop iterator.

For the illustrative example in FIG. 10, other obvious decompositions of the signal domains can be also obtained by slicing the index space (rather than the iterator space) along the coordinates x and y. These decompositions work here because all the indices are of the form iterator+const. For the general affine case such decompositions are more difficult to achieve analytically.

It is assumed that the decomposition of the signal domains is done in the nesting order of loops (as in FIG. 19a for the illustrative example). This is equivalent to the preservation of the loop hierarchy given in the source code. However, choosing other decomposition orders within the model signifies performing loop permutations—which are always feasible, due to the single-assignment property of Silage and to the irrelevance of the statement order in the code.

FIG. 20 shows the data-flow graph obtained after the first loop level expansion: the nodes corresponding to signal A are the basic sets represented graphically in FIG. 19a.

The slicing process can be continued until the domains are eventually decomposed into scalars. The flattened data-flow analysis can therefore be obtained as a particular case. FIG. 21 shows the data-flow graph obtained after expanding two loop levels (therefore, reaching the scalar level for the illustrative example).

There are two contrasting objectives when selecting the granularity level. On one hand, the number of basic sets is rapidly increasing, which is an undesirable effect due to the growth of the computational effort. Moreover, also the complexity of the controller in the architecture to be realized will grow exponentially. On the other hand, the memory size will gradually get closer to an absolute lower bound, given that any loop can be potentially unrolled. In practice, descending to the scalar level ought to be avoided. Instead, for each application, the granularity should be gradually increased until a good trade-off is obtained.

Estimation of storage and port requirements (30)

For solving the memory size estimation problem (or estimation of storage requirements (31)) in the nonprocedural case (see FIG. 3, and for the context see FIG. 1), data-flow analysis has been for the first time employed as the main exploration strategy in F. Balasa, F. Catthoor, H. De Man, "Exact evaluation of memory area for multi-dimensional signal processing systems," *Proc. IEEE Int. Conf Comp.-Aided Design*, pp. 669–672, Santa Clara Calif., Nov. 1993. The approach was thoroughly described in F. Balasa, F. Catthoor, H. De Man, "Background memory area estimation for multi-dimensional signal processing systems," *IEEE Trans. on VLSI Systems*, Vol. 3, No. 2, pp. 157–172, June 1995. In a more recent work, data dependence information provided by the Omega test (see V. Pugh, A practical algorithm for exact array dependence analysis," *Comm. of the ACM*, Vol. 35, No. 8, Aug. 1992) has also been applied in memory size estimation (see I. Verbauwhede, C. Scheers, J. M. Rabaey, "Memory estimation for high level synthesis," *Proc. 31th Design Automation Conference*, pp. 143–148, San Diego Calif., June 1994). Although the method is very appealing in terms of speed, the assumptions regarding loop hierarchy and control flow—e.g., a nest of loops is executed in the sequence as specified in the source code, and a sequence of loops is executed in the order specified in the source code—only partly remove the procedural constraints.

Relying on the concepts of memory bounds in nonprocedural programs and in-place mapping of signals, the assessment of the minimal memory size of a RMSP algorithm is carried out by means of a heuristic traversal of the polyhedral data-flow graph (29)—created during data-flow analysis (20).

The estimation of the port requirements (36) is achieved by a partial ordering of the read/write operations within a given cycle budget (38). The evaluation of the bandwidth is done taking into account also the partial computation order (34) derived from the polyhedral DFG (20) structure and traversal.

Estimation of storage requirements (31)

The background memory estimation approach—presented in the sequel—relies on the polyhedral model of data-flow analysis. After partitioning the signals from the given RMSP algorithm (22), and after accumulating all the possible dependence information at the level of basic sets, the subsequent step is to obtain an accurate evaluation of the minimal memory size (locations) compatible with the resulting data-flow graph.

Even the simpler problem of finding the minimum number of memory locations necessary to compute a directed acyclic graph has been proven to be an NP-complete problem. Structurally, the polyhedral DFG's (29) can be more complex: they may contain cycles, as 2 groups of signals may contain 2 subsets with opposite dependences to the other group. For instance, node A3 in Fig. refDfgO represents a groups of signals included both in the operand A[i][n+i] (line (3) in Fig. refexample) and in the definition domain A[j][n+i+1] (line (4)); as node alpha0 represents the signals alpha[i]—operand in line (5) and definition in line (3)—there are two dependences of opposite direction between nodes A3 and alpha0 in the DFG.

Due to the inherent complexity of the problem, the assessment of the minimal memory size is achieved heuristically by means of a traversal of the DFG (29). It must be emphasized that the goal of this approach is to introduce only a partial operation ordering— necessary to reduce the storage requirements—while a proper scheduling implies a total ordering, which is unnecessary as already motivated in section "Context of the proposed methodology". The DFG traversal provides a (data-flow which is equivalent to a certain reorganization of the code. The procedural execution of this functionally equivalent code entails a low (eventually minimum) number of storage locations for computing the respective data-flow graph.

Applying the same approach to the DFG for a higher granularity level (27), the resulting data-flow corresponds to a certain code reorganization when the nests of loops are (implicitly!) unrolled until a depth equal to the granularity level. As the granularity is increasing, the storage requirement to compute the corresponding graph is decreasing, but the number of supplementary scheduling constraints is also increasing, as it will be shown in section "Example of storage assessment."

Memory bounds in nonprocedural languages

Example Assume we start from the illustrative RMSP Silage code in FIG. 22, where signal A is not consumed elsewhere, but all scalars B[i][j] are necessary in the subsequent code. The problem is to find out the minimum number of memory locations necessary to carry out the computation.

It must be emphasized from the very beginning that the formulation of the problem is ambiguous, as Silage is a nonprocedural language.

Assume for the moment a procedural interpretation of the code in FIG. 22. Then, it can be easily verified that no more than 101 locations are really necessary. Indeed, at each execution of the i-loop, B[i][0] can be stored in the location occupied previously by A[i], as this scalar is no longer used. Consequently, the execution of each of the first 9 i-loops will increase the necessary memory with 9 locations. The last i-loop does not require any extra storage location, as every B[9][j] can overwrite A[9+j].

Two essential implicit assumptions result whenever the code is interpreted procedurally: (1) the instructions are executed sequentially, and (2) the order of execution is directly derived from the iterations in the code. As Silage is a nonprocedural language, the assumptions mentioned above are no longer valid.

First, parallel computations may occur whenever the possibility exists. For instance, in the example in FIG. 22, all scalars B[i][j] can be computed in parallel, and the minimum storage requirement becomes 100 locations, as signal B can overwrite signal A. (However, if a perfect parallelism cannot be carried out—in the sense that some scalars B[i][j] may be computed and have to be stored before the reading of the A operands is completely finished, then a more conservative answer—i.e., 120 locations—should be given.) But they can be also partitioned in groups of, e.g., 5, and each group computed in parallel. In this latter case, the minimum number of locations depends both on the partitioning and on the group ordering.

Second, even in the case of sequential execution, there are 100! possible orders of computation. A challenging reformulation of the problem is: "Assuming the computations are carried out sequentially, what is the absolute minimum storage requirement, for all the possible computation orders?" Or, in other words, "what is the lower-bound of the minimum storage?" Another way of reformulating the problem is the following: "Assuming the computations are carried out sequentially, what is the minimum number of storage locations, independent of any computation order?" Or, in other words, "what is the upper-bound of the minimum storage?"

It is clear now that the first formulation of the problem can imply different interpretations, and therefore, different answers. The solutions for the sequential case will be discussed in the sequel.

Lower-bound of the minimum storage

It must be noticed that the computation of signal 13 necessitates at least 100 locations—as there are 100 scalars B[i][j] to be stored. As shown before, the procedural interpretation of the code implies a minimum of 101 locations. Is there any computation order for the example in FIG. 22 leading to 100 locations? The answer is affirmative: there are several ways of computing sequentially the scalars B[i][j] employing no more than 100 locations. One possible ordering is displayed in FIG. 23.

When the number of scalars to be produced is larger than the number of dying (i.e., consumed for the last time) scalars (as in the example in FIG. 22), the minimum storage situation is met when each assignment consumes for the last time no more than one scalar. Only in this situation can the memory occupied by the dying operand domains be completely overwritten by the new definition domain.

In FIG. 23, for instance, each of the 9 assignments in the third nest of loops consume for the last time one scalar: A[1], respectively A[3], . . . , A[17]. The last assignment in the second nest of loops consumes for the last time A[19] (when B[9][8] is produced). The scalars A[] having even indices are consumed for the last time in the first nest of loops. As each assignment contains at most one operand having an even index, it is not possible that two scalars A[] are simultaneously consumed for the last time.

When the number of scalars to be produced is smaller or equal to the number of dying scalars, the definition domain can be stored in-place (can overwrite the memory occupied by dying operand domains) if the computation order is such that each assignment consumes for the last time at least one scalar.

Unfortunately, there is no known algorithm of reasonable complexity able to detect the situations described above, and to generate the corresponding procedural code. Furthermore, it is not known how to determine the reachable lower-bound of the minimum storage. As Silage is a single-assignment languages each program can be flattened in a directed acyclic graph (the nodes being the scalars, and the arcs—computation dependences). As mentioned already, the problem of finding the minimum number of storage locations for the computation of a directed acyclic graph is NP-complete.

Upper-bound of the minimum storage

It must be noticed that the computation of signal B necessitates no more than 120 locations (for storing simultaneously both signals A and B). However, this upper-bound is too conservative. Indeed, as there are 20 scalars A[] consumed for the last time, and each assignment has two operands, there are at least 10 assignments (and at most 20) consuming scalars for the last time. The signals B[i][j] produced during these assignments call be stored in-place, overwriting the dying scalars A[]. In conclusion, no more than 90 scalars B[i][j] need to be stored in locations different from those occupied by A[], and therefore, no sequential ordering needs more than 20+90=110 memory locations.

Is there any computation order for the example in FIG. 22 leading to 110 locations? The answer is affirmative: there are in fact several ways of computing sequentially the scalars B[i][j] which have to employ 110 locations. One possible ordering is displayed in FIG. 24.

As it can he easily noticed, the 10 assignments in the second nest of loops consume for the last time two scalars A each: (A[0], A[1]) , respectively (A[2], A[3]), a.s.o. Consequently, the scalars B[i][i] can overwrite the scalars A[]. The 90 scalars B[i][j] (i≠j)—produced in the first nest of loops—have to be stored in different memory locations. Therefore, this computation order requires 110 locations.

However, in general, it is not possible to determine automatically the best upper-bound, and to generate the corresponding procedural code.

In order to preserve as much freedom of decision as possible for the subsequent high-level synthesis phases—operation scheduling, data-path allocation—the memory estimation and allocation model for nonprocedural languages employs storage upper-bounds. Subsequent decisions concerning the computation ordering of the code must entail readjustments of the allocation solution. Deriving good upper-hounds is crucial in order to prevent an important overallocation of memory.

High-level in-place mapping

In the example from FIG. 22 it was assumed that signal A is consumed for the last time while computing signal B. In large programs, this situation has to he detected. Moreover, it usually happens that only parts of indexed signals are consumed for the last time.

The polyhedral data-flow analysis (20) allows the determination of which parts of an M-D signal are consumed for the last time when a signal definition domain is produced. More specifically, the analytical partitioning of indexed signals (22), and the detection of dependences between partitions (basic sets) provide the solution. This information, together with the partition sizes and the number of dependence between them, allows the detection of the possibility of storing signals in-place independent of the computation order, and at the same time, to derive tight upper-bounds for the storage currently occupied when the groups of signals are produced.

The problem of in-place mapping refers to the possibility that signals in a RMSP algorithm share the same memory locations during algorithm execution. This problem may be approached from two viewpoints:

(1) high-level in-place mapping—referring to the memory sharing clue to the data-flow, hence independent of any detailed operation ordering;

(2) low-level in-place mapping—which refers to the same issue but dependent on the full operation ordering. Moreover, this form of in-place must be carried out separately for each memory module. The low-level in-place depends, therefore, on the distributed memory architecture and on the signal-to-memory assignment.

If the latter problem can be tackled with a symbolic or scalar-oriented technique, the former is more difficult as it requires the computation of tight upper-bounds on the (usually huge) set of valid operation orderings.

The polyhedral data-flow graphs (29) contain sufficient embedded information in order to derive tight memory upper-bounds, independent of the production order—which will be decided later.

Several cases of upper-bound determination will be considered in the sequel. These cases represent essential situations encountered when computing a data-flow graph. The more complex ones can be reduced to, or can be solved by simple extensions of the cases below.

Figure 25D:
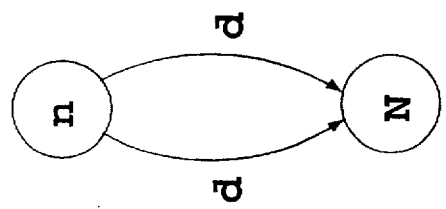

A. Suppose a DFG contains two basic sets of n, respectively N, scalars each, and there are d dependences between these basic sets (FIG. 25a). Suppose also that no other basic set in the DFG depends on basic set n,—already produced. Analyzing the variation of the memory size when basic set N is produced, a conservative observation is that the occupied memory could have a relative growth of MemoryIncrease=N locations (see FIG. 26a). After the production of the N scalars (no matter in which order, as the code is nonprocedural), the n scalars consumed for the last time are no longer necessary, and the corresponding storage can be freed: MemoryDecrease=n.

Figure 26B:
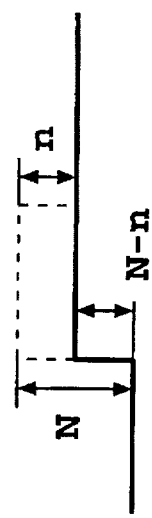
Figure 26C:
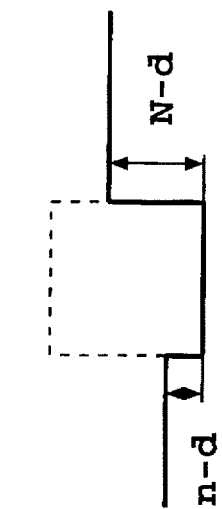

Taking a closer look, two situations may occur:

(1) if $d \geq n$, only $d-n$ scalars from the basic set N need new storage locations (and, eventually, the N–d scalars that, in fact do not depend on the basic set n) (see FIG. 26b).

(2) if $d < n$, it follows that n–d scalars in the basic set n are no longer necessary and they can be eliminated immediately—before the production of the N scalars. After this memory decrease, a situation as described previously in (1) is obtained (as the number of dependences is now equal to the number of scalars in n). At this moment, a relative memory increase of N–d is expected (see FIG. 26c).

In both cases, the relative increase of the occupied storage is MemoryIncrease=max{N–n, 0}, instead of N—as we would be tempted to answer at a quick glance.

Example In the DFG from FIG. 15, the computation of the basic set A0 ($A[j][0]$, $j=\overline{0,5}$), which depends on the basic set in0 (the input scalar in), implies a relative increase of the occupied memory of max {6–1, 0}=5 locations. Indeed, the last scalar $A[j][0]$, whichever it is, can overwrite the input scalar in (see line (1) in the Silage code from FIG. 10).

B. Suppose the basic set N depends on two basic sets containing $n_1$, respectively $n_2$ scalars, the number of dependences being $d_1$ and, respectively, $d_2$. There are two possibilities: (1) the definition domain covering the basic set N is produced while consuming a single operand domain. In this case, the scalars in the basic sets $n_1$ and $n_2$ are consumed sequentially (see FIG. 25b), and the relative increase of the memory is MemoryIncrease=$(d_1-n_1)+(d_2-n_2)+(N-d_1-d_2)=N-n_1-n_2$ (2) the computation of the definition domain relies on two operand domains. In this case, the scalars in the basic sets $n_1$ and $n_2$ are consumed simultaneously (see FIG. 25c); therefore $d_1=d_2 def/=d$, and the growth is upper-bounded by:

$$\text{MemoryIncrease}=min\{d-n_1, d-n_2\}+(N-d)=N-max\{n_1, n_2\}$$

Figure 25C:
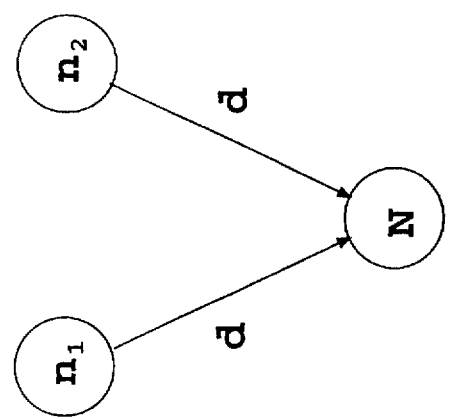
Figure 25B:
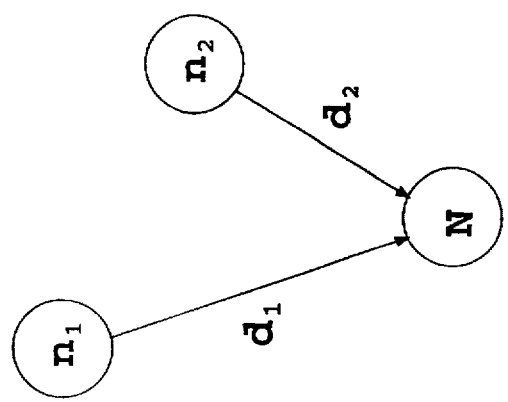
Figure 25A:
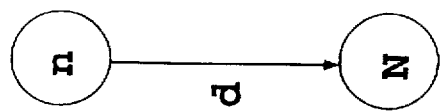

Example $(i : 1 \ldots n) ::$
$\quad (j : 1 \ldots m) :: \quad B[i][j] = A[0] + A[j];$ The DFG is of the form displayed in FIG. 25c, where $n_1=1$, $n_2=m$ (corresponding to $A[0]$, respectively $A[j]$), N=nm (corresponding to $B[i][j]$), and $d_1=d_2$=nm. It can be easily noticed that, independent of any computation order of $B[i][j]$, MemoryIncrease=(n–1)m. But also N–max{$n_1, n_2$}= nm–max{1, m}=(n–1)m.

It must be emphasized that N–max {$n_1, n_2$} is an upper bound which might not be necessarily reached:

Example $(i : 1 \ldots n) ::$
$\quad (j : n+1 \ldots n+m) :: \quad B[i][j] = A[i] + A[j];$ requires a relative memory increase of (n–1)(m–1)=nm–(n+m–1), independent of any computation order. But n+m–1>max{n,m} if n,m>1.

The situation described here can be extended without any difficulty to the case when the basic set N depends on several basic sets $n_i$, consumed for the last time.

A special case for the situation presented in FIG. 25c is displayed in FIG. 25d—where the two basic sets $n_1$ and $n_2$ coincide. The upper-bound of the relative memory growth is $$\text{MemoryIncrease} = \left\lfloor \frac{2d-n}{2} \right\rfloor + (N-d) = N - \left\lceil \frac{n}{2} \right\rceil$$

Example (i: 0 . . . 10)::$B[i]=A[i]+A[10-i]$;

The DFG is of the form displayed in FIG. 25d—where N=n=d=11. As it can be easily noticed, the upper bound of the memory increase is $$\text{MemoryIncrease} = N - \left\lceil \frac{n}{2} \right\rceil = 11 - \left\lceil \frac{11}{2} \right\rceil = 5$$

and it is effectively reached when, for instance, the code is executed procedurally.

C. More difficult situations appear when nodes in the DFG have self-dependence arcs. Such cases are due to recurrence relations between the elements (scalars) of the same indexed signal, as shown in FIG. 27a, where the basic set A3 represents the index space A3={$x=i | 8 \geq i \geq 3$}. Analyzing the memory variation while computing the DFG in FIG. 27a, it is clear that the basic sets A0, A1, A2 have to be computed first (in any order), and the required storage so far is 3 locations. The production of A3 is carried out with one operand domain. There are 3 dependences emerging from A3 towards other basic sets, which means that at most 3 scalars from A3 are needed to proceed the computation of the graph, the others being necessary for the self-computation of A3. This implies that, in the worst case, 2 extra locations are needed by the production of A3: indeed, the first scalar of A3 cain overwrite one of the previous basic sets, say A0; the next two scalars of A3 could require new locations; but afterwards, the next scalars can overwrite either A1, A2, or the older elements of A3. In conclusion, the upper-bound of the relative storage increase is 2 locations (for the whole DFG being 5 locations).

It must he emphasized that this is the best estimation we can get from the DFG in FIG. 27a. At this granularity level (27), the insufficient information concerning the computation of A3—the internal dependences of A3, as well as the dependences between its components and the other basic sets—do not allow a more precise estimation of the memory requirement. Increasing the granularity level, the DFG expanded one loop level (FIG. 27b) offers sufficient information to derive one of the 6 best computation orders:

A[0]=in; (i: 3 ... 9 ... 3)::A[i]=A[i−3]; out[0]=A[9];

and so on, which requires only 2 locations—the absolute minimum value, for any computation order. It has to be remarked that, for the simpler recurrence relation A[i]=A[i−1]+ ..., the minimal storage requirement of one location is detected even on the granularity level 0 (see FIG. 28).

Multiple recurrence relations between elements of the same indexed signal can create multiple self-dependence arcs (see FIG. 29a). With a similar reasoning as above, the upper-bound of the relative memory increase is 1 location for the production of the basic set A36 (the scalars A[3], A[4], A[5], A[6]), and respectively 1 location for the production of A78 (the scalars A[7], A[8]). For the whole DFG in FIG. 29a, the upper-bound of the storage requirement is 5 locations. Going one granularity level deeper (see FIG. 29b), it can be noticed that 3 locations are enough for any valid computation ordering.

All the cases discussed allow to compute the local memory upper-bounds in data-flow graphs by applying simple formulas. The more complex cases can be solved similarly: for instance, the computation of a domain of AN scalars with k nonoverlapping operands (rather than 2 in FIG. 25c) requires at most N−max{$n_1$, ... $n_k$} locations, where $n_i$ denotes the number of scalars of the i-th operand.

Data-flow graph traversal

The DFG traversal attempts to find the best possible ordering in which the basic sets of signals should be produced such that the memory size is kept as low as possible. This operation carries out, at the same time, an estimation of the storage requirements (31) for the given RMSP algorithm. The DFG traversal takes into account the mapping in-place (at high level) of the basic sets of signals, relying on memory upper-bounds—computed as explained earlier.

It is assumed that a basic set can be produced only after the production of all basic sets having dependences to it. It is assumed, also, that, basic sets of signals are produced sequentially. However, it is possible to extend this model in order to allow also parallel production of basic sets. The difficulty does not consist in the determination of memory upper-bounds for parallel computation. The main problem is to determine beforehand which basic sets should be computed in parallel—as such a decision entails a potential increase of the data-path (unknown at this design stage). A global solution is 1. to extract the (largely hidden) parallelism from the initial source code in the form of do__all loops; afterwards,
2. to determine the lowest degree of parallelism for the do__all loops needed to meet the throughput and hardware requirements. In this way the basic sets of signals to be computed in parallel will be known at this stage.

While producing a basic set, an increase of memory size occurs (see FIG. 30a). This increase is followed by an eventual decrease, representing the total size of basic sets consumed for the last time (having no other dependence relations towards basic sets still not produced). The production of a basic set may not affect the current value of the maximum memory size—registered after starting the traversal (FIG. 30a) or may lead to exceeding this value (MaxMemorySize) which has to be therefore updated (FIG. 30b). The amount of the memory is yielded by the worst-case in-place mapping.

The traversal takes into account that the delayed signals are already stored in the memory from the previous sample processings. The aggregates of constants, usually stored in ROM's, are permanently residing in the memory.

Figure 3:
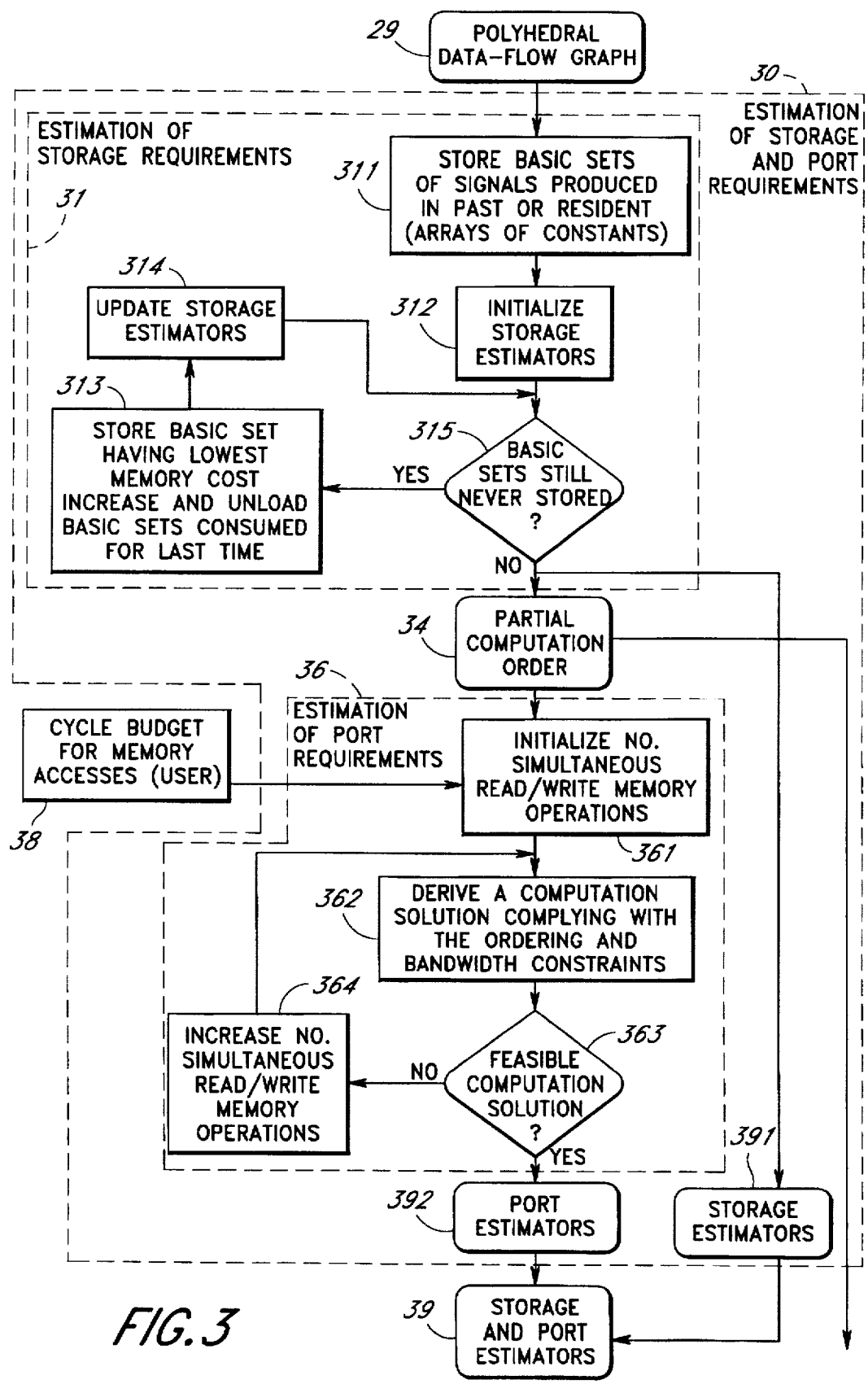
FIG. 3 is a flowchart illustrating the phase of estimation of storage and port requirements, shown in FIG. 1.

Taking into account the remarks and assumptions mentioned above, the data-flow graph traversal works according to the following general scheme (31), displayed in the flowchart from FIG. 3:

--- store the basic sets produced in past sample periods (delay ≠ 0)
    or permanently resident in the memory (arrays of constants) (311)
initialize the storage estimators (e.g., the values of MemorySize and MaxMemorySize
    to the total size of the basic sets stored so far) (312)
do {
    for all basic sets still never stored, but having all the ancestors stored
        compute the cost function $\lambda_1$·peak + $\lambda_2$·(MemoryIncrease − MemoryDecrease)
        where peak = max {0·MemorySize + MemoryIncrease − MaxMemorySize}
    store (any of) the basic set having the lowest memory cost increase,
        and unload the basic sets consumed for the last time (313)
    update the storage estimators (314), for instance
        MemorySize      + = MemoryIncrease − MemoryDecrease
        MaxMemorySize   + = peak
} until all basic sets are produced // Basic sets in the DFG still never stored ? (315)

---

This is a relatively greedy approach, but it is based on a thorough global analysis for deriving the tightest storage upper-bounds which decide on the order of the basic set production. Branch-and-bound or look-ahead techniques can also be applied in order to find a better (or even optimal) computation ordering at basic set level. However, the size of the data-flow graphs and the large number of possibilities for realistic applications can imply a serious computation overhead, without significant storage improvements.

The output of the estimation of storage requirements (31) consists of several storage estimators (391)—as MaxMemorySize (representing the total amount of locations necessary to execute the RMSP algorithm), and a partial computation order (34) at the level of basic sets—when the specification is nonprocedural. Other storage estimators (391) are required by the optimization problem of background memory allocation (40) and will be mentioned gradually.

Example of storage assessment

The memory size evaluation methodology is exemplified for the Silage code in FIG. 8. The number of memory locations required for the algorithm execution is approximated with the number of locations necessary to compute its data-flow graph for a chosen granularity level. For instance, choosing the level equal to 0, we have to compute the number of locations required for the computation of the DFC, in FIG. 18.

According to the traversal scheme presented above, the basic sets are produced/loaded in the order: A0@1, A1@1, A0, Delta0, Delta2, Delta1, optDelta0, optDelta2, optDelta1, opt0, A1. This traversal yields (taking into account the in-place mapping) Memory.Size.=(M+m+1)(N+n+1)+2(M−m+1)(N−n+1)=1203 for the chosen values of the parameters (M=N=20, m=n=4). Only two partial constrains are essential to guide the subsequent scheduling stage: the basic set optDelta0 must be produced after Delta1, and the input basic set A1 must be loaded after the production of opt0. The equivalent source code compatible with the proposed ordering is shown in FIG. 31.

The increase of the granularity level entails a data-flow analysis with smaller groups of signals. This provides lower values for the memory size at the expense of the gradual expansion of the loop organization. At the same time, more constraints are conveyed to the scheduler. The memory size evaluation for the data-flow graph corresponding to granularity level 1 yields a storage requirement of 660 locations. The variance of the memory size during the algorithm execution compatible with the graph traversals is displayed in FIG. 32 for the DFG's of granularity levels 0 and 1. Similar evaluations for granularity levels 2, 3, and 4—the scalar level—yields the same memory size, i.e., 627 locations. The analysis of the code in FIG. 8 shows that (M+m+1)(N+n+1)+2=627 locations represents indeed the absolute lower-bound on storage.

This example also shows that it is not necessary, to descend to the scalar level in order to obtain a significant reduction for the memory size. Furthermore, even more crude evaluations for lower granularity levels (as that one corresponding to level 1) may be considered good enough for this stage of the synthesis. As the amount of constraints is relatively reduced, there is more freedom for scheduling, low-level in-place mapping, and data-path allocation. Further memory adjustments can be made afterwards, taking into account the detailed ordering and scheduling decisions.

Estimation of port requirements (36)

Once a partial computation order (34) at basic set level is introduced by means of the data-flow graph traversal, the next step is the bandwidth estimation, subject to a given budget of cycles necessary to accomplish read/write operations from or into the background memory. Note that the data-path is still unknown, and therefore, the global throughput information cannot be directly employed.

The problem can be obviously reduced to the determination of the maximum simultaneous read and write operations, talking into account: (1) the computation order of the basic sets of signals, and (2) the maximum number of cycles intended for memory operations.

A simple heuristic scheduling-type algorithm (36) is employed (see FIG. 3). The number of simultaneous read/write operations is initialized (361) with [#RW/cycle__ budget] (where #RW is the total number of memory accesses), and afterwards it is gradually increased (364) until the detection of a feasible computation solution (363), complying with the two constraints mentioned above (362).

The resulted port estimators (392) are employed for modeling the background memory allocation (40) as an optimization problem, as it will be explained in the sequel.

In order to ensure a reasonable stopping criterion, the bandwidth is potentially increased until a threshold value—derived from the maximum desired computation parallelism—is reached. For instance, if a sequential computation is desired, the threshold value is equal to one plus the maximum number of operands in the RMSP algorithm necessary to produce a definition domain. This choice is justified by the fact that this number of ports is sufficient to allow in one cycle the reading of all operands of any signal instance, followed by its production and writing into the memory. If no global computation solution can be found under these circumstances, then the cycle budget has to be increased, or to accept more parallelism.

Allocation of multiport memories

Figure 4:
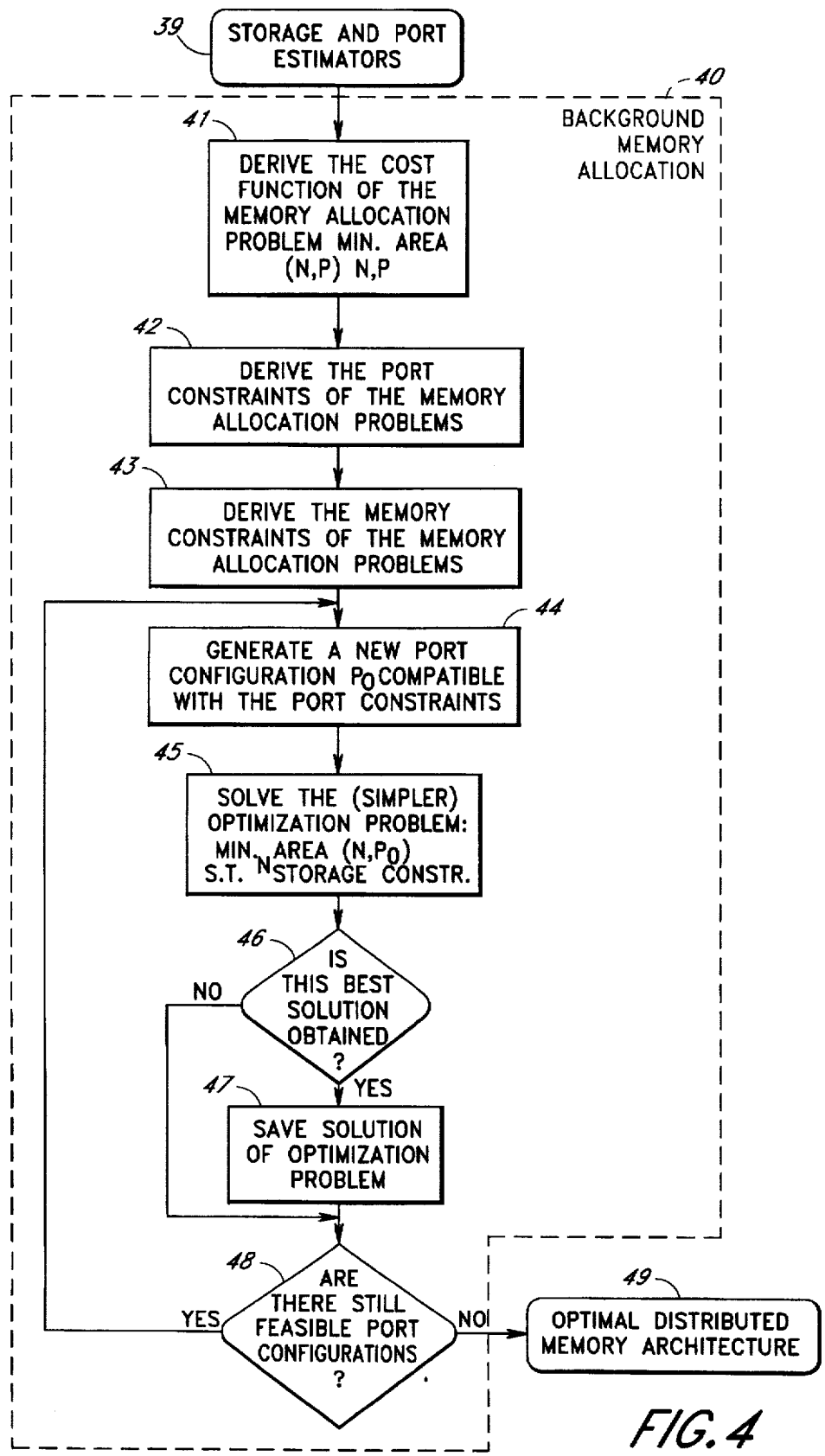
FIG. 4 is a flowchart illustrating the phase of memory allocation, shown in FIG. 1.

The proper problem of background memory allocation (40) for real-time multi-dimensional signal processing algorithms is addressed in the sequel (see FIG. 4, and for the context see FIG. 1). The proposed approach is driven by the data-flow embedded in the behavioral specification, which leads to a larger flexibility in the search space exploration compared to the previous scheduling-driven solutions. Relying on the polyhedral model of data-flow analysis, this novel technique can handle affine behavioral specifications, containing large multi-dimensional signals.

The background memory allocation (40) is modeled as a global optimization problem, which minimizes the estimated storage silicon area, while complying with imposed performance constraints. The data-flow driven allocation, representing a major contribution of this invention, can be extended in order to deal with more complex cost functions—based on area or power models for on-clip memories.

The allocation approach is currently not addressing a number of memory-related issues. Some of these topics imply decisions which should precede the allocation as, e.g., distributed memory architectures with multilevel hierarchy, or the use of pointer-addressing memories. Other issues are generally, postponed till after the memory allocation, as the on or off-chip decision. The main limitation of the model is that it does not consider distinct memory latencies. The reason is that the allocation model is not conceived for employing a library with memories having characteristics known in advance. Extensions to address all these memory-related topics in an automated way have to be investigated in the future.

Modeling memory allocation as an optimization problem

Assuming that the word-lengths of the signals in an RMSP algorithm are $b_1 > \ldots > b_m$, and denoting with RW(i) the maximum number of simultaneous R/W operations of signals having the word-length $b_i$ bits ($i=\overline{1,m}$), there must be at most RW(i) memories of $b_i$ bits word-length. In addition, signals with word-length $b_{i+1}, \ldots b_m$ smaller than $b_i$ may also share the same memory unit of $b_i$ bits, of course.

$N_{ij}$ and $P_{ij}=P_{ij}'+p_{ij}''+p_{ij}'''$ denote the number of locations, respectively the number of ports, of memory j from the collection of at most RW(i) memories which can have storage cells of $b_i$ bits wide. The superscripts of ports denote the read, write, and read/write functions.

In conclusion, there is a distributed configuration of m groups of memories, each group being characterized by a word-length of $b_i$ bits (FIG. 33). The number of memories in each of the mi groups is still unknown. But the ranges of these numbers are known to be 0÷RW(i), for i=1, . . . . m. (The values of RW(i) are port estimators (392) and they are determined during (36). Also the number of locations $N_{ij}$, and the port configuration $p_{ij}^{r/w/rw}$ of each of the selected memories are not known initially.

The goal of the optimization approach—described in the sequel—is to determine all the variables of the distributed memory configuration in FIG. 33, such that the total silicon area occupied by the memories is minimal.

The cost function of the memory allocation problem (41)

The cost function to be minimized is the total area estimation:

$$\text{Cost} = \sum_{i=1}^{m} \sum_{j=1}^{RW(i)} \text{Area}_{ij} \quad (7)$$

where $\text{Area}_{ij}$ denotes the area of memory j from the i-th collection of at most RW(i) memories which can have storage locations of $b_i$ bits. As already mentioned, RW(i) represents the maximum number of simultaneous R/W operations of signals having the word-length of $b_i$ bits. These values are determined during the estimation of port requirements (36)—which monitors not only the global number of simultaneous memory accesses, but also the simultaneous R/W operations for the classes of signals with different word-lengths, or ranges of word-lengths.

For the assessment of the actual silicon area occupied by the global background memory, the model presented in J. M. Mulder, N. T. Quach, M. J. Flynn, "An area model for on-chip memories and its application," *IEEE J. Solid-State Circ.*, Vol. SC-26, No. 2, pp. 98–105, Feb. 1991 is employed. The Mulder model incorporates also the overhead area, as drivers, sense amplifiers, address decoder, and control logic. This area model proved to be suitable for comparing the size of memories of different organizations, yielding no more than 10% error when verified against real memories (see J. M. Mulder, ibidem). According to this model, the actual silicon area occupied by a RAM is given by the formula:

$$A = \text{TechnologyFactor} \cdot \text{bits} \cdot (1+\alpha \text{Ports}) \cdot (N+\beta) \cdot [1+0.25(\text{Ports}+\text{Ports}_{rw}-2)] \quad (8)$$

where:

TechnologyFactor is a technology scaling factor, equal to $(\text{min\_geometry } [\mu]/2)^2$;

bits—the width of a memory location in bits;

N—the number of storage locations;

Ports—the total number of ports (read, write, and read/write);

Ports$_{rw}$—the number of read/write ports;

$\alpha$ and $\beta$—constants, which recommended values are 0.1, respectively 6÷12, in benchmark tests.

The area is expressed in an empirical unit, equal to the area of a register cell of 37×55 μm, in a CMOS technology with 2 μm minimum geometry. Scaling factors of 0.6 for SRAM's, respectively 0.3 for DRAM's, are also recommended (see J. M. Mulder, ibidem).

The area of memory (ij) can be expressed—according to Mulder's model—as:

$$\text{Area}_{ij} = \begin{cases} TF \cdot b_i(1+\alpha P_{ij})(N_{ij}+\beta)[1+0.25(P_{ij}+p_{ij}^{rw}-2)] \\ 0, \text{ if } N_{ij}=0 \\ 0, \text{ if } P_{ij}=0 \end{cases} \quad (9)$$

The variables of the objective function (7) are the storage locations $N_{ij}$ and the ports $p_{ij}^{r/w/rw}$ ($P_{ij}=p_{ij}^{r}+p_{ij}^{w}+p_{ij}^{rw}$).

It has to be remarked that the cost function is nonlinear on its definition domain ($N_{ij}$, $p_{ij}^{r}$, $p_{ij}^{2}$, $p_{ij}^{rw}$). Moreover, it presents discontinuities in the points (0, $p_{ij}^{r}$, $p_{ij}^{2}$, $p_{ij}^{rw}$), and ($N_{ij}$, 0,0,0).

The optimization process—described in the sequel—may yield a minimum cost in a point of the definition domain where some coordinates are zero. If, for instance, $N_{ij}$=0, this signifies that memory (ij) does not exist. Solving the optimization problem, the number of memories in each of the m groups (see FIG. 33) results as well.

The port constraints of the memory allocation problem (42)

It is assumed for the moment that the background memory architecture is composed only of random-access memories for data The modifications needed for handling also constant storages will be mentioned afterwards.

There are two categories of constraints, the former referring to ports, and the latter referring to storage locations.

The first set of port constraints limits the number of memory ports for each of the m groups in FIG. 33. The memories having the word-length equal to $b_k$ bits (the k-th group), for instance, can be shared by the signals of $b_k$ bits and below—($b_k, \ldots, b_m$)—from the given RMSP algorithm. Therefore, their total number of ports which can be employed for, e.g., read accesses need not be higher than the maximum number of simultaneous read operations referring to signals of word-length in the range ($b_k, \ldots, b_m$):

$$\sum_{j=1}^{RW(k)} (p_{kj}^{r}+p_{kj}^{rw}) \leq R(\overline{k,m}) \quad (10)$$

$$\sum_{j=1}^{RW(k)} (p_{kj}^{w}+p_{kj}^{rw}) \leq W(\overline{k,m})$$

$$\sum_{j=1}^{RW(k)} P_{kj} \leq RW(\overline{k,m})$$

for k=$\overline{1,m}$, $R(\overline{k,m})$, $W(\overline{k,m})$, and $RW(\overline{k,m})$ are the maximum number of simultaneous read, respectively write and read/write, accesses referring to signals of word-length $b_k$ and below, that is in the range ($b_k, \ldots, b_m$). These values, as well as RW(k), are port estimators (392)—determined during the estimation of port requirements (36). (In fact, RW(k)≡RW($\overline{k,k}$).)

For instance, in FIG. 34, it is clear that the two signals with $b_1$>$b_2$ can share the same $b_1$-bit memory so there are at most $R(\overline{1,2})$=3 simultaneous read accesses needed for a memory with $b_1$ bits and at most $R(\overline{2,2})$=2 for a $b_2$-bit wide memory.

The second set of port constraints ensures that the number of ports for all memories having the word-length in the range ($b_1, \ldots, b_k$) (i.e., the first k groups in FIG. 33) is sufficient for the accesses of all signals of at least $b_k$ bits. For instance, the total number of ports of all memories of $b_1$ bits word-length must be higher than, or at least equal to, the maximum number of simultaneous read/write operations needed by the signals of $b_1$. Similarly, as the signals of $b_1$ and $b_2$ bits in the given RMSP algorithm can be stored only in memories with a word-length of $b_1$ or $b_2$ bits, the total number of ports of these two groups must be sufficient in order to ensure all the possible simultaneous memory accesses concerning these signals. Formally, these requirements can be expressed as:

$$\sum_{i=1}^{k}\sum_{j=1}^{RW(i)} (p_{ij}^r + p_{ij}^{rw}) \geq R(\overline{1,k}) \quad (11)$$

$$\sum_{i=1}^{k}\sum_{j=1}^{RW(i)} (p_{ij}^w + p_{ij}^{rw}) \geq W(\overline{1,k})$$

$$\sum_{i=1}^{k}\sum_{j=1}^{RW(i)} p_{ij} \geq RW(\overline{1,k})$$

for $k=\overline{1,m}$. $R(\overline{1,k})$, $W(\overline{1,k})$, and $RW(\overline{1,k})$ are the maximum number of simultaneous read, respectively write and read/write accesses referring to signals of word-length $b_k$ or more, that is, in the range $(b_1, \ldots b_k)$. These values are also port estimators (392) determined during step (36).

Besides the integrality and nonnegativity condition for all the $p_{ij}$ variables, another set of port constraints ensures that each memory (ij) has both read and write accesses (the data storage assumption):

$$p_{ij}^4 = p_{ij}^{rw} = 1 \rightarrow p_{ij}^w = 0 \quad p_{ij}^2 = p_{ij}^{rw} = 0 \rightarrow p_{ij}^r = 0$$

Linear constraints modeling these conditions are, e.g.:

$$W(\overline{1,m})(p_{ij}^r + p_{ij}^{rw}) \geq p_{ij}^w \quad R(\overline{1,m})(p_{ij}^w + p_{ij}^{rw}) \geq p_{ij}^r \quad (12)$$

Indeed, the implications above result from the inequalities (12). Moreover, if the left-hand side of an implication is not true, then the corresponding inequality in (12) does not introduce in fact any supplementary constraint, as the inequality is anyhow verified because of the constraints (10). Example If an RMSP algorithm contains signals of $b_1=16$ bits and $b_2=12$ bits (mn=2), and the maximum number of simultaneous read, write, and read/write accesses are respectively:

| | | | | | | | | | |
|---|---|---|---|---|---|---|---|---|---|
| $R(\overline{1,1})$ | ≡ | $R_{16b}$ | = | 2 | $R(\overline{1,2})$ | ≡ | $R_{16b,12b}$ | = | 2 | $R(\overline{2,2})$ | ≡ | $R_{12b}$ | = | 1 |
| $W(\overline{1,1})$ | ≡ | $W_{16b}$ | = | 1 | $W(\overline{1,2})$ | ≡ | $W_{16b,12b}$ | = | 2 | $W(\overline{2,2})$ | ≡ | $W_{12b}$ | = | 1 |
| $RW(\overline{1,1})$ | ≡ | $RW_{16b}$ | = | 2 | $RW(\overline{1,2})$ | ≡ | $RW_{16b,12b}$ | = | 2 | $RW(\overline{2,2})$ | ≡ | $RW_{12b}$ | = | 1 | then, the allocation model takes into account the possibilities of having 2 memories of 16 bits and 1 memory of 12 bits with 6 distinct (i.e., nonsymmetric) port configurations, or 2 memories of 16 bits with 3 distinct port configurations, or 2 memories—one of 16 bits and one of 12 bits—with 6 distinct port configurations, or only one memory of 16 bits with 3 possible port configurations. This shows the large search space available even for a simple example.

Besides the port constraints (10) (11), (12), the current implementation also allows user interaction: optionally, a predefined set of port configurations can be imposed (e.g., maximum two ports per memory). In this case, only the valid port configurations are retained and analyzed by the tool.

The aggregates of constant signals to be stored, e.g., in ROM's are detected beforehand, in the given RMSP algorithm. In order to handle architectures with data and constant storage, similar constraints to (10) and (11) are derived for the aggregates of constant signals:

$$\sum_{j=1}^{R(k)} p_{kj}^r \leq R(\overline{k,m}) \text{ and }$$

-continued $$\sum_{i=1}^{k}\sum_{j=1}^{R(i)} p_{ij}^r \geq R(\overline{1,k}) \quad \forall k = \overline{1,m}$$

The storage constraints of the memory allocation problem (43)

The second category of constraints refers to memory locations, and they are similar to the port constraints (10) and (11).

The first set of storage constraints limits the number of locations for each of the mn groups in FIG. 33. The memories having a word-length equal to $b_k$ bits (the k-th group), for instance, can be shared by the signals of $b_k$ bits and below—$(b_k, \ldots, b_m)$. Therefore, their total number of locations need not be higher than the maximum number of scalars simultaneously alive, having a word-length in the range $(b_k, \ldots, b_m)$:

$$\sum_{j=1}^{RW(k)} N_{kj} \leq \text{MaxNrScalarsAlive}(\overline{k,m}) \quad \forall k = \overline{1,m} \quad (13)$$

The second set of storage constraints ensures that the number of locations for all memories having a word-length in the range $(b_1, \ldots b_k)$ is sufficient for the simultaneously alive signals of at least $b_k$ bits. For instance, the total number of locations for all memories of $b_1$ bits word-length must be higher than, or at least equal to, the maximum number of simultaneously alive signals of $b_1$ bits. Similarly, as the signals of $b_1$ and $b_2$ bits in the RMSP algorithm can be stored only in memories having a word-length of $b_1$ or $b_2$ bits, the total number of locations of these two groups must be sufficient in order to ensure the storage of all the possible simultaneously alive scalars. Formally these requirements can be expressed as:

$$\sum_{i=1}^{k}\sum_{j=1}^{RW(i)} N_{ij} \geq \text{MaxNrScalarsAlive}(\overline{1,k}) \quad \forall k = \overline{1,m} \quad (14)$$

MaxNrScalarsAlive($\overline{k,m}$), and MaxNrScalarsAlive($\overline{1,k}$) are the maximum number of scalars simultaneously alive, belonging to signals of word-length $b_k$ and below (that is, in the range $(b_k, \ldots, b_m)$), respectively of word-length $b_k$ or more (that is, in the range $(b_1, \ldots, b_k)$). These values are storage estimators (392): they are determined during the data-flow graph traversal, i.e. the estimation of storage requirements (31).

No integrality condition is imposed for the moment on the variables $N_{ij}$ (although they should be rounded to integer numbers). The reason is the following: if the allocation problem computes the "optimal" real-valued sizes of the memories, the computational complexity can be reduced without really affecting the final quality. Indeed, only after the signal-to-memory assignment phase (50)—when all signals are placed into memories— the final (integer) sizes of the memories can be determined, trying to match as well as possible these "optimal" dimension values.

Solving the optimization problem

The allocation model presented so far represents the minimization of a nonlinear and discontinuous cost function, with linear constraints and mixed (integer and real) nonnegative variables. As there is no "classical" optimization approach for such programming problems, the method employed to solve it is mainly based on the property that the constraints are naturally decoupled: some constraints are referring to ports and the others are referring to storage locations. By considering the port variables as parameters, and by assigning specific values to these, the cost function becomes linear in the $N_{ij}$ variables (if the discontinuities for $N_{ij}=0$ are neglected). This observation is the key idea of the proposed optimization strategy:

1. The port constraints (10), (11) and (12) determine a polytope (see FIG. 35). All the integer lattice points of this polytope represent a possible configuration of ports. The lattice points are generated with a Fourier-Motzkin (see G. B. Dantzig, B. C. Eaves, "Fourier-Motzkin elimination and its dual," *J. of Combinatorial Theory* (A), Vol. 14, pp. 288–297, 1973) technique: the routine CountPrefixes, thoroughly described in section "Computing the size of linearly bounded lattices," is actually employed, where the parameter r is equal to the dimension of the port polytope.

2. In each of the lattice points generated in step 1 (for each possible port configuration), an LP optimization is performed—slightly modified, in order to comply with the discontinuities of the cost function for $N_{ij}=0$—having $N_{ij}$ as variables, subject to the constraints (13) and (14).

The general allocation scheme determined in terms of number and type of memories, number and type of ports, word-lengths, and estimated number of locations. The computational effort mainly depends on the size of the "port" polytope (constraints (10), (11), (12)), as an LP optimization must be done in all its lattice points. In practice, the number of realistic port configurations is relatively small, though not feasible to enumerate manually. Examples leading to "port" polytopes of up to hundreds of points have been evaluated: the computational effort remained eaten then of the order of seconds.

Example In the illustrative Silage example in FIG. 10, there are only 16 bit signals, therefore m=1. If the value of the granularity level (27) is chosen to be 1, the data-flow graph traversal yields a maximum number of scalars (of 16 bits) alive of $$\text{MaxNrScalarsAlive}(1,1) = \text{MaxNrScalarsAlive}_{16b} = 11$$

Consequently, the storage constraints (13) and (14) can be represented as call $N_{11}+N_{12}=11$.

Assuming a budget of 200 cycles for memory accesses, the maximum number of simultaneous read, respectively write and read/write, accesses are determined during the estimation of port requirements (36):

$$R(\overline{1,1})=R_{16b}=2 \ W(\overline{1,1})=W_{16b}=1 \ RW(\overline{1,1})=RW_{16b}=2$$

The procedure GeneratePortConfigurations finds 5 relevant memory structures—displayed in the first two col-

---

```
GeneratePortConfigurations (constraints (10), (11), (12) ; PortConfigCltn); (44)
    for each feasible port configuration (48) [p₁₁ʳ,p₁₁ʷ,p₁₁ʳʷ . . .] ≝ P₀ ∈ PortConfigCltn
        if ( P fits one of the port patterns imposed by the designer
            && P is not symmetrical to an already processed configuration) then {
            replace P in the cost function (7); // Cost = Area(Nᵢⱼ,P) is obtained
            solve the (simpler) optimization problem (45)

min  Area(Nᵢⱼ,P)    s.t. constraints (13) and (14)
                Nᵢⱼ if this solution is the best one obtained (46) // optionally, among the k best
                store (optArea,N opt,P); (47) // this is a global memory configuration
        }
```

---

The existence of discontinuities (see 9) in the cost function Area($N_{ij}$, P) can be easily circumvented. If in a port configuration P the ports of some memory (ij) are all zero, then the corresponding number of storage locations $N_{ij}$ must be set to 0 both in the cost function and in the constraints, before solving the LP problem. On the contrary, if in the port configuration P not all the ports of memory (ij) are zero, then a new lower-bounding constraint must be added to (13) and (14), in order to avoid the possibility that $N_{ij}^{opt}=0$. Such a constraint is, for instance, $N_{ij} \geq P_{ij}$.

The results of the allocation scheme are the k (parameter given by the designer) best memory configurations fully umns of Table 1. Replacing one by one the sets of port values in the cost function (7), the outcome of the 5 resulting optimization problems consists of the number of locations of the memory module(s) (columns 3 and 4), and the corresponding value of the objective function—the (estimated) total silicon area, assuming a CMOS technology of 1.2 μm (column 5). The total CPU time was 0.32 seconds.

The best solution corresponds to the first row of Table 1, and it consists of two memory units of 16 bit word-length, having 1 read/write port and 5.5 locations each. As

TABLE 1

The 5 memory configurations derived for the illustrative example in FIG. 10

| Memory 1 wl = 16 bits | Memory 2 wl = 16 bits | $N_{11}$ | $N_{12}$ | Area [mm²] |
|---|---|---|---|---|
| $p_{11}^r = 0 \ p_{11}^w = 0 \ p_{11}^{rw} = 1$ | $p_{12}^r = 0 \ p_{12}^w = 0 \ p_{12}^{rw} = 1$ | 5.5 | 5.5 | 0.2965 |
| $p_{11}^r = 1 \ p_{11}^w = 1 \ p_{11}^{rw} = 0$ | $p_{12}^r = 0 \ p_{12}^w = 0 \ p_{12}^{rw} = 1$ | 2 | 9 | 0.3059 |
| $p_{11}^r = 1 \ p_{11}^w = 0 \ p_{11}^{rw} = 1$ | — | 11 | 0 | 0.2989 |

TABLE 1-continued

The 5 memory configurations derived for the illustrative example in FIG. 10

| Memory 1 wl = 16 bits | Memory 2 wl = 16 bits | $N_{11}$ | $N_{12}$ | Area [mm$^2$] |
|---|---|---|---|---|
| $p_{11}{}^r = 2$  $p_{11}{}^w = 1$  $p_{11}{}^{rw} = 0$ | — | 11 | 0 | 0.3238 |
| $p_{11}{}^r = 0$  $p_{11}{}^w = 0$  $p_{11}{}^{rw} = 2$ | — | 11 | 0 | 0.3586 | mentioned in a previous remark, it is not important at this stage whether the storage values $N_{ij}$ are integer or not, as their final values will bet known anyhow only after the signal-to-memory assignment (50).

Memory allocation with different layout models

The allocation formalism and the optimization technique are only loosely dependent on the chosen layout model: changing the dependence function Area=f(#locations,word-length, port_configuration, min_geometry)

requires only technical adaptations, described in the sequel.

For instance, accumulating the partial results in Ramachandran's layout model (see C. Ramachandran, ibidem), the RAM area can be expressed as:

$$Area_{ij} = \left[ \beta \sqrt{b_i N_{ij}} (6 + 2P_{ij}) + (\beta + \gamma) \frac{2P_{ij}}{2 + 2P_{ij}} \log_2 \sqrt{b_i N_{ij}} + \beta \log_2 \sqrt{b_i N_{ij}} + 2\beta \right] \times \left[ \alpha \sqrt{b_i N_{ij}} (2 + 2P_{ij}) + \frac{2\alpha(\beta + \gamma)}{\beta} \frac{P_{ij}}{6 + 2P_{ij}} \left( \log_2 \sqrt{\frac{N_{ij}}{b_i}} + 3 \right) + \beta \log_2 \sqrt{\frac{N_{ij}}{b_i}} + 14\beta \right]$$

where $\alpha$ is the minimal distance between two transistors, $\beta$ is the minimal distance between two routing tracks, and $\gamma$—the minimal distance between two strips. The other variables have the same significance as in 9: $b_i$—the width of a memory location in bits, $P_{ij}$—the number of ports, and $N_{ij}$—the number of storage locations.

In this model, all ports are considered to be of read/write type. This simplifies the sets of constraints (10) and (11), retaining only the third ones in both sets. The constraints (12) become superfluous.

The most important modification concerns the proper optimization approach. Mulder's model ensures a technical facility: the total area (I) is linear in the location variables $N_{ij}$ (less the discontinuities in $N_{ij}=0$), when the port variables are constant. The implication is that the minimization from the general two-phase allocation scheme is, basically, an LP problem. This is not necessarily true if other layout models are employed (e.g., Ramachandran s model). Although the allocation scheme remains unchanged, the optimization $$\min_{N_{ij}} Area(N_{ij}, P) \quad s.t. \text{ constraints (13) and (14)}$$

is, in general, a programming problem of the form:

$$\min f(x) \quad (15)$$
$$s.t. \quad Ax \leq b, x \geq 0$$

where $x = [\ldots N_{ij} \ldots]^T$ represents the vector of storage locations, $Ax \leq b$ are the linear constraints (13) and (14), and $f$—a differentiable cost function (taking into account the possibility of circumventing the existence of discontinuities described earlier) representing the total area.

Solving this problem can be done employing, for instance, one of Zoutendijk's methods of feasible directions, briefly described in the sequel.

The optimization algorithm is initialized by the determination of a feasible solution $x_0$, complying with the constraints $Ax \leq b$, $x \geq 0$. This can be accomplished with the Fourier-Motzkin elimination (see G. B. Dantzig, ibidem).

Afterwards, the algorithm attempts to find a direction to move away from $x_0$ in order to decrease $f(x)$, but still remain feasible. It is known that, if $\nabla f(x_0)^R \cdot v < 0$ (v being some nonzero vector), and we move a small distance away from $x_0$ in the direction v then $f(x)$ will decrease. The algorithm choses to move away from $x_0$ in a direction $v = d_0 - x_0$, where $d_0$ is an optimal solution to the following LP problem:

$$\min \nabla f(x_0) \cdot d \quad (16)$$
$$s.t. \quad Ad \leq b, d \geq 0$$

As $x_0$ is a feasible point, then $\nabla f(x_0) \cdot d_0 \geq \nabla f(x_0) \cdot x_0$. If $d_0 = x_0$ (or it is just another solution to the LP problem (16)), then the optimization algorithm stops.

If $\nabla f(x_0) \cdot d_0 < \nabla f(x_0) \cdot x_0$, then moving a small distance from $x_0$ in the direction $d_0 - x_0$, to a point $$x_1 = x_0 + t(d_0 - x_0), 0 \leq t \leq 1$$

will decrease the objective function $f(x)$. It can be easily seen that all $x_1$ are feasible points. Indeed, from the constraints of (15) and (16), it follows that $$x_1 = (1-t)x_0 + td_0 \geq 0, \text{ and}$$

$$Ax_1 = (1-t)Ax_0 + tAd_0 \leq (1-t)b + tb = b$$

The new point $x_1$ is chosen such that $t = t_0$—where $t_0$ solves the one variable optimization problem:

$$\min f(x_0 + t(d_0 - x_0))$$
$$s.t. \quad 0 \leq t \leq 1$$

in order to decrease the objective function as much as possible.

This latter problem is solved with one of the line search methods presented in M. S. Bazaraa, H. D. Sherali, C. M. Shetty, Nonlinear Programming—Theory and Algorithms (2nd edition), John Wiley & Sons, N.Y., 1993 (sections 8.1–8.3).

The algorithm continues iteratively until two successive points $x_k$ and $x_{k+1}$ are close enough, or the stopping criterion is met.

Memory allocation for low-power design

In order to extend the background memory allocation model—presented in this chapter—for low-power (resign, the cost function (7) must encompass in addition a (weighted) energy or power term. For instance, the energy consumed by a memory unit is:

$$E = C \cdot V^2 \cdot n$$

where C is the total capacitance switched during a memory access, V is the supply voltage, and n—the number of memory accesses.

According to Landman's power model for small to medium size embedded memories (see P. E. Landman, *Low-Power Architectural Design Methodologies*, Ph.D. thesis, U. C. Berkeley, Aug. 1994), the background memories such as SRAM's, DRAM's, and ROM's, have an identical capacitance model, where the dominant term comes from charging and discharging the bit lines. The capacitance switched during the charging of the bit lines is proportional to bN, as the number of bit lines is proportional to the word-length b, and the length of each bit line is proportional to the number of words N in the memory.

The capacitance components due to the wordline driver, column decoder, sense amplifier, and output driver circuitry are proportional to b, while the component due to the row decoder is proportional to N. In conclusion, according to Landman's model, the total capacitance switched during an access has the general expression $$C = Co_0 + C_1 b + C_2 N + C_3 bN$$

where $C_0$ is a constant overhead term.

Signal-to-memory assignment

The outcome of the background memory allocation (40) modeling and optimization is a distributed memory architecture (49), having a minimal total area, in terms of the embedded layout model (in this case Mulder's model). The basic idea is to maintain the optimal memory configuration, and to carry out the assignment task such that the global increase of silicon area—relative to the optimal allocation solution—is minimum.

Two assignment solutions—compatible with the polyhedral model for indexed signals—are described in the sequel. The former is a heuristic sequential technique, followed by an iterative improvement (see F. Balasa, F. Catthoor, H. De Man, "Dataflow-driven memory allocation for multi-dimensional signal processing systems," *Proc. IEEE Int. Conf. on Comp.-Aided Design*, pp. 31–34, San Jose Calif., Nov. 1994), while the latter is a global approach based on a binary quadratic optimization (see F. Balasa, V. Geurts, F. Catthoor, H. De Man, "Solving large scale assignment problems in high-level synthesis by approximative quadratic programming," submitted to *European Design and Test Conf.*, Paris, France, March 1996).

Different from most of the past assignment techniques— operating at scalar level, both novel solutions carry out the signal-to-memory assignment at the level of basic sets, therefore being able to handle RMSP algorithms with a significantly larger number of scalar signals. Moreover, a novel approximative approach for solving binary quadratic programming problems is introduced.

Heuristic assignment

Figure 5:
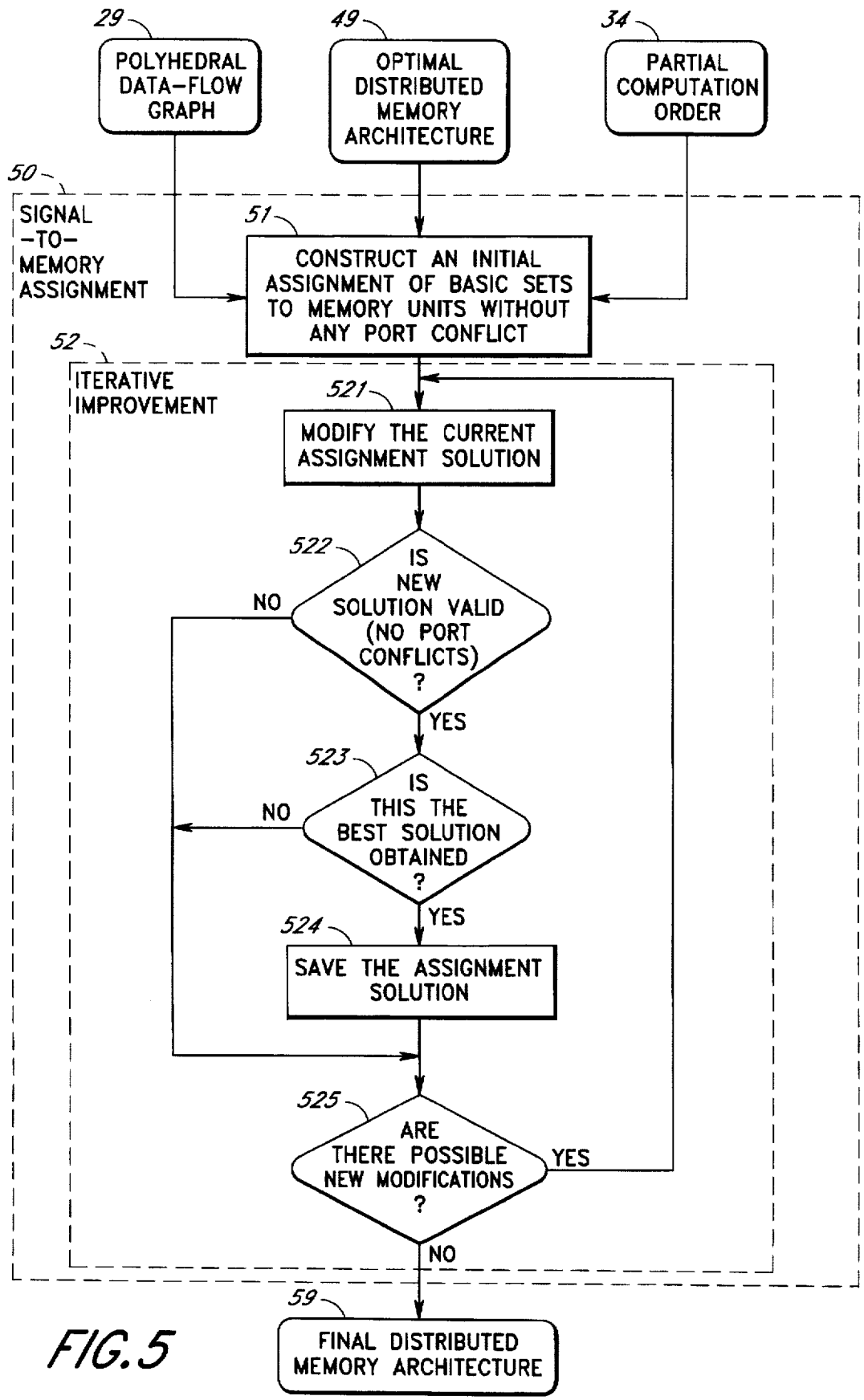
FIG. 5 is a flowchart illustrating the phase of signal-to-memory assignment, shown in FIG. 1.
Figure 6:
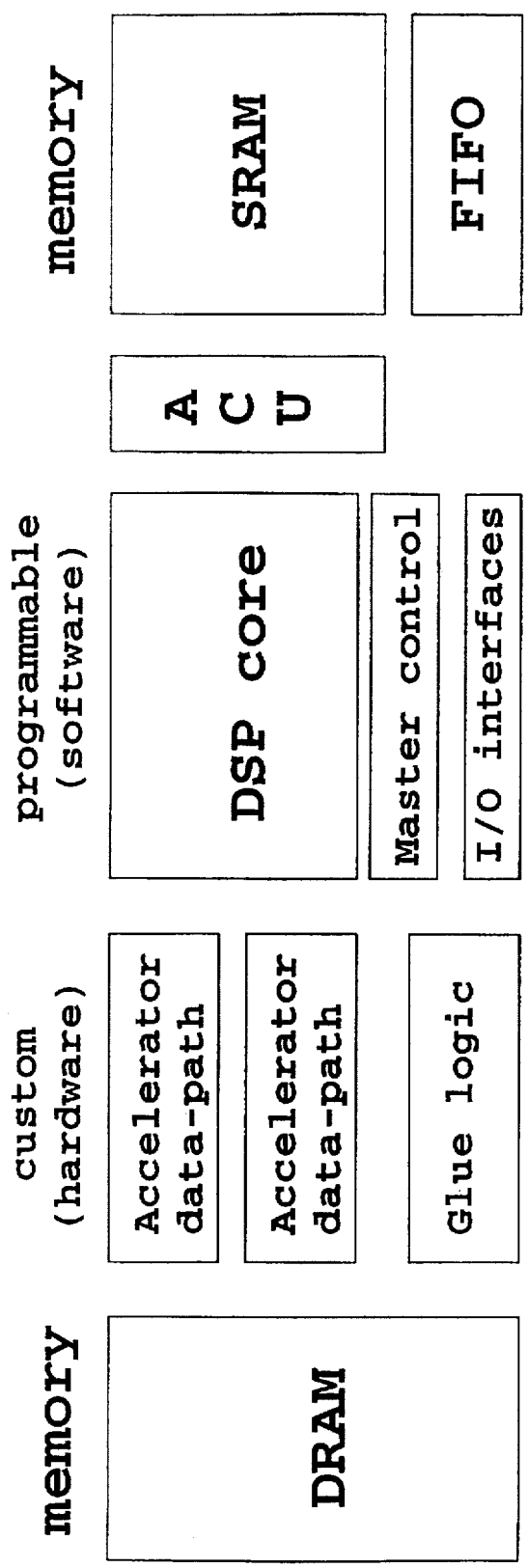
FIG. 6 shows the schematic block diagram of a representative heterogeneous single-chip architecture of a VLSI system.
Figure 9:
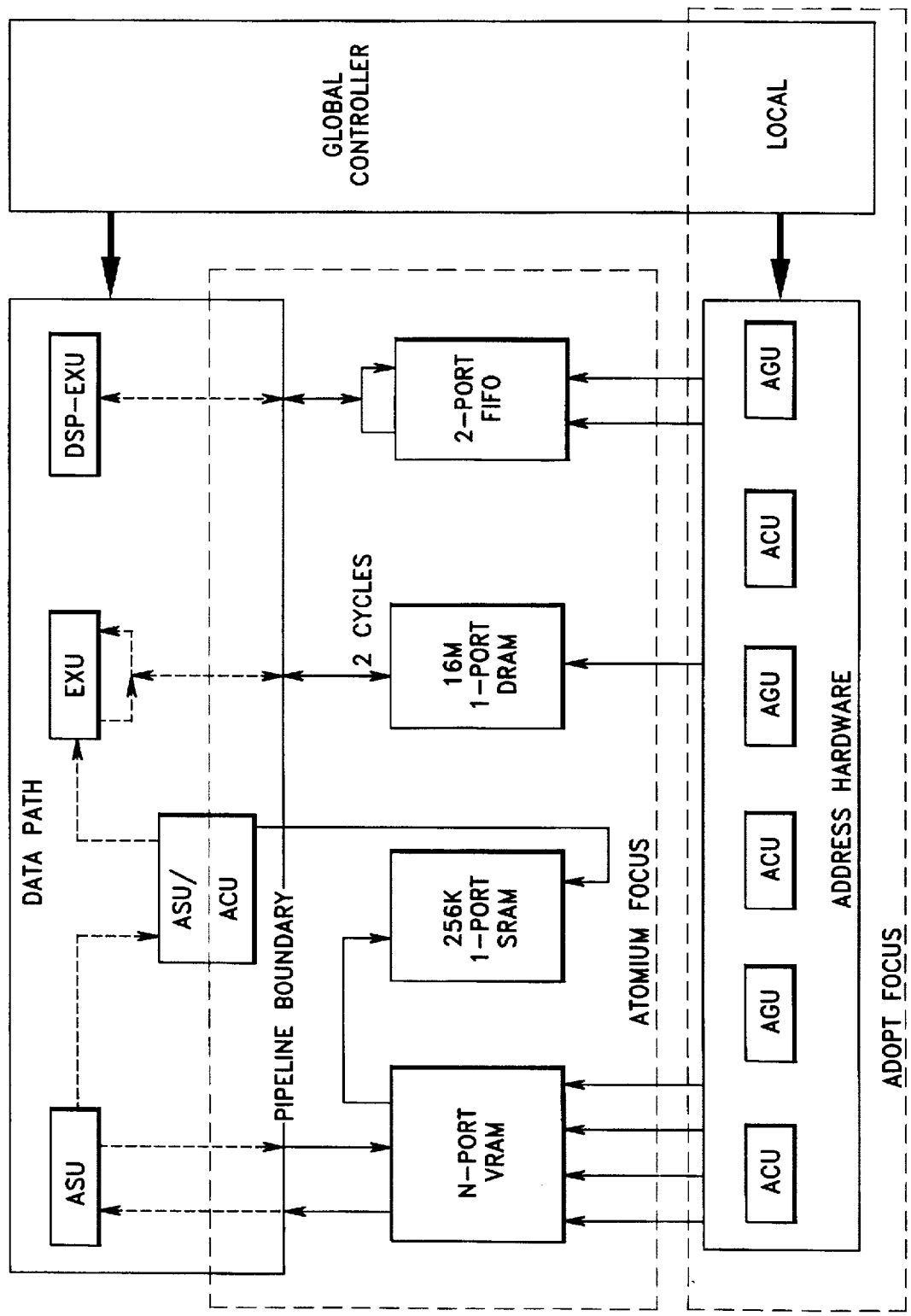
FIG. 9 illustrates the general view of the target architecture for the memory organisation.

The inputs of the assignment algorithm are the following (see FIG. 5):

the optimal distributed memory architecture (49), resulting from the allocation step;

the groups of signals to be assigned—resulting from the polyhedral data-flow analysis (29);

the partial computation order (34) at the level of basic sets—resulting from the estimation of storage requirements (30).

The proposed algorithm operates in two phases:

1. a constructive phase, which generates an initial assignment solution of the basic sets to the memory units without any port conflict (51);

2. an iterative improvement (52) phase of the initial assignment, which is basically a branch-and-bound algorithm (see, e.g., C. H. Papadimitriou, K. Steiglitz, *Combinatorial Optimization, Algorithms and Complexity*, Prentice-Hall, 1982).

The assignment decision is steered by a cumulative penalty composed of three weighted terms (see FIG. 36):

$$P = \lambda_1 P_1 + \lambda_2 P_2 + \lambda_3 P_3 \qquad (17)$$

The first term $\lambda_1 P_1$ penalizes the memory area "lost" by assigning a group of signals to a memory having superior word-length. If $A_i$ denotes the area of memory i, $N_i$—its size, and $b_i$—its word-length, the area-per-bit ratio is $A_i/(N_i b_i)$. If a group of $n_k$ signals of $b_k$ bits ($b_k < b_i$) is assigned to that memory, then $n_k(b_i - b_k)$ bits are "lost", resulting a cost of:

$$P_1 = n_k \frac{b_i - b_k}{b_i} \frac{A_i}{N_i}$$

Therefore, the first term of the penalty function (17) encourages signals to be assigned to memories having the same word-length $b_k$ (or slightly higher).

The second term of (17) encourages the assignment of basic sets common to the same definition or operand domain to the same memory. Intuitively, this term tends to reduce the address logic for each memory as it is likely that these signals can then share (part of) their address equations and thus address logic.

The third term penalizes the memory overflows, relative to the sizes TV determined during the allocation phase:

$$P_3 = \left( \text{overflow}_i, \frac{A_i}{N_i} \right)^2$$

It must be emphasized that different assignment effects can be obtained by varying the $\lambda$ weights in (17). E.g., if $\lambda_2 >> \lambda_1$, $\lambda_3$, all scalars belonging to the same M-D signals are grouped in the same memories. If $\lambda_3 >> \lambda_1$, $\lambda_2$, the final allocation solution is closer to the "optimal" (in terms of estimated area) solution resulting from the allocation phase.

Initial-constructive assignment

The idea of the constructive stage is very simple: the basic sets are sequentially assigned as they were produced during the data-flow graph traversal. Each basic set is assigned such that the penalty implied is minimal. If, at some moment, the partial assignment solution cannot be continued due to the port conflicts, a simple backtracking mechanism is used. Allowing penalty increases, this greedy approach eventually finds a valid global assignment solution.

Construct an initial assignment (51)

---

```
AssignmentCost = 0 ; // Assume the basic sets are ordered as in the DFG traversal
for (i = 1 ; i ≦ NrBasicSets ; i++) { determine the set M_i of memories to which the current basic set B_i can be
    assigned;
```

```
    // for ∀M∈ Mᵢ, word-length(M) ≥ word-length(Bᵢ) ,
    //      and no port or memory conflict results if Bᵢ is assigned to M
if ( Mᵢ ≠ ∅)
        find the memory Mᵢ ∈ Mᵢ such that the penalty of assigning Bᵢ to Mᵢ
                P(Bᵢ,Mᵢ) = min_{M∈} Mᵢ P(Bᵢ, M)
        assign Bᵢ to Mᵢ ;
        AssignmentCost += P(Bᵢ,Mᵢ) ;
        update MemorySize(Mᵢ) ;
else backtrack = true ; // Backtracking
        do {
                de-assign Bᵢ₋₁ from Mᵢ₋₁ ;
                AssignmentCost - = P(Bᵢ₋₁,Mᵢ₋₁) ;
                update MemorySize(Mᵢ₋₁);
                Mᵢ₋₁ = Mᵢ₋₁ - {Mᵢ₋₁} ;
                if ( Mᵢ₋₁ ≠ ∅)
                        find Mᵢ₋₁' ∈ Mᵢ₋₁ such that the penalty
                            P(Bᵢ₋₁,Mᵢ₋₁') = min_{M∈} Mᵢ₋₁ P(Bᵢ₋₁,M) ;
                        assign Bᵢ₋₁ to Mᵢ₋₁' ;
                        AssignmentCost += P(Bᵢ₋₁,Mᵢ₋₁') ;
                        update MemorySize(Mᵢ₋₁') ;
                        backtrack = false ;
                        i = i - 1 ;
} while (backtrack == true ) ;
}
```

The result of this constructive scheme is a global assignment solution exhibiting no port conflicts, and having a total assignment cost relatively low. It must be emphasized that such a valid assignment always exists, as the memory allocation optimization is carried out in a search space which ensures the necessary bandwidth (see the port constraints (11)). The storage constraints (13) and (14) are always verified, as the basic sets at e ordered as decided during the DFG traversal, where these constraints have been derived.

The penalty computation and the memory updates take into account the high-level in-place mapping, in the context of the partial assignment solution.

Iterative improvement (52) of the initial assignment solution

The initial assignment solution is constructed in a greedy way, obeying the assignment constraints and minimizing the global penalty value in (17). Afterwards, a branch-and-bound process is initiated (see FIG. 5), intended to further improve the assignment cost, while complying with the constraints.

The iterative improvement scheme is similar to the previous one. The basic difference is that the process does not stop when meeting the first valid solution the search continues, enumerating exhaustively all the valid assignments. When a new global solution is found, its cost is compared to the lowest assignment cost obtained so far (MinAssignmentCost): any better solution is saved, along with its corresponding cost. This latter dynamic value is the bound which control s th e branching: when the partial assignment cost becomes higher than MinAssignmentCost, the backtracking has to be initiated.

In order to improve the practical computational effort, the implementation avoids the generation of symmetric assignment solutions. Therefore, the algorithm guarantees that every valid solution is produced only once.

The final solution consists of the memory configuration(s) found at the allocation phase, but having the memory sizes adjusted by the assignment (59). A correspondence map of the form (basic set i assigned to memory j) is produced, allowing to determine in what memory each scalar is actually stored. As the branch-and-bound phase is computationally expensive, the user can put a limit on the CPU time of the assignment process, While producing the best solution reached within that limit.

Scheme for visiting all the assignment solutions (iterative improvement (52))

```
AssignmentCost = 0 ;    MinAssignmentCost = ∞ ;    i = 1 ;
do {
        determine the set Mᵢ of memories to which the current basic set Bᵢ can be assigned
        ;
        // Modify the current assignment solution (521)
        if ( Mᵢ ≠ ∅) // Is the new solution valid ? (522)
                find the memory Mᵢ ∈ Mᵢ such that P(Bᵢ,Mᵢ) = min_{M∈} Mᵢ P(Bᵢ,M)
                if (AssignmentCost +P(Bᵢ,Mᵢ) ≥ MinAssignmentCost) backtrack = true ;
                // Is this the best solution obtained ? (523)
                else assign Bᵢ to Mᵢ ; // This is the best solution obtained so far
                        if (i == NrBasicSets)
                                MinAssignmentCost = AssignmentCost + P(Bᵢ,Mᵢ) ;
                                save the assignment solution (524) ;
                                de-assign Bᵢ from Mᵢ ; backtrack = true ;
                        else AssignmentCost += P(Bᵢ,Mᵢ) ;
                                update MemorySize(Mᵢ) ;   i = i + 1 ;
        else backtrack = true ; // Not a valid solution (at 522)
        if (backtrack == true)
                do { if ( i ==1 ) break ;
                        de-assign Bᵢ₋₁ from Mᵢ₋₁ ;
```

-continued

```
        AssignmentCost -= P(B_{i-1},M_{i-1}) ;
        upday MemorySize(M_{i-1}) ;
        M_{i-1} = M_{i-1} - {M_{i-1}} ;
        if ( M_{i-1} ≠ 0)
            find M_{i-1}'∈ M_{i-1} such that the penalty
                P(B_{i-1},M_{i-1}') = min_{M∈ M_{i-1}} P(B_{i-1},M) ;
            assign B_{i-1} to M_{i-1}' ;
            AssignmentCost += P(B_{i-1},M_{i-1}') ;
            update MemorySize(M_{i-1}') ;
            backtrack = false ;
        else i = i - 1 ;
    } while (backtrack == true) ;
} while (i > 1) ; // Are there possible new modifications ? (525)
// The final distributed memory architecture (59) results from the best assignment
```

Example The allocation example—presented earlier—is continued with the signal-to-memory assignment (50) phase. The indexed signals in the illustrative Silage code in FIG. 10 have been partitioned in 55 basic sets during the data-flow analysis (see, for instance, the data-flow graph in FIG. 20). These 55 sets of scalars have to be assigned to the memory units corresponding to the first row of Table 1. (The designer has the possibility to indicate the desired memory configuration—resulting after the allocation phase—for which the assignment has to be carried out. By default, this configuration is chosen to be the one of minimal area.)

The initial-constructive algorithm has found an assignment solution having the penalty AssignmentCost=741. The subsequent branch-and-bound search has improved the initial assignment solution in 48 steps, and eventually found a better assignment solution of MinAssignmentCost=195.

The final sizes of the two memory modules—corresponding to the assignment solution—result as, respectively, $N_{11}'=5$ and $N_{12}'=6$. The total silicon area after the assignment phase is Area'=0.2965 mm$^2$.

The sizes of the memories after the signal-to-memory assignment (50) are slightly larger than the corresponding optimal values obtained after the background memory allocation (40) phase. The reason is that the basic sets of signals cannot perfectly match the dimension values determined during the allocation phase. Although the signal-to-memory assignment is significantly more computationally expensive, the CPU times are still acceptable.

Binary quadratic assignment

Assignment problems encountered in distributed data processing or high-level synthesis can be often expressed as binary quadratic programming (QP) problems of the general form:

$$QP: \quad \text{minimize} \frac{1}{2} x^T C x + c^T x$$

$$\text{subject to } Ax \leq b, \; x_j \in \{0,1\} \; \forall j$$

where C is a symmetric n×n matrix, A is a m×n matrix, and c and b are n- and m- vectors, respectively. The notation $x^T$ means transposition of a column vector x.

However, these formal models are usually avoided in high-level synthesis as the size (number of variables and constraints) of the resulting problems for real-life applications is discouragingly high relative to the capabilities of the existing optimization methods. The optimization techniques existent in the literature only provide results for small examples (up to a few tens unknowns and a few tens constraints), relative to the actual high-level synthesis requirements. According to our own experience, while testing some of the existing techniques, the duration of the computation grows very quickly with the size of the problem. The outcome is that quadratic models are usually considered impractical for high-level synthesis assignment problems, and are therefore disregarded. Furthermore, heuristic sequential approaches—in which one object is selected according to some rule, and afterwards assigned according to a positioning rule—are usually preferred to the costly global approaches—yielding an assignment solution for all the objects simultaneously.

There are two main reasons leading to failure when modeling the assignment as a binary quadratic programming problem. First, the models employed are usually flattened, attempting to assign individual objects, like binary operations or scalar signals. Second, exact optimization techniques are employed for solving the practical problems of QP-type, which is usually too time-consuming or even impossible. As models are, naturally, approximations of real phenomena, an approximative solution of the practical QP problems should provide reasonably good assignment solutions.

A novel approximative binary quadratic optimization technique is described in the sequel. The method has been applied to carry out the signal-to-memory assignment for multi-dimensional (array) signals (see F. Balasa, W. Geurts, F. Catthoor, H. De Man, "Solving large scale assignment problems in high-level synthesis by approximative quadratic programming," submitted to *European Design and Test Conf.*, Paris, France, March 1996).

A category of existing techniques is based on implicit enumeration. This class of approaches was initiated by Balas in 1965, who applied a branch-and-bound strategy—achieving in fact an investigation for all solution configurations. The backtrack idea for an exhaustive search of the solution space has been further refined by Geoffrion, who proved its applicability for handling nonlinear objective functions (see A. M. Geoffrion, "Integer programming by implicit enumeration and Balas' method," *SIAM Review*, Vol. 9, No. 2, 178–190, April 1967). Taha has proposed a Balasian-based algorithm for solving the zero-one programs with polynomial objective functions (see H. A. Taha, "A Balasian-based algorithm for zero-one polynomial programming," *Management Science*, Vol. 18, No. 6, pp. 328–343, Feb. 1972). The basic idea is that a polynomial problem can be converted into an equivalent binary linear system with nonlinear secondary constraints—representing the polynomial terms. The solution space of the subsequent problem is investigated further with a similar implicit enumeration technique.

Our experience while testing Geoffrion's and Taha's algorithms has shown that enumerative approaches are unlikely to solve problems with more than 30–40 variables, as the computation time is really blowing up. When applied to our assignment problems, even improvements of the methods, as automatic disregard of the symmetric solutions, could not prevent the failure.

Another category of existing techniques is based on the transformation of the quadratic problem QP into a 0–1 linear problem, by introducing additional variables. This strategy is motivated by the fact that linear methods are easier to program and refine, and a more extensive theory does exist for the linear case. Furthermore, based on the fact that $x_k$ can be replaced by x in the objective function and constraints (where x is an arbitrary variable of the problem, and k∈N), these methods can be easily adapted to solve the binary polynomial programming problems. These approaches—as that of F. Glover, E. Woolsey, "Converting the 0–1 polynomial programming problem to a 0–1 linear program," *Operations Research*, Vol. 22, No. 1, pp. 180–182, Jan. 1974—differ from each other by the transformation rules, the goal being to achieve more economical representations of the polynomial programs. For instance, Glover and Woolsey proposed to replace the polynomial cross-product terms by continuous variables rather than integer variables, since the difficulty of (mixed-) integer programming problems depends more strongly on the number of integer variables rather than on the number of continuous ones. According to Glover's rules, the problem QP is transformed as follows:

(a) replace each $x_j^2$ in the objective function by $x_j$;

(b) replace each cross-product $x_i x_j$ by a new nonnegative continuous variable $x_{ij}$ satisfying the new constraints:

$$x_i + x_j - x_{ij} \leq 1$$

$$x_i \geq x_{ij}, \; x_j \geq x_{ij}$$

The conversion methods have recently gained more attention for practical reasons, as more and more efficient mixed ILP packages are becoming available. The conversion methods depend on the sparsity of matrix C: the number of cross-products drastically affects the number of variables and the number of constraints of the resulting equivalent linear problem. We have experienced examples resulting in mixed ILP problems with over 1000 variables and 1000 constraints, solved by LAMPS in CPU times of tens of seconds. However, assignment problems from our realistic examples can yield much larger problems.

The major drawback of these exact optimization techniques is the incapability to handle large binary quadratic programming problems. Therefore, an approximative approach—able to deal with much larger problem sizes—is presented in the sequel. Moreover, unlike most of the existing methods, the novel technique does not require any constraint concerning the convexity of the cost function.

Approximative binary quadratic optimization

After modeling the given assignment problem as a binary quadratic optimization, a size evaluation for the equivalent ILP is carried out. The small or medium size problems are handled directly, employing an exact classical technique—the Glover-Wolsey algorithm (see F. Glover, ibidem). When the problem is large (in terms of variables, cross-products, and constraints), a greedy process—based on continuous relaxations—is initiated. The general scheme of the proposed approach is the following:

derive an equivalent objective function (if necessary) in order to ensure that matrix C is positive definite while (problem QP is too large) { solve relaxed QP: minimize $\frac{1}{2} x^T C x + c^T x$ subject to $Ax \leq b \cdot 0 \leq x \leq 1$ -continued assign to all components of $x^{opt}$ satisfying $x_i^{opt} < \epsilon$ or $x_i^{opt} > 1 - \epsilon$
        the values 0 and 1, respectively;
    derive a new QP with reduced dimensions,
        eliminating from the old problem the variables with assigned boolean values;
}

// employing Glover's rules (a) and (b)
transform QP into a mixed ILP;
solve the resulting 0–1 mixed ILP;

The positive definite transformation

When modeling an assignment problem as a binary QP, it is difficult to directly ensure the convexity of the cost function—an important property exploited by many optimization techniques. Therefore, the initial cost function of the binary QP must be transformed (if necessary) into an equivalent one, which is strictly convex (matrix C is positive definite (i.e., $x^T C x < 0$ for all nonzero $x \in \mathfrak{R}^n$).

It has been observed that $x_i^2 = x_i$ at every zero-one solution of QP. Therefore, each term in the objective function of the form $\frac{1}{2} c_{ii} x_i^2$ can be replaced by the linear term $\frac{1}{2} c_{ii} x_i$. This simple property can be used to ensure that the new matrix $C^{new}$ is positive definite: it is sufficient to increase the diagonal coefficients of C with some values $\Delta c_{ii}$ selected large enough to ensure the diagonal dominance of the new matrix C:

$$c_{ii}^{new} = c_{ii} + 2\Delta c_{ii} \text{ and } c_i^{new} = c_i - \Delta c_{ii}$$

As the values $\Delta c_{ii}$ are increased, the solution to the relaxed problem gets closer to the point $(\frac{1}{2}, \ldots, \frac{1}{2})$, which is an undesirable effect. Consequently, the values $\Delta c_{ii}$ must not be too large or too small. The transformation scheme proposed by Carter (see M. W. Carter, "The indefinite zero-one quadratic problem," *Discrete Applied Math.*, Vol. 7, pp. 23–44, 1984) is employed in our algorithm. According to this scheme, the $\Delta c_{ii}$ are chosen such that the spread between the largest and smallest eigenvalues is minimized. This has positive implications on both stability and on the performance of the programming algorithm since the resulting function contours tend to be circular in shape (the nearest integer to a continuous minimum is more likely to be optimal). For the sake of consistency, Carter's transformation, based on a modified Choleski factorization $C = L \cdot L^T$, is reproduced below:

for (j = 1; j ≤ n; j++) { compute $p_i = c_{ij} - \sum_{r=1}^{j-1} l_{jr} l_{ir}, \; i = j+1, \ldots, n$ let $l_{jj} = \left( \sum_{i=j+1}^{n} p_i^2 \right)^{\frac{1}{4}}$    // $l_{nn} = 0$ compute $l_{ij} = p_i / l_{jj}, \; i = j+1, \ldots, n$ compute the increase of the j-th diagonal coefficient $\Delta c_{jj} = \sum_{i=1}^{j} l_{ji}^2 - c_{jj}$ update the objective function $c_{jj}^{new} = c_{jj} + \Delta c_{jj}, \; c_j^{new} = c_j - \Delta c_{jj}/2$

}

At this stage, $C^{new}$ is positive semidefinite with at least one zero eigenvalue. Finally, each diagonal element of $C^{new}$ is further increased with a positive constant $\alpha$. In order to ensure a well conditioned problem, the recommended value of $\alpha$—which will be the minimum eigenvalue of matrix $C^{new}$—is (according to M. W. Carter, ibidem)

$$\alpha = \sqrt{\sum_{i,j} c_{ij}^2 \; /(k-1)}, \text{ with } k = 500.$$

The solution of the relaxed quadratic program

The continuous relaxed QP is solved with a cutting plane approach. Let x be the solution of the unconstrained optimization:

$$\text{minimize } \tfrac{1}{2} x^T C x + c^T x.$$

Then, $\hat{x} = -C^{-1}c$ and the corresponding value of the objective function is (matrix C is non-singular as it is positive definite):

$$\hat{y} = -\tfrac{1}{2} c^T C^{-1} c.$$

If $A\hat{x} \leq b$ and $0 \leq \hat{x} < 1$ than $\hat{x}$ is also the solution of the continuous relaxed quadratic programming problem.

Otherwise, let $x_0 = (x_1^0, \ldots x_n^0)$ be an arbitrary point in $[0,1]^n$. As the tangent hyperplane in $(x_0, f(x_0))$ at the hypersurface $y = f(x_1, \ldots, x_n)$, where $f: \Re^n \to \Re$, is continuously differentiable, has the equation $$y - f(x_0) = \sum_i \frac{\partial f}{\partial x_i} (x_0)(x_i - x_i^0)$$

the tangent hyperplane at $$y = f(x) \stackrel{\text{def}}{=} \tfrac{1}{2} x^T C x + c^T x + \hat{y}$$

in $(x_0, f(x_0))$ is $$y - \tfrac{1}{2} x_0^T C x_0 - c^T x_0 - \hat{y} = (x_0^T C + c^T)(x - x_0)$$

It can be remarked (see FIG. 37) that the hypersurface $y = f(x) \equiv \tfrac{1}{2} x^T C x + c^T x + \hat{y}$ is contained in the half-space (H)

$$y \geq \tfrac{1}{2} x_0^T C x_0 + c^T x_0 + \hat{y} + (x_0 C + c^T)(x - x_0)$$

Indeed, by trivial computations, this inequality is equivalent to $$x^T C x - 2 x^T C x_0 + x_0^T C x_0 \geq 0$$

According to the Choleski factorization $C = LL^T$, where L is a lower-triangular matrix, it results that $(x^T L - x_0^T L)(x^T L - x_0^T L)^T \geq 0$.

This result was expected because of the convexity of f(x). In conclusion, introducing the new constraint equivalent to the equation of the half-space (H)

$$(x_0^T C + c^T) x - (y - \hat{y}) \geq \tfrac{1}{2} x_0^T C x_0$$

should not affect the solution of the programming problem:

$$\text{minimize } y - \hat{y} \text{ where } y - \hat{y} \equiv \tfrac{1}{2} x^T C x + c^T x$$

$$\text{subject to } Ax \leq b, \; 0 \leq x \leq 1$$

The goal of the new constraint is to reduce the search space, as shown in the sequel. Notice that the constraint $y - \hat{y} \geq 0$ does not affect the programming problem above, as $\hat{y}$ is the value of the objective function corresponding to an unconstrained minimization.

The general scheme for solving the relaxed QP assuming x is not a feasible solution, is the following:

$$\text{let } A_0 = \begin{bmatrix} A \\ I \end{bmatrix}, a_0 = \begin{bmatrix} 0 \\ \cdot \\ \cdot \\ \cdot \\ 0 \end{bmatrix}, b_0 = \begin{bmatrix} b \\ 1 \end{bmatrix};$$

let $x_0$ be an arbitrary point in $[0, 1]^n$; let $m = 0$;

do { let $m = m + 1$;

$$\text{let } A_m = \begin{bmatrix} A_{m-1} \\ x_{m-1}^T C + c^T \end{bmatrix}, a_m = \begin{bmatrix} a_{m-1} \\ -1 \end{bmatrix}, b_m = \begin{bmatrix} b_{m-1} \\ \tfrac{1}{2} x_{m-1}^T C x_{m-1} \end{bmatrix};$$

solve the LP problem minimize $y - \hat{y}$ subject to $[A_m \; a_m] \begin{bmatrix} x \\ y - \hat{y} \end{bmatrix} \leq b_m;$ $x \geq 0, y - \hat{y} \geq 0;$ let $(x_m, y_m)$ be the optimal solution of the LP problem;

} while $\left( \tfrac{1}{2} x_m^T C x_m + c^T x_m > y_m - \hat{y} + \epsilon \right)$ ; // stop when $y_m$ is close enough from $f(x)$ Each new iteration introduces a new constraint, restraining the search space (see FIG. 37). Indeed, the new constraint appended at iteration (m+1)

$$(x_m^T C + c^T)x - (y - \hat{y}) \geq \tfrac{1}{2} x_m^T C x_m \tag{18}$$

is not fulfilled by the solution $(x_m, y_m)$ obtained at the previous iteration, as it contradicts the while loop condition in the last line of the algorithm.

The convergence of the method

The iterative process is convergent. First, the sequence $\{(x_k, y_k)\}$ has at least one limit point as $\{x_k\}$ is bounded, and $\{y_k\}$ is an increasing, upper-bounded sequence. Second, any limit point $(x, y)$ is a solution to the relaxed QP. Indeed, let $\{(x_{k_p}, y_{k_p})\}$ be a subsequence of $\{(x_k, y_k)\}$ converging to $(x, y)$. Then, any element $\{(x_{k_p}, y_{k_p})\}$ of the subsequence, with $p > n$, must comply with the constraint (18) for $m \equiv k_n$:

$$(x_{k_n}^T C + c^T)x_{k_p} - (y_{k_p} - \hat{y}) \geq \tfrac{1}{2} x_{k_n}^T C x_{k_n}$$

which is equivalent to:

$$\tfrac{1}{2} x_{k_n}^T C x_{k_n} + c^T x_{k_n} - (y_{k_n} - \hat{y}) \geq -(x_{k_n}^T C + c^T)(x_{k_p} - x_{k_n}) + (y_{k_p} - y_{k_n})$$

The right-hand side goes to zero as n and p go to infinity, as $\|x_{k_n}^T C + c^T\|$ is upper-bounded. Therefore, $\tfrac{1}{2} x^T C x + c^T x \geq y - \hat{y}$. As $y_{k_n} - \hat{y} \geq \tfrac{1}{2} x_{k_n}^T C x_{k_n} + c^T x_{k_n}$, taking the limit after n, it results finally that $y - \hat{y} = \tfrac{1}{2} x^T C x + c^T x$.

Final remarks on the approximative binary quadratic optimization

The problem QP is converted into a mixed ILP employing Glover-Woolsey rules. The size of the QP problem is evaluated according to the amount of variables and number of constraints of the resulting mixed ILP. For instance, one of the conditions for initiating the greedy process based on relaxations is $N_{variables} + N_{cross-products} \geq threshold\_value$. In the current implementation, the threshold value is currently set to 800. This value depends on the capabilities of the LP solver employed. Our optimization procedure employs the commercial package LAMPS.

After solving a continuous relaxed QP in the greedy iterative process, if no variable can get a 0–1 value, it is still possible to collapse the bounds of one single variable, in order to ensure the reduction of the problem dimensions. The variable elimination can be carried out with a simple routine described in M. W. Carter, ibidem.

The practical convergence speed is controlled by the parameter $\epsilon$. A very small value of $\epsilon$ entails a slow convergence rate, while a too high value can lead to a poor approximative solution. When modeling a new assignment problem, a preliminary tuning process is necessary—the main drawback of this method. An adaptive mechanism, consisting in the gradual increase of $\epsilon$ when the number of iterations exceeds certain threshold values, can be employed to automate the trimming process.

Although the solution yielded by the approximative optimization can be sometimes rather far-away from the optimal solution of the QP problem, the method can still be used in combination with an exact branch-and-bound technique as, for instance, those proposed by Balas, Geoffrion, or Taha (see above). As mentioned in earlier, these exhaustive enumerative approaches are too expensive, especially when they are initiated with a random feasible solution. Employing better bounds provided by the relatively good solution of the approximative optimization could significantly improve the global computational effort.

Modeling the signal-to-memory assignment (50) as a binary quadratic optimization In previous binary assignment formulations (see, e.g. I. Ahmad, C. Y. R. Chen, "Post-processor for data path synthesis using multiport memories," Proc. IEEE Int. Conf. Comp.-Aided Design, pp. 276–279, Santa Clara Calif., Nov. 1991), each boolean variable $x_{ij}$ characterized the assignment of a scalar signal to a memory. In F. Balasa, F. Catthoor, H. De Man, "Background memory area estimation for multi-dimensional signal processing systems," IEEE Trans. on VLSI Systems, Vol. 3, No. 2, pp. 157–172, June 1995, a partitioning approach based on data-dependence analysis, for multi-dimensional signals in a real-time signal processing application, has been described. In our model, the binary variable $x_{ij}$ defines the assignment of a group of signals i (resulting after partitioning) to a memory j, (being 1 if and only if group i is assigned to memory j).

The outcome of the preceding background memory allocation (40) step is a set of m memories, with a determined port structure and size. In order to simplify the formulation, and without loss of generality, it will be assumed in the sequel that memory word-lengths are distinct $b_1 > \ldots > b_m$.

The assignment cost—which must be minimized—is evaluated as an area overhead due to three factors, similar to the penalties mentioned earlier (see also FIG. 36):

(1) The assignment of a group of signals i of $b_k$ bits to a memory j having a superior word-length $b_j > b_k$. The total area overhead is estimated to be:

$$C_1 = \sum_{k=2}^{m} \sum_{i \in COL_k} \sum_{j=1}^{k-1} n_i \frac{b_j - b_k}{b_j} \cdot \frac{A_j}{N_j} x_{ij}$$

where $n_i$ is the number of scalars in group i, $N_j$, $A_j$ are the number of locations and area of memory j, and $COL_k$ is the collection of groups of signals of $b_k$ bits. The area per bit of memory j is $A_j / b_j N_j$. Assigning $n_i$ signals of $b_k$ bits to memory j results in a loss of $n_i (b_j - b_k)$ bit locations.

(2) The assignment of groups of signals belonging to the same operand in the behavioral specification to different memories. Intuitively, minimizing this term tends to reduce the address logic for each memory as it is more likely that these signals can then share the same address equations and thus address logic. This cost term is proportional to:

$$C_2 = \sum_{k=1}^{m} \sum_{(i_1, i_2) \in opd_k} \sum_{j=1}^{k} (x_{i_1 j} - x_{i_2 j})^2$$

where $opd_k$ are operand domains of signals of $b_k$ bits in the behavioral specification.

(3) The background memory allocation (40) technique provides the optimal values of the memory sizes $N_k$ relative to an area model for on-chip memories. The third cost term, $C_3$, penalizes the assignment solutions resulting in memory dimensions different from the optimal ones, implying therefore an area overhead. This term is also quadratic, as both positive and negative differences have to be penalized:

$$C_3 = \sum_{k=1}^{m} \left( \sum_{i \in maxCOL_{k,m}} n_i x_{ik} - N_k \right)^2 \cdot \frac{A_k^2}{N_k^2}$$

where $maxCOL_{k,m}$ is the maximal collection of groups of signals between $b_k$ and $b_m$ bits (thus able to share memory k) for which the life-times are overlapping.

Therefore, the (quadratic) cost function to be minimized is:

$$Cost = \lambda_1 C_1 + \lambda_2 C_2 + \lambda_3 C_3$$

The first set of constraints states that a group of signals of $b_k$ bits is to be assigned to one memory having at least the necessary word-length:

$$\sum_{j=1}^{k} x_{ij} = 1, \text{ for any group } i \in COL_k$$

The second set of constraints ensures that the assignment solution does not result in more simultaneous read and write accesses than what is compatible with the memory port structure yielded by the allocation step:

$$\sum_{r} x_{i_r j} \leq p_j^r + p_j^{rw}, \sum_{w} x_{i_w j} \leq p_j^w + p_j^{rw}$$

where $p_j^r$, $p_j^w$, $p_j^{rw}$ are, respectively, the number of read, write, and read/write ports of memory j.

This assignment problem was tackled earlier employing a two-phase heuristic approach. First, the groups of signals were sequentially selected and assigned to the memories, aiming to decrease the cost function as much as possible. Afterwards, the initial assignment was iteratively improved by means of a branch- and- bound technique.

A clear advantage of the heuristic method for the particular problem tackled in the present invention is the possibility of exploiting the in-place mapping of signals. This aspect—resulting from the data-flow—cannot be embedded in the formal model presented above.

Besides its simplicity, the heuristic method is appealing as the greedy constructive phase yields an acceptable assignment solution even for very large problems. However, the iterative improvement is computationally expensive even for medium-size problems (~$10^2$ groups of signals and a few memories). As a result, the initial assignment solutions are only slightly improved before the program reaches its time limit.

The approximative quadratic optimization yields, in general, lower cost solutions than a heuristic approach. These solutions can be further improved employing a branch-and-bound technique—similar to the one described earlier.

Example The signal-to-memory assignment phase for the allocation example has been also solved using the binary quadratic approach. As mentioned already, there are 55 basic sets to be assigned into two memory modules—having a theoretical size of 5.5 locations each.

The resulting quadratic programming problem to be solved has 110 binary variables and 110 constraints. The number of cross-products in the objective function is 768.

Applying Glover's linearization rules (see F. Glover, ibidem), the resulting mixed ILP has 878 variables (110 integer and 768 real) and 1754 constraints. As this mixed ILP is too large to be handled by the optimization package LAMPS, the greedy general scheme is employed for approximatively solving the quadratic programming problem. Even if the heuristic approach could find a better assignment—resulting in two storage units of 5 and 6 locations, the solution found for $\epsilon=0.08$ (two storage units of 5 and 7 locations), almost 4 times quicker, is still acceptable.

While the above detailed description has shown described, and pointed out the fundamental novel features of the invention as applied to various embodiments, it will be understood that various omissions and substitutions and changes in the form and details of the device illustrated may be made bay those skilled in the art, without departing from the spirit of the invention.

What is claimed:

1. A method of generating a data-flow graph representative of data to be stored in a data-dominated processing system, comprising the steps of:

partitioning a plurality of linearly bounded lattices representative of data into partitioned linearly bounded lattices comprising basic sets and disjoint linearly bounded lattices;

deriving a plurality of dependency relations between the partitioned linearly bounded lattices; and constructing a data-flow graph having a plurality of nodes, each node representing one of the partitioned linearly bounded lattices, and a plurality of arcs, each arc representing one of the dependency relations.

2. The method of claim 1, additionally comprising the steps of:

extracting dependencies between the definition and operand domains from a behavioral specification of the processing system; and representing the domains as linearly bounded lattices and the dependencies as dependency relations.

3. The method of claim 1, wherein each arc includes a weight indicative of the number of dependency relations between connecting nodes.

4. The method of claim 1, wherein the data-flow graph comprises a polyhedral graph.

5. The method of claim 1, wherein the processing system includes nests of loops, the boundaries of each loop comprising affine functions of surrounding loop iterators.

6. The method of claim 1, wherein the processing system includes nests of loops, the signal indices of each loop comprising affine functions of surrounding loop iterators.

7. The method of claim 1, wherein the data-dominated processing system comprises a multi-dimensional signal processing system.

8. The method of claim 1, wherein the data-flow graph provides storage information for memory in an application specific integrated circuit.

9. The method of claim 1, wherein the data-flow graph provides storage information for a data cache memory in a predefined processor.

10. The method of claim 1, wherein the data-flow graph provides storage information for a non-electronic storage.

11. The method of claim 1, wherein the data-dominated processing system is represented by a behavioral specification.

12. The method of claim 11, wherein the behavioral specification comprises a nonprocedural specification.

13. The method of claim 11, wherein the behavioral specification comprises a single assignment form.

14. The method of claim 1, wherein the behavior of the data-dominated system is specified by manifest iterator bounds and indices, and wherein the partitioning step comprises the steps of:

determining the size of each linearly bounded lattice;

constructing an inclusion graph based on the presence of intersections between the linearly bounded lattices; and extracting the basic sets from the inclusion graph based on the determined sizes of the linearly bounded lattices.

15. The method of claim 1, wherein the deriving step includes the step of determining the number of dependencies between the partitioned linearly bounded lattices.

16. The method of claim 1, additionally comprising the step of modifying the data-flow graph to allow for delayed data.

17. A method of analyzing the data-flow in a behavioral specification for a data-dominated processing system, wherein the system is specified with manifest iterator bounds and indices, comprising the steps of:

representing the index space of the domains as a plurality of linearly bounded lattices;

partitioning the linearly bounded lattices into a plurality of basic sets, the partitioning step comprising the steps of constructing inclusion graphs based on the presence of intersections between the lattices, and deriving the basic sets based on the inclusion graphs and the size computation of linearly bounded lattices;

deriving the number of dependencies between the basic sets based on the dependence relations between the lattices; and constructing a weighted directed graph, representing the data-flow, each node in the graph representing one of the basic sets, each node weight in the graph representing the size of the one basic set, each arc of the graph representing a dependence relation between two of the basic sets, each arc weight of the graph representing the number of dependence relations between the two basic sets.

18. The method of claim 17, wherein the data-flow graph comprises a polyhedral graph.

19. The method of claim 17, wherein the processing system includes nests of loops, the boundaries of each loop comprising affine functions of surrounding loop iterators.

20. The method of claim 17, wherein the processing system includes nests of loops, the signal indices of each loop comprising affine functions of surrounding loop iterators.

21. The method of claim 17, wherein the data-dominated processing system comprises a multi-dimensional signal processing system.

22. The method of claim 17, wherein the data-flow graph provides storage information for memory in an application specific integrated circuit.

23. The method of claim 17, wherein the data-flow graph provides storage information for a data cache memory in a predefined processor.

24. The method of claim 17, wherein the data-flow graph provides storage information for a non-electronic storage.

25. The method of claim 17, wherein the behavioral specification comprises a nonprocedural specification.

26. The method of claim 17, wherein the behavioral specification comprises a single assignment form.

27. The method of claim 17, additionally comprising the step of modifying the data-flow graph to allow for delayed data.

28. A method of estimating the storage and port requirements of memory for a nonprocedural behavioral specification in single assignment form, based on a data-flow graph of signals, comprising the steps of:

determining a partial computation ordering of the nodes in the data-flow graph based on storage cost and port cost, each node indicative of a group of signals;

estimating the storage requirements of the memory compatible with the partial computation ordering; and estimating the port requirements of the memory based on the behavioral specification and the partial computation ordering and a cycle budget for memory accesses.

29. The method of claim 28, wherein the partial computation ordering is determined iteratively, starting from a non-ordered flow graph and iteratively ordering all of the signals based on a priority function.

30. The method of claim 28, wherein the data-flow graph provides storage information for memory in an application specific integrated circuit.

31. The method of claim 28, wherein the data-flow graph provides storage information for a data cache memory in a predefined processor.

32. The method of claim 28, wherein the data-flow graph provides storage information for a non-electronic storage.

33. A method of memory allocation for a data-dominated signal processing system represented as a partial computation ordering of the nodes in a data-flow graph based on storage cost and port cost each node indicative of a group of signals, the method comprising the steps of:

deriving a cost function based on memory area and a plurality of read-write memories, each memory indicative of a maximum number of simultaneous read-write operations of signals having a specified number of bits, the memories determined from the partial computation ordering;

deriving a set of port constraints for the read-write memories;

deriving a set of storage constraints for the read-write memories; and generating one or more port configurations, each port configuration matching the port constraints.

34. The method of claim 33, additionally comprising the step of solving memory allocation modeled as an optimization problem based on the derived port constraints and storage constraints.

35. The method of claim 33, wherein the cost function is also based on power.

36. The method of claim 33, wherein the read-write memories include read-only memories.

37. The method of claim 33, wherein the port configurations satisfy constraints of the partial computation ordering.

38. A method of signal to memory assignment for a data-dominated signal processing system represented as a partial computation ordering of the nodes in a data-flow graph based on storage cost and port cost, each node indicative of a group of signals partition, comprising the steps of:

allocating memory units according to minimization of a criteria; and constructing an initial assignment of the partitions to the memory units without any port conflicts.

39. The method of claim 38, wherein the partitions include basic sets.

40. The method of claim 38, wherein the partitions include disjoint linearly bounded lattices.

41. The method of claim 38, wherein the criteria comprises total area.

42. The method of claim 38, wherein the criteria comprises a combination of total storage and access costs.

43. The method of claim 38, wherein the memory units are implemented as an application specific integrated circuit.

44. The method of claim 38, wherein the memory units are implemented as a data cache memory in a predefined processor.

45. The method of claim 38, wherein the memory units are implemented as a non-electronic storage.

46. The method of claim 38, additionally comprising the step of iteratively improving on the assignments.

* * * * *